US012087989B2

(12) United States Patent
Epitaux et al.

(10) Patent No.: US 12,087,989 B2
(45) Date of Patent: Sep. 10, 2024

(54) RF WAVEGUIDE CABLE ASSEMBLY

(71) Applicant: SAMTEC, INC., New Albany, IN (US)

(72) Inventors: Marc Epitaux, Gland (CH); Shashi Chuganey, Newberg, OR (US); Kelly Garrison, Portland, OR (US); Thomas Albert Hall, III, Crestwood, KY (US); Cindy Lee Diegel, Portland, OR (US); James Alexander Moss, Newberg, OR (US); Francisco Noyola, Sherwood, OR (US); Yasuo Sasaki, Yokohama (JP); Scott Mcmorrow, New Albany, IN (US)

(73) Assignee: SAMTEC, INC., New Albany, IN (US)

( * ) Notice: Subject to any disclaimer, the term of this patent is extended or adjusted under 35 U.S.C. 154(b) by 308 days.

(21) Appl. No.: 17/611,422

(22) PCT Filed: May 14, 2020

(86) PCT No.: PCT/US2020/032790
§ 371 (c)(1),
(2) Date: Nov. 15, 2021

(87) PCT Pub. No.: WO2020/232192
PCT Pub. Date: Nov. 19, 2020

(65) Prior Publication Data

US 2022/0216581 A1 Jul. 7, 2022

Related U.S. Application Data

(60) Provisional application No. 63/004,441, filed on Apr. 2, 2020, provisional application No. 62/971,315, filed
(Continued)

(30) Foreign Application Priority Data

May 24, 2019 (WO) ................ PCT/US2019/033915

(51) Int. Cl.
*H01P 5/08* (2006.01)
*H01P 1/04* (2006.01)
*H01P 3/16* (2006.01)

(52) U.S. Cl.
CPC .............. *H01P 5/087* (2013.01); *H01P 1/042* (2013.01); *H01P 3/16* (2013.01)

(58) Field of Classification Search
CPC .. H01P 5/087; H01P 5/082; H01P 5/08; H01P 5/02; H01P 5/022; H01P 5/024;
(Continued)

(56) References Cited

U.S. PATENT DOCUMENTS 3,643,007 A 2/1972 Roberts et al.
3,748,369 A 7/1973 Destito et al.
(Continued)

FOREIGN PATENT DOCUMENTS

CA 2107355 A1 10/1992
CN 102498527 A 6/2012
(Continued)

OTHER PUBLICATIONS

Pivit et al., Compact 60-GHz lens antenna with self-alignment feature for small cell backhaul, IEEE-APS Topical Conference on Antennas and Propagation in Wireless Communications published Sep. 1, 2017.
(Continued)

*Primary Examiner* — Stephen E. Jones
(74) *Attorney, Agent, or Firm* — Baker Hostetler

(57) ABSTRACT

Radio frequency (RF) waveguides and related interconnect members are disclosed. The interconnect members can have a smaller footprint than WR15 flanges. Further, the interconnect members can be configured to mate with complementary interconnects without undergoing substantial relative rotation.

16 Claims, 26 Drawing Sheets

Related U.S. Application Data on Feb. 7, 2020, provisional application No. 62/847,785, filed on May 14, 2019, provisional application No. 62/847,756, filed on May 14, 2019.

(58) Field of Classification Search
CPC .... H01P 5/00; H01P 3/16; H01P 1/042; H01P 1/02; H01P 1/04; H01P 1/00
See application file for complete search history.

(56) References Cited

U.S. PATENT DOCUMENTS

| | | | |
|---|---|---|---|
| 4,145,567 | A | 3/1979 | Bahder et al. |
| 4,155,613 | A | 5/1979 | Brandeau |
| 4,185,162 | A | 1/1980 | Bogese, II |
| 4,475,006 | A | 10/1984 | Olyphant, Jr. |
| 4,963,695 | A | 10/1990 | Marciano-Agostinelli et al. |
| 5,110,998 | A | 5/1992 | Muschiatti |
| 5,158,986 | A | 10/1992 | Cha et al. |
| 5,160,674 | A | 11/1992 | Colton et al. |
| 5,227,103 | A | 7/1993 | Muschiatti |
| 5,334,356 | A | 8/1994 | Baldwin et al. |
| 5,684,495 | A | 11/1997 | Dyott et al. |
| 5,866,053 | A | 2/1999 | Park et al. |
| 6,051,174 | A | 4/2000 | Park et al. |
| 6,294,115 | B1 | 9/2001 | Blizard et al. |
| RE37,932 | E | 12/2002 | Baldwin et al. |
| 6,602,064 | B1 | 8/2003 | Chen et al. |
| 6,652,786 | B2 | 11/2003 | Sanyal |
| 6,693,241 | B2 | 2/2004 | Carlson et al. |
| 6,912,777 | B2 | 7/2005 | Carlson et al. |
| 8,575,488 | B2 | 11/2013 | Sugiyama et al. |
| 8,653,373 | B2 | 2/2014 | Sugiyama et al. |
| 8,859,901 | B2 | 10/2014 | Gundel |
| 9,040,824 | B2 | 5/2015 | Guetig et al. |
| 9,064,621 | B2 | 6/2015 | Kodama et al. |
| 9,070,992 | B2 | 6/2015 | Hemond et al. |
| 9,153,361 | B2 | 10/2015 | Watanabe et al. |
| 9,350,571 | B2 | 5/2016 | Watanabe et al. |
| 9,484,127 | B2 | 11/2016 | Sugiyama et al. |
| 9,646,740 | B2 | 5/2017 | Gundel |
| 9,853,342 | B2 | 12/2017 | Henry et al. |
| 9,865,378 | B2 | 1/2018 | Gundel |
| 9,985,332 | B2 | 5/2018 | Tsukahara et al. |
| 9,991,023 | B2 | 6/2018 | Buck et al. |
| 2004/0194996 | A1 | 10/2004 | Ysbrand |
| 2005/0008848 | A1 | 1/2005 | Saccomanno et al. |
| 2006/0131061 | A1 | 6/2006 | Seigerschmidt |
| 2007/0001789 | A1 | 1/2007 | Suarez-Gartner et al. |
| 2007/0108987 | A1 | 5/2007 | Satou et al. |
| 2009/0255706 | A1 | 10/2009 | Jiang et al. |
| 2011/0100682 | A1 | 5/2011 | Nonen et al. |
| 2012/0186850 | A1 | 7/2012 | Sugiyama et al. |
| 2013/0087361 | A1 | 4/2013 | Kaga et al. |
| 2013/0146326 | A1 | 6/2013 | Gundel et al. |
| 2013/0180752 | A1 | 7/2013 | Kodama et al. |
| 2013/0277090 | A1 | 10/2013 | Nordin et al. |
| 2014/0076608 | A1 | 3/2014 | Fukasaku |
| 2014/0090869 | A1 | 4/2014 | Kaga et al. |
| 2014/0182881 | A1 | 7/2014 | Huang et al. |
| 2014/0299348 | A1 | 10/2014 | Daumand |
| 2015/0003540 | A1 | 1/2015 | Watanabe et al. |
| 2015/0047874 | A1 | 2/2015 | Thuot et al. |
| 2015/0162113 | A1 | 6/2015 | Ishikawa et al. |
| 2015/0170800 | A1 | 6/2015 | Sugiyama |
| 2015/0294751 | A1 | 10/2015 | Shim et al. |
| 2015/0294761 | A1 | 10/2015 | Sugiyama et al. |
| 2016/0036112 | A1 | 2/2016 | Sugiyama et al. |
| 2016/0246021 | A1 | 8/2016 | Otte et al. |
| 2016/0351298 | A1 | 12/2016 | Gundel |
| 2016/0365175 | A1 | 12/2016 | Bennett et al. |
| 2017/0040088 | A1 | 2/2017 | Gundel et al. |
| 2017/0162300 | A1 | 6/2017 | Hasan et al. |
| 2018/0096755 | A1 | 4/2018 | Tsujino et al. |
| 2019/0097293 | A1 | 3/2019 | Dogiamis et al. |
| 2019/0198199 | A1 | 6/2019 | Gundel |
| 2019/0318841 | A1 | 10/2019 | Hornung et al. |
| 2020/0083578 | A1 * | 3/2020 | Yoshimoto ............. H01P 5/087 |
| 2021/0383946 | A1 | 12/2021 | Chuganey et al. |

FOREIGN PATENT DOCUMENTS

| | | | |
|---|---|---|---|
| CN | 103208336 | A | 7/2013 |
| CN | 105474329 | A | 4/2016 |
| CN | 105593730 | A | 5/2016 |
| CN | 106297982 | A | 1/2017 |
| CN | 107658056 | A | 2/2018 |
| CN | 211237751 | U | 8/2020 |
| EP | 0580777 | A1 | 2/1994 |
| EP | 0985511 | A2 | 3/2000 |
| EP | 2057640 | A1 | 5/2009 |
| EP | 3324481 | A1 | 5/2018 |
| JP | 06-203664 | A | 7/1994 |
| JP | 06-506724 | A | 7/1994 |
| JP | 2625576 | | 7/1997 |
| JP | 3013637 | | 2/2000 |
| JP | 2001-035270 | A | 2/2001 |
| JP | 2011-113933 | A | 6/2011 |
| JP | 2013-247011 | A | 12/2013 |
| JP | 2017-147551 | A | 8/2017 |
| KR | 10-0171911 | B1 | 3/1999 |
| TW | 295300 | U | 1/1997 |
| WO | 92/17533 | A1 | 10/1992 |
| WO | 2008/020694 | A1 | 2/2008 |
| WO | 2013/176710 | A1 | 11/2013 |
| WO | 2017/017354 | A1 | 2/2017 |
| WO | 2018/063388 | A1 | 4/2018 |
| WO | 2018/216636 | A1 | 11/2018 |

OTHER PUBLICATIONS

Chen et al., Gas Absorption with Filled Polymer Systems, Technical Papers and Presentations, MuCell Processes, Trexel Inc., https://www.trexel.com/techpp/gasabs.html, internet webpages dated Nov. 3, 2003, 9 pages.

Chen, et al., Effects of Shear Stress and Pressure Drop Rate on Microcellular Foaming Process, Technical Papers and Presentations, MuCell Processes, Trexel Inc., Internet webpages dated Nov. 3, 2003. 7 pages.

Heraeus Epurio—Conductive Polymers and Ultra-Pure Chemicals for New Advances in Electronics, Home page, https://www.heraeus.com/en/hep/home_ec/home_ec_page.html; 2 pages downloaded from the internet on May 23, 2019.

Heraeus Epurio Clevios (trademark), Clevios (trademark)—PEDOT:PSS, Technical Information; https://www.heraeus.com/en/hep/products_hep/clevios_prod/clevios_1.html, 2 pages, downloaded from internet May 23, 2019.

Hitachi Cable America Inc., High Data Rate Copper Based Direct Attach Cable Assemblies, 25-50-100-200-400 Gbit/s, Product Guide, May 2018, 20 pages.

Kyocera, Silver sintering paste; Semiconductor/Electronic Components Assembly Material; https://global.kyocera.com/prdct/chem/list/scmt/paste/sintering_paste/, 4 pages downloaded from the internet on May 23, 2019.

Liquid Wire, Technology—Liquid Wire, Inc., 2019, 1 page, https://liquidwire.io/technology, internet page dated May 23, 2019.

Shin, et al., Preparation of Silver Nanoparticles in Ultrasonic Vibration-Induced Nanodroplets of Isopropyl Alcohol in Combination with Ionic Liquids, Bull. Korean Chem. Soc, vol. 32, No. 5, 2011, 1583-1586.

Shin, Preparation of Silver Nanoparticles in Ultrasonic Vibration-Induced Nanodroplets of Isopropyl Alcohol in Combination with Ionic Liquids, Bull. Korean Chem. Soc., 2011, vol. 32, No. 5, 2011, 1583-1586.

Sugiyama et al., Analysis of the Intra-pair Skew Generation Factor in Copper Cable for 25 Gbit/s/ch Transmission, Cable Materials Company, Hitachi Metals, Ltd. vol. 30, 2014, 46-51, with English abstract.

(56) References Cited

OTHER PUBLICATIONS

Sugiyama, et al, Analysis of the Intra-pair Skew Generation Factor in Copper Cable for 25 Gbit/s/ch Transmission, Cable Materials Campany, Hitachi Metals, Ltd, vol. 30, 2014, 46-51.

* cited by examiner 138
120
140
136
158
119

68
142
144
146
56
65
148
149

118
150
152

126
122
124
134

154
171
157a
157b
159
159a
159b
161
163
156
T
L 154
156
157b
159b
171

154
156
157a
159a
163

154
156
157b
159b
171
A 154
156
157a
163
121a

RF WAVEGUIDE CABLE ASSEMBLY

CROSS-REFERENCE TO RELATED APPLICATIONS

This application is the National Stage Application of International Patent Application No. PCT/US2020/032790, filed May 14, 2020 which claims priority to U.S. Patent Application Ser. No. 62/847,785 filed May 14, 2019, U.S. Patent Application Ser. No. 62/847,756 filed May 14, 2019, PCT Application No. PCT/US2019/033915 filed May 24, 2019, U.S. Patent Application Ser. No. 62/971,315 filed Feb. 7, 2020, and U.S. Patent Application Ser. No. 63/004,441 filed Apr. 2, 2020, the disclosure of each of which is hereby incorporated by reference as if set forth in its entirety herein.

BACKGROUND

Waveguide-based electrical communication systems often include WR15 connector flanges, for instance MIL-DTL-3922/67E. Such flanges typically mate with a radio frequency (RF) waveguide, and mount to some other complementary electrical device such as a printed circuit board. Thus, the printed circuit board is placed in electrical communication with the waveguide through the flange. However, waveguide interconnects configured to mate with a flange are bulky and limited by size, mechanical inflexibility, and bulk. For instance, waveguide interconnects typically include a rotating member that is rotated with respect to the flange in order to mate the waveguide to the flange.

SUMMARY

In one aspect, a waveguide interconnect member is configured to releasably secure a dielectric waveguide to a complementary waveguide interconnect. The waveguide interconnect member can include a seat defining a seat defining a seat surface, a slider configured to translate along a longitudinal direction between an engaged position and a disengaged position, and a biasing member that extends from the seat surface to the slider. The biasing member can be configured to apply a biasing force to the slider that urges the slider to travel in the engagement position. The slider can define a first retention surface that partially defines a variable sized gap, such that translation of the slider in the engagement direction reduces a size of the variable sized gap, and translation of the slider in the disengagement direction increases the size of the variable sized gap.

BRIEF DESCRIPTION OF THE DRAWINGS

The foregoing summary, as well as the following detailed description of illustrative embodiments of the present application, will be better understood when read in conjunction with the appended drawings. For the purposes of illustrating the locking structures of the present application, there is shown in the drawings illustrative embodiments. It should be understood, however, that the application is not limited to the precise arrangements and instrumentalities shown. In the drawings:

FIG. 11, shown mounted to a complementary right-angle interconnect member that is mounted to a printed circuit board;

DETAILED DESCRIPTION

The present disclosure can be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the scope of the present disclosure. Also, as used herein, the singular forms "a," "an," and "the" include "at least one" and a plurality, unless otherwise indicated. Further, reference to a plurality as used herein includes the singular "a," "an," "one," and "the," and further includes "at least one" unless otherwise indicated. Further still, the term "at least one" can include the singular "a," "an," and "the," and further can include a plurality, unless otherwise indicated. Further yet, reference to a particular numerical value in the specification including the appended claims includes at least that particular value, unless otherwise indicated.

The term "plurality", as used herein, means more than one, such as two or more. When a range of values is expressed, another example includes from the one particular value and/or to the other particular value. The term "a" as used in a singular context can further apply to a "plurality" unless otherwise indicated. Conversely, the term "plurality" can further apply to a singular "one" unless otherwise indicated.

Figure 1A:
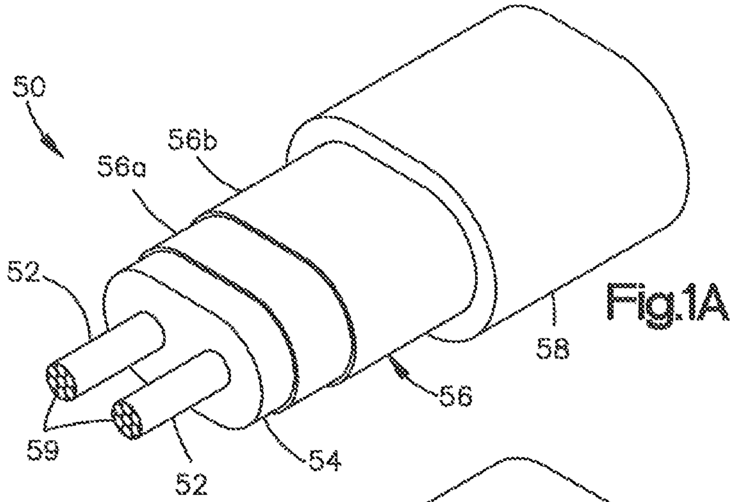
FIG. 1A is a perspective view of a stranded electrical cable constructed in one example, with portions removed for the purposes of illustration.
Figure 1B:
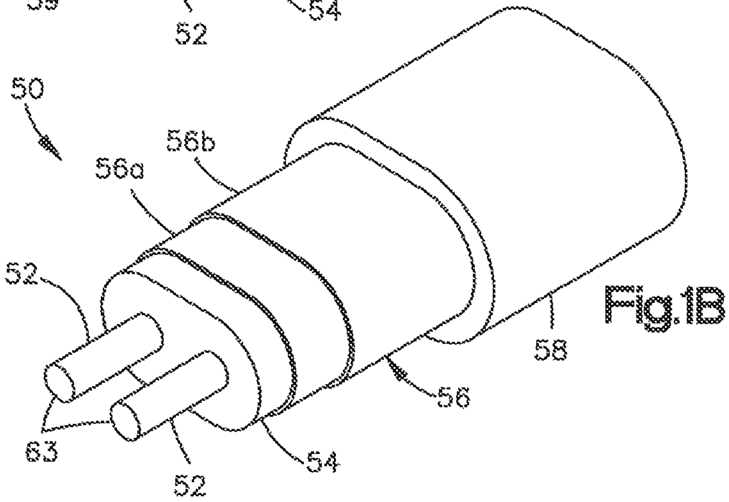
FIG. 1B is a perspective view of an unstranded electrical cable with portions removed for the purposes of illustration.

Referring to FIGS. 1A-1B, an electrical cable 50 in accordance with one embodiment includes at least one electrical conductor 52 and an inner electrical insulator 54 that is elongate along a central axis, and surrounds the at least one electrical conductor 52. As is described in more detail below, the electrical insulator 54 can be a foam. The electrical cable 50 can include an electrically conductive shield 56 that surrounds the inner electrical insulator 54, and an outer electrical insulator 58 that surrounds the electrical shield 56. The electrical shield 56 can provide electrical shielding, and in particular EMI (electromagnetic interference) shielding to the electrical conductor 52 during operation.

In one example, the electrical cable 50 can be configured as a twinaxial cable. Thus, the at least one electrical conductor 52 can include a pair of electrical conductors 52. The electrical conductors can be oriented substantially parallel to each other and spaced apart from each other. Further, the pair of electrical conductors 52 can define a differential signal pair. Accordingly, while the electrical cable 50 is described herein as a twinaxial cable, it should be appreciated that the electrical cable 50 can alternatively be configured as a coaxial cable whereby the at least one electrical conductor 52 is a single electrical conductor. However, it should further be recognized that the electrical cable 50 can include any number of electrical conductors as desired. When the electrical cable 50 includes a plurality of electrical conductors 52, the inner electrical insulator 54 can electrically insulate the electrical cables 50 from each other.

It is recognized that the electrical conductors 52 extend along respective lengths that can be measured along respective central axes of the electrical conductors 52. Similarly, the electrical insulator 54 extends along a respective length that can be measured along a central axis of the electrical cable 50. Further, the electrical shield 56 extends along a respective length that can be measured along the central axis of the electrical cable 50. Further still, the outer electrical insulator 58 extends along a respective length that can be measured along the central axis of the electrical cable 50. It is recognized that as fabricated, the respective lengths of the electrical conductors 52, the electrical insulator 54, the electrical shield 56, and the outer electrical insulator 58 can be substantially equal to each other. Further, the electrical shield 56 can surround the inner electrical insulator 46 along at least a majority of its respective length.

However, during use, it is recognized that the electrical conductors 52 can be mounted to electrical contacts of a complementary electrical device. Thus, the electrical conductors 52 can extend out with respect to one or more up to all of the inner electrical insulator 54, the electrical shield 56, and the outer electrical insulator 58. Accordingly, it can be said that the inner electrical insulator 54 surrounds the electrical conductors 52 along at least a majority of their respective lengths. Further, during use, it is recognized that the electrical shield can be mounted to at least one electrical contact of a complementary electrical device. Alternatively, the electrical cable 50 can include an electrically conductive drain wire that is mounted to an electrical contact of a complementary electrical device. Thus, the electrical shield 56 can extend out with respect to one or more up to all of the electrical conductors 52, the inner electrical insulator 54, and the outer electrical insulator 58. Accordingly, it can be said that the outer electrical insulator 58 surrounds the electrical shield 56 along at least a majority of its respective length. The term "at least a majority" can refer to 51% or more, including a substantial entirety.

With continuing reference to FIGS. 1A-1B, the electrically conductive shield 56 can include a first layer 56*a* that can surround and abut the inner electrical insulator 54, and a second layer 56*b* that can surround the first layer 56*a*. Alternatively, the electrically conductive shield can be configured as only a single layer that surrounds and abuts the inner electrical insulator 54 along at least a majority of its length. One or both of the first and second layers 56*a* and 56*b* can be made of any suitable electrically conductive material. For instance, the electrically conductive material can be a metal. Alternatively, the electrically conductive material can be an electrically conductive diamond-like carbon (DLC). The first layer 56*a* can be configured as an electrically conductive foil. For instance, the electrically conductive foil can be configured as a copper film that surrounds and abuts the inner electrical insulator 54. The copper film can have any suitable thickness as desired. In one example, the thickness can be in a range from approximately 0.0003 inch to approximately 0.001 inch. For instance, the range can be from approximately 0.0005 inch to approximately 0.0007 inch. In one specific example, the thickness can be approximately 0.0005 in. It has been found that the copper film can withstand large tensile forces, as can occur when the electrical cable 50 is bent. As described above, the inner electrical insulator 54 can be made from dielectric foam, which has a lower resistance to bending than its solid dielectric counterpart at the same thickness.

The second layer 56*b* can be configured as a film that surrounds and abuts the first layer 56*a*. The second layer 56*b* can be configured as a mylar film in one example. Alternatively, the electrical shield 56 can be configured as a braid. The electrical shield 56 can alternatively be configured as a flat wire, round wire, or any suitable shield as desired. In some examples, the electrical shield 56 can be configured as an electrically conductive or nonconductive lossy material.

In this regard, it will be appreciated that the electrical shield 56 can be suitable constructed in any manner as desired, including at least one electrically conductive layer. The at least one electrically conductive layer can be configured as a single electrically conductive layer, first and second electrically conductive layers, or more than two electrically conductive layers. In one example, the first electrically conductive layer 56*a* can be wrapped about the inner electrical insulator 54. For instance, the first electrically conductive layer 56*a* can be helically wrapped about the inner electrical insulator 54. Alternatively, the first electrically conductive layer 56*a* can be longitudinally wrapped about the inner electrical insulator 54 so as to define a longitudinal seam that extends along the direction of elongation of the inner electrical insulator 54. Further, the second electrically conductive layer 56*b* can be wrapped about the first electrically conductive layer 56*a*. For instance, the second electrically conductive layer 56*b* can be helically wrapped about the first electrically conductive layer 56*a*. Alternatively, the second electrically conductive layer 56*b* can be longitudinally wrapped about the first electrically conductive layer 56*a* so as to define a longitudinal seam that extends along the direction of elongation of the inner electrical insulator 54.

When the electrical shield 56 is configured as a single electrically conductive material, the single layer can be wrapped about the inner electrical insulator 54. For instance, the single layer can be helically wrapped about the inner electrical insulator 54. Alternatively, the single layer can be longitudinally wrapped about the inner electrical insulator 54 so as to define a longitudinal seam that extends along the direction of elongation of the inner electrical insulator 54. In another example, the electrical shield 56 can include or be defined by an electrically conductive coating that is applied to the radially outer surface of the inner electrical insulator 54 along at least a majority of the length of the inner electrical insulator. The coating can be metallic. For instance, the coating can be a silver coating. Alternatively the coating can be a copper coating. Alternatively still, the coating can be a gold coating. The outer electrical insulator 58 can surround and abut the second layer 56*b*.

Figure 3B:
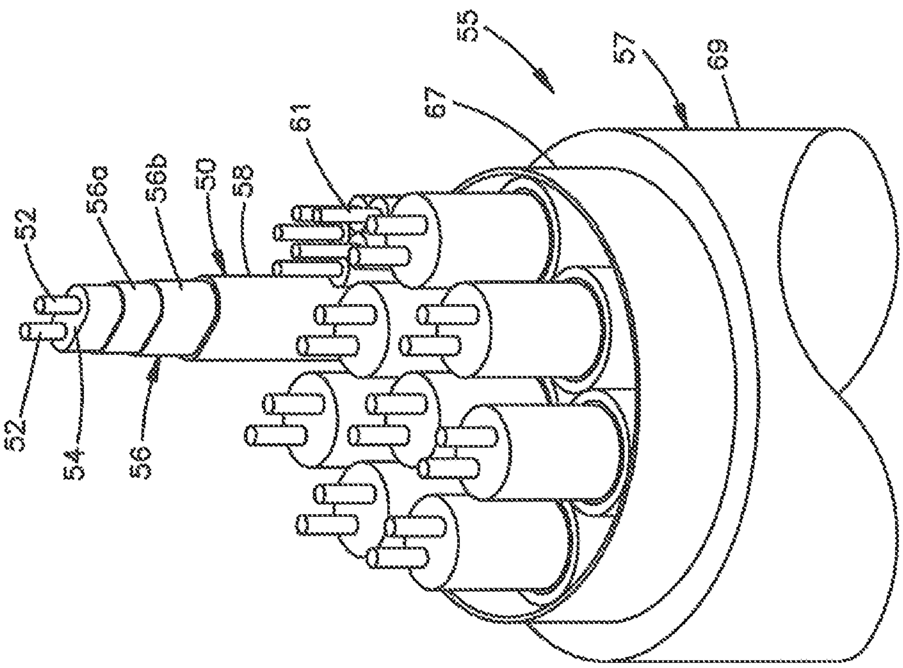
FIG. 3B is a perspective view of a bundle of electrical cables in accordance with one example.
Figure 3A:
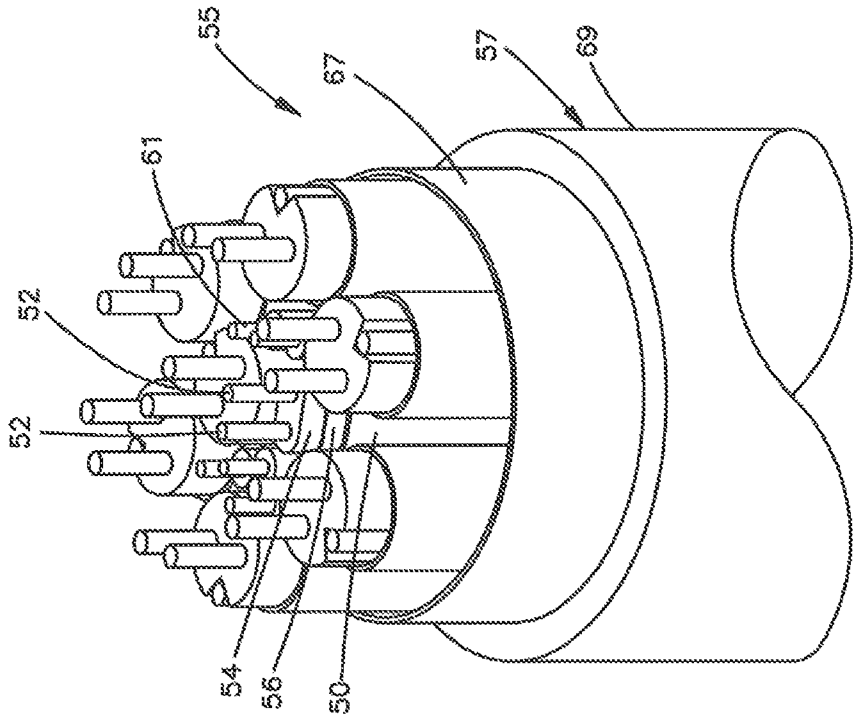
FIG. 3A is a perspective view of a bundle of electrical cables in accordance with one example.
Figure 3C:
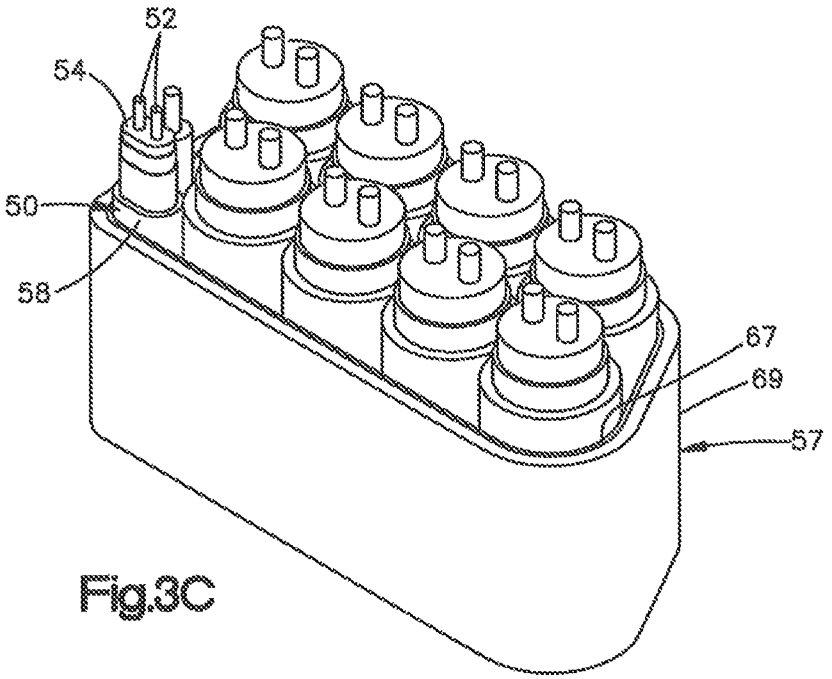
FIG. 3C is a perspective view of a bundle of electrical cables in accordance with one example.

Referring to FIGS. 3A-3C, a bundle 55 can be provided that includes a plurality of the electrical cables 50. For instance, as illustrated in FIGS. 3A and 3B, the electrical cables 50 can be arranged so as to define a round outer perimeter of the bundle 55. The bundle 55 can include an outer sleeve 57 and a plurality of the electrical cables 50 disposed in the outer sleeve 57. The outer sleeve 57 can include an electrical conductor 67 surrounded by an electrical insulator 69. The electrical conductor 67 can provide electrical shielding. It should be appreciated that the electrical conductor 67 can be configured as a metal or electrically conductive lossy material. Alternatively, the electrical conductor 67 can be replaced by an electrically nonconductive lossy material. In one example, the outer perimeter of the outer sleeve 57 can be substantially circular. Thus, a plurality of electrical cables 50 can be circumferentially arranged in the outer sleeve 57. Respective centers of the electrical conductors 52 of each of the electrical cables 50 can be spaced apart from each other along a direction. The bundle 55 can further include at least one coaxial cable 61 as desired. The coaxial cable 61 can include a single electrical conductor surrounded by an electrical insulator. The electrical insulator of the coaxial cable 61 can be configured as described herein with respect to the inner electrical insulator 54.

As illustrated in FIG. 3A, the direction of the respective electrical cables 50 can differ from circumferentially adjacent others of the electrical cables 50. In one example, the direction of at least one or more up to all of the circumferentially arranged cables 50 can be substantially tangent to the outer sleeve 57. For instance, the direction can be tangent to the outer sleeve at a location that intersects a line perpendicular to the direction and equidistantly spaced from the respective centers of the electrical conductors 52. As illustrated in FIG. 3B, the electrical cables 50 can be arranged in respective linear arrays of at least one electrical cable 50, such that the electrical conductors 52 of each of the electrical cables 50 along a linear array are aligned with each other. Otherwise stated, the direction that separates the electrical conductors 52 from each other can be the same direction along each linear array. Further, the direction of each of the linear arrays can be parallel to the direction of one or more up to all others of the linear arrays.

Referring to FIG. 3C, the bundle 55 can be elongate in cross-section. For instance, the outer sleeve 57 can surround two rows of electrical cables 50. Each row of electrical cable 50 can define a linear array along a direction that separates the respective centers of the electrical conductors 52 of each of the electrical cables 50 along the linear array from each other.

As illustrated in FIG. 1A, each of the electrical conductors 52 can be defined by a plurality of strands 59 that are disposed adjacent each other and in mechanical and electrical contact with each other. Otherwise stated, the electrical conductors 52 can be stranded. The strands 59 of each conductor 52 can be oriented substantially parallel to each other in one example. Alternatively, the strands 59 can be woven with each other, braided, or alternatively arranged as desired. Each electrical conductor 52 can include any suitable number of strands 59 as desired. For instance, the number of strands 59 can range from approximately 5 strands 59 to approximately 50 strands 59 as one example. In one example, the number of strands 59 can range from approximately 15 strands to approximately 30 strands. In certain specific examples, the number of strands 59 of each electrical conductor 52 can be approximately 7, approximately 19, or approximately 29. The strands can be cylindrical or alternatively shaped as desired. In some examples, the strands 59 can be fed into a sizing die so as to radially compress the strands against each other as desired. Alternatively, referring to FIG. 1B, the electrical conductors 52 can define a single unitary monolithic solid structure 63. Otherwise stated, the electrical conductor can be unstranded. The electrical conductor 52 can be cylindrical as desired.

The electrical conductors 52 can have any suitable size as desired. For instance, the electrical conductors 52 can have a size or gauge that ranges from approximately 25 American wire gauge (awg) to approximately 36 awg both when the electrical conductors 52 are stranded, and when the electrical conductors 52 are unstranded. Gauge size awg can be measured in accordance with any appropriate applicable standard, such as ASTM B258. Thus, it should be appreciated that the electrical conductors 52 can have a size that ranges from approximately 27 awg to approximately 29 awg or from approximately 31 awg to approximately 36 awg. When the electrical conductors 52 are unstranded, the electrical conductors 52 can have a gauge that ranges from approximately 26 awg to approximately 36 awg. When the electrical conductors 52 are stranded, the electrical conductors can have a gauge that is approximately 25 awg, ranges from approximately 27 aww to approximately 39 awg, or ranges from approximately 31 awg to approximately 36 awg. It should be appreciated that the sizes of the electrical conductors 52 are presented by way of example only, and the size of the conductors 52 should not be construed as limiting unless specifically so stated.

The electrical conductors 52, whether stranded or unstranded, can be provided as any one or more suitable electrically conductive material. The electrically conductive material can be a metal. For instance, the electrically conductive material can be at least one of copper, copper-nickel (CuNi), silver, tin, aluminum, any suitable alloy thereof, and any suitable alternative materials. Further, in one example, the electrical conductors 52 can include an electrically conductive plating. For example, the electrically conductive plating can be a metal. In one example, the electrically conductive plating can be at least one of copper, silver, aluminum, tin, any suitable alloy thereof, and any suitable alternative materials. In one specific example, the electrical conductors can be defined by a silver-plated coper alloy.

The outer electrical insulator 58 can be any suitable electrically insulative material. For instance, the outer electrical insulator 58 can be at least one of polyvinyl chloride (PVC), a polymer made of monomer tetrafluoroethylene, monomer hexafluoropropylene, and monomer vinylidene fluoride (THV), fluorinated ethylene propylene (FEP), perfluoroalkoxy (PFA), thermoplastic polyurethane (TPU), a sealable polymer tape, and a non-sealable polymer tape. Alternatively, the material can be any suitable polymer such as polyethylene or polypropylene. It should be appreciated that any alternative polymer capable of being foamed is also envisioned.

Figure 2:
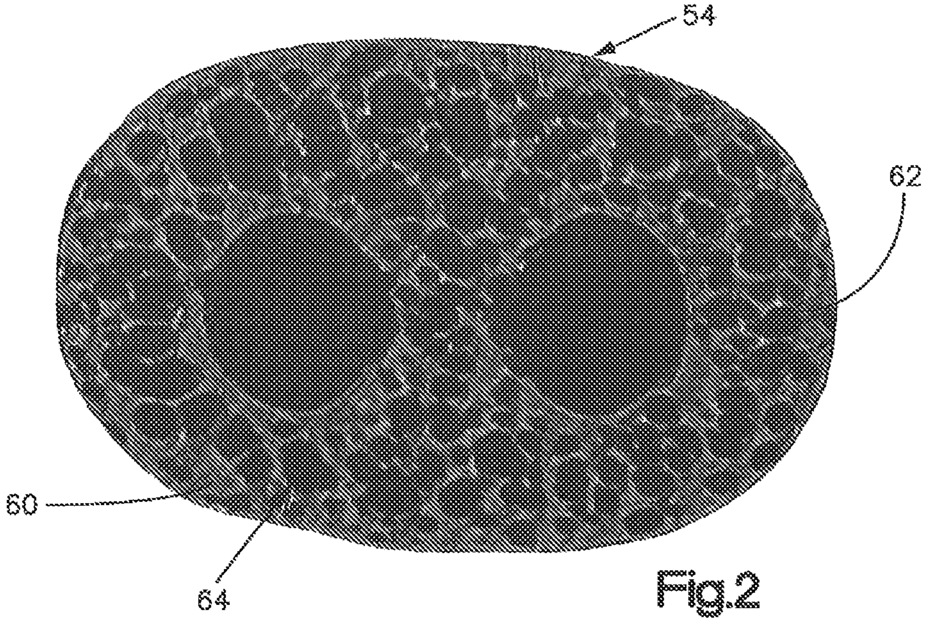
FIG. 2 is a SEM micrograph of a cross-section of an inner electrical insulator of the electrical cable illustrated in FIGS. 1A and 1B.

Referring now to FIG. 2, and as described above, the inner electrical insulator 54 can be a dielectric foam 62. As will be appreciated from the description below, the dielectric foam 62 can be extruded. For instance, the dielectric foam 62 can be coextruded with the electrical conductors. The inner electrical insulator 54 can include the dielectric foam 62 and a plurality of gaseous voids at least partially defined by the dielectric foam 62. The gaseous voids can thus be contained inside the electrical shield 56. For instance, a plurality of the gaseous voids can be defined by a matrix of pores 64 in the dielectric foam 62. In one example, all of the gaseous voids can be defined by the matrix of pores 64. Alternatively, one or more of the gaseous voids can be defined by air pockets that are defined between the dielectric foam 62 and the electrical shield 26 as desired. Thus, the dielectric foam can include only a single electrically insulative material 60 that defines the matrix of pores 64 so as to define the dielectric foam 62. The pores 64 can include a first gas. For instance, the pores 64 can include only the first gas in some examples. The gaseous voids defined between the dielectric foam 62 and the electrical shield 56, if present, can include a second gas different than the first gas. For instance, an entirety of the gaseous voids defined between the dielectric foam 62 and the electrical shield 56 can include only the second gas. It should therefore be appreciated that the electrical cable 50 can include only a single electrically insulative material 60 inside the electrical shield 60 and the gaseous voids.

In some examples, the inner electrical insulator 54 can be a coextruded unitary monolithic structure that surrounds each of the electrical conductors 52, as opposed to first and second discrete electrical insulators that surround respective ones of the electrical conductors 52. The electrically insulative material 60 can be any suitable insulator. In one example, the electrically insulative material 60, and thus the foam, can be a fluoropolymer. The fluoropolymer can, for instance, be a fluorinated ethylene propylene (FEP) or a perfluoroalkoxy alkane. In one example, the fluoropolymer can be Teflon™. It is recognized that the dielectric foam 62 can be fabricated by introducing a foaming agent into the electrically insulative material 60. In one example, the foaming agent can be nitrogen. Alternatively, the foaming agent can be argon. It should be appreciated, of course, that any suitable alternative foaming agent can be used.

Figure 4:
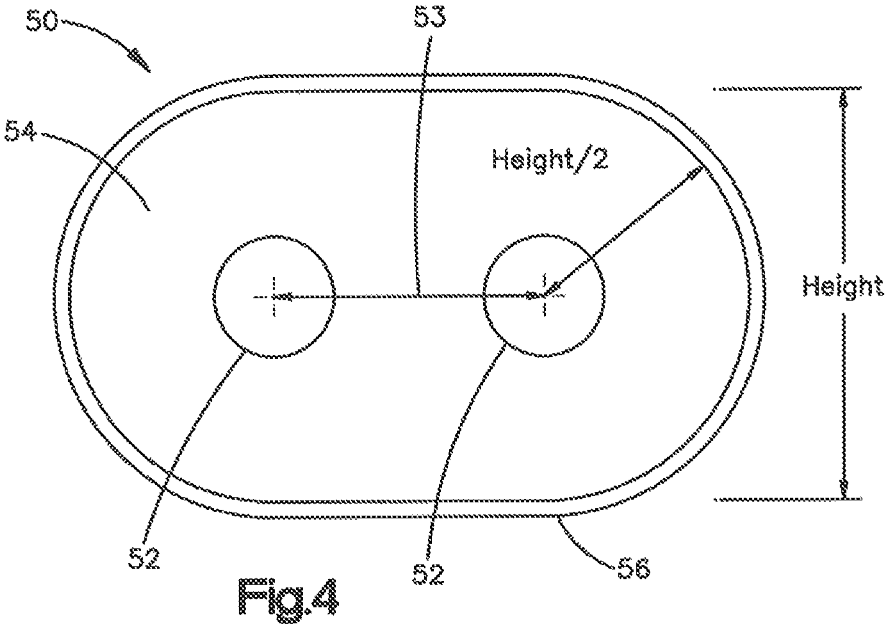
FIG. 4 is a schematic cross-sectional view of the cables illustrated in FIGS. 1A and 1B, with portions removed for illustrative purposes.

Referring now to FIG. 4, the electrical cable 50 is shown with the outer electrical insulator removed, to show various dimensions of the electrical cable, whereby the height and the width are of the electrical shield 56. The inner electrical insulator 54 can be substantially oval or substantially race-track shaped in a plane that is oriented perpendicular to one or both of the central axes, and thus lengths, of the electrical conductors 52 and the central axis, and thus length, of the electrical cable 50. As a result, the electrical shield 56 can be in mechanical contact with a substantial entirety of the outer perimeter of the inner electrical insulator 54. The respective centers of the electrical conductors 52 are spaced from each other any suitable separation distance 53, or pitch, as desired along a direction.

The separation distance 53 can range from approximately 0.01 inch to approximately 0.035 inch. In one example, the separation distance 53 can range from approximately 0.01 inch to approximately 0.02 inch. When the electrical cable 50 is approximately 34 gauge awg, the separation distance 53 can be approximately 0.012 inch. The electrical shield 56 can have a height that ranges from approximately 0.017 inch to approximately 0.06 inch. For instance, the height of the electrical shield 56 can be approximately 0.021 when the electrical cable 50 is approximately 34 gauge awg. The height can be measured in cross-section perpendicular to the separation distance 53 that separates the electrical conductors 52. For instance, the height can be measured in a plane that is oriented perpendicular to the central axis of the electrical cable 50, and thus is also oriented perpendicular to the central axes of the electrical conductors 52. The electrical shield 56 can have a width that ranges from approximately 0.026 inch to approximately 0.095. For instance, the width of the electrical shield 56 can be approximately 0.0338 when the electrical cable 50 is approximately 34 gauge awg. When the electrical cable is approximately 33 gauge, the width of the electrical shield 56 can be approximately 37.4. The width can be measured in cross-section coextensive with the separation distance 53. For instance, the width can be measured in a plane that is oriented perpendicular to the central axis of the electrical cable 50, and thus is also oriented perpendicular to the central axes of the electrical conductors 52. Each of electrical conductors 52 can have a maximum cross-sectional dimension that ranges from approximately 0.005 inch to approximately 0.018. inch. For instance, the maximum cross-sectional dimension can be approximately 0.006 inch when the electrical cable 50 is approximately 34 gauge awg. Respective ends of the electrical shield 56 in cross-section can be defined by a swept radius from the respective centers of the electrical signal conductors 52. The radius can equal one-half the height of the electrical shield 56. The cross-section is in a plane that is perpendicular to the central axes of the electrical conductors 52.

Figure 5:
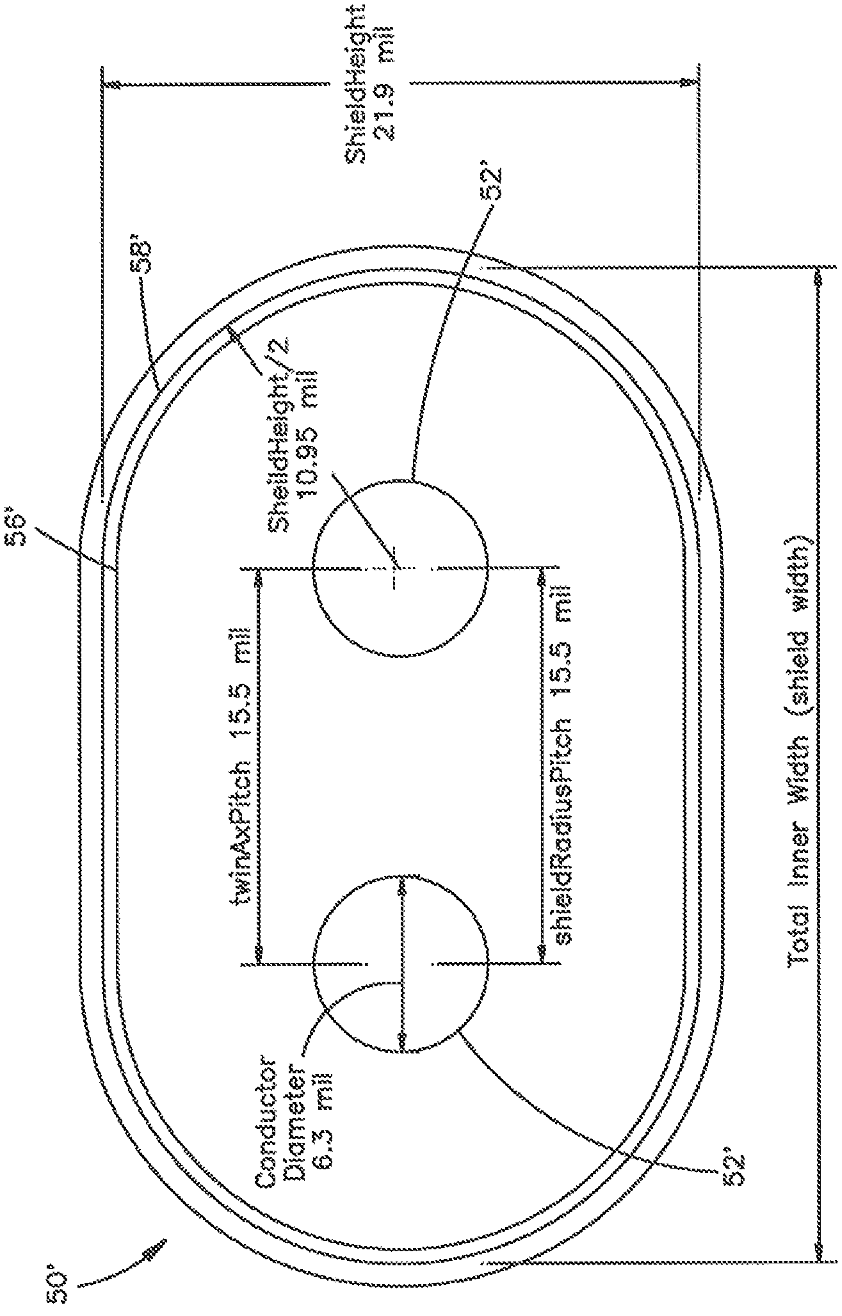
FIG. 5 is a schematic cross-sectional view of an electrical cable otherwise identical to the cable illustrated in FIG. 4, but including a solid inner electrical insulator instead of a foamed inner electrical insulator.

Referring now to FIGS. 4-5, the electrical cable 50 of a given gauge size can be smaller than an otherwise identical electrical cable 50' of the same gauge size but whose inner electrical insulator 54' is of the same electrically insulative material, but solid as opposed to foamed. The otherwise identical electrical cable 50' thus includes a pair of electrical conductors 52', an insulator 54', a shield 56', and an outer electrical insulator 58'. All parts of the otherwise identical electrical cable 50' are the same as the electrical cable 50 with the exception of the inner electrical insulator 54'. Further, as will be described in more detail below, certain dimensions and/or the electrical performance of the otherwise identical electrical cable 50' can vary from that of the electrical cable 50 due to the difference between the foamed inner electrical insulator 54 of the electrical cable 50 and the foamed inner electrical insulator 54' of the otherwise identical electrical cable 50'.

The foamed inner electrical insulator 54 of the electrical cable 50 can have a reduced thickness than that of the solid electrical insulator 54' of the otherwise identical electrical cable 50' at respective same locations of the foamed electrical insulator 54 and the solid electrical insulator 54'. Accordingly, the electrical cable 50 can have a reduced cross-sectional size with respect to the otherwise identical electrical cable 50'. For instance, one or both of the height and width of the electrical cable 50 can be less than one or both of the height and width, respectively, of the otherwise identical electrical cable 50' when the electrical conductors 52 are the same gauge as the electrical conductors 52' of the otherwise identical electrical cable 50'. Accordingly as described in more detail below, the electrical cable 50 can be similarly sized with respect to the otherwise identical electrical cable 50', but can exhibit improved electrical performance, such as reduced insertion loss, with respect to the otherwise identical electrical cable 50'. Further, the electrical cable 50 can sized smaller than the otherwise identical electrical cable 50', but can exhibit the same or better electrical performance, such as reduced insertion loss, with respect to the otherwise identical electrical cable 50'. For instance, as will be described in more detail below, the electrical cable 50 whose conductors 52 are approximately 35 gauge awg can exhibit less insertion loss than the otherwise identical electrical cable whose conductors are approximately 34 gauge awg. Further still, the electrical cable 50 can be constructed with electrical conductors 52 having a reduced gauge (i.e., greater size in cross-section) than the electrical conductors 52' of the otherwise identical connector 50', while the width of the electrical shield 56 is approximately equal to the width of the electrical shield 56' of the otherwise identical electrical cable 50. Thus, when a plurality of the electrical cables 50 form a ribbon along the width direction, increased performance can be achieved without widening an otherwise identical ribbon that includes the otherwise identical electrical cable 50'.

Referring to FIGS. 1A-2, the pores 64 of the dielectric foam 62 can be disposed circumferentially about each of the electrical conductors 52. The pores 64 provide electrical insulation while at the same time presenting a lower the dielectric constant Dk than the electrically insulative material 60. In this regard, it can be desirable to fabricate the electrical cable 50 so as to limit the number of open pores 64, meaning those pores that are not fully enclosed by the electrically insulative material 60. Thus, the electrical cable 50 can be fabricated such that a majority of the pores 64 can be fully enclosed by the electrically insulative material 60. In one example, at least approximately 80% of the pores 64 can be fully enclosed by the electrically insulative material 60. For instance, at least approximately 90% of the pores 64 can be fully enclosed by the electrically insulative material 60. In particular, at least approximately 95% of the pores 64 can be fully enclosed by the electrically insulative material 60. For example, substantially all of the pores 64 can be fully enclosed by the electrically insulative material 60.

Further, the electrical cable 50 can be fabricated such that one or both of the radially inner perimeter and the radially outer perimeter of the inner electrical insulator 54 are defined by respective radially inner and outer surfaces that are substantially continuous and uninterrupted by open pores 64. In this regard, the inner electrical insulator 54 can be geometrically divided into a radially inner half and a radially outer half. The radially inner half defines the radially inner perimeter and surface. The radially outer half defines the radially outer perimeter and surface.

In one example, at least approximately 80% of the pores disposed in the radially outer half of the inner electrical insulator 34 are fully enclosed by the electrically insulative material. For instance, at least approximately 90% of the pores 64 disposed in the radially outer half of the inner electrical insulator 34 can be fully enclosed by the electrically insulative material 60. In particular, at least approximately 95% of the pores 64 disposed in the radially outer half of the inner electrical insulator 34 can be fully enclosed by the electrically insulative material 60. For example, substantially all of the pores 64 disposed in the radially outer half of the inner electrical insulator 34 can be fully enclosed by the electrically insulative material 60.

Similarly, in one example, at least approximately 80% of the pores disposed in the radially inner half of the inner electrical insulator 34 are fully enclosed by the electrically insulative material. For instance, at least approximately 90% of the pores 64 disposed in the radially inner half of the inner electrical insulator 34 can be fully enclosed by the electrically insulative material 60. In particular, at least approximately 95% of the pores 64 disposed in the radially inner half of the inner electrical insulator 34 can be fully enclosed by the electrically insulative material 60. For example, substantially all of the pores 64 disposed in the radially inner half of the inner electrical insulator 34 can be fully enclosed by the electrically insulative material 60.

The pores 64 can be distributed substantially uniformly about each of the electrical conductors 52. For instance, substantially all straight lines along a cross-sectional plane that extend radially outward from the center of either of the electrical conductors 52 intersects at least one pore 64. For instance, substantially all straight lines along a cross-sectional plane that extend radially outward from the center of either of the electrical conductors 52 can intersect at least two pores 64. The pores 64 can have any suitable average void volume as desired that provides for the substantial uniformity and also imparts the desired dielectric constant to the inner electrical insulator 54. In one example, the average void volume of the pores 64 can be less than the wall thickness of the inner electrical insulator. The inner wall thickness can be defined as the thickness from each of the electrical conductors 52 to either the outer perimeter of the inner electrical insulator 54, or the thickness of the inner electrical insulator that extends between the electrical conductors 52. In one example, the average void volume of the pores 64 can be less than approximately 50% of the wall thickness. For instance, the average void volume of the pores 64 can be less than or equal to approximately one-third of the wall thickness. The pores 64 can define a void volume that ranges from approximately 10% to approximately 80% of the total volume of the inner electrical insulator 34. For instance, the void volume can range from approximately 40% to approximately 70% of the total volume of the inner electrical insulator 34. In particular, the void volume can be approximately 50% of the total volume of the inner electrical insulator 34.

Thus, the pores 64 can reduce the dielectric constant of the dielectric foam 62 to a lower dielectric constant Dk than that of the electrically insulative material 60 in solid form (i.e., without the pores 64). Otherwise stated the dielectric foam 62 can have a lower dielectric constant Dk than the insulative material 60. The dielectric constant Dk of the dielectric foam 62 can be reduced by increasing the volume of pores 64 in the electrically insulative material. Conversely, the dielectric constant Dk of the dielectric foam 62 can be increased by decreasing the total volume of pores 64 in the electrically insulative material.

It has been found that reducing the dielectric constant Dk of the dielectric foam 62 can allow electrical signals to travel along the electrical conductors 52 at higher data transfer speeds. However, it has been further found that as the dielectric constant Dk decreases, the mechanical strength of the electrical insulator 54 can decrease due to the higher percentage of air or other gas relative to electrically insulative material 60. Further, as the dielectric constant Dk decreases, the electrical stability of the electrical signals traveling along the electrical conductors 52 can decrease. In one example, the electrically insulative material and total volume of pores 64 can be chosen such that the dielectric constant Dk of the dielectric foam 62 can range from 1.2 up to, but not including, the dielectric constant Dk of the electrically insulative material 60. When the electrically insulative material is Teflon™, for instance, the dielectric constant Dk of the dielectric foam 62 can range from approximately 1.2 Dk to approximately 2.0 Dk. In one example, the dielectric constant can range from approximately 1.3 Dk to approximately 1.6 Dk, it being appreciated that increasing the pore volume in the foam 62 can reduce the dielectric constant Dk of the foam 62. For example, the dielectric constant Dk of the dielectric foam 62 can range from approximately 1.3 Dk to approximately 1.5 Dk. Thus, the dielectric constant Dk of the dielectric foam 62 can be less than or approximately equal to 1.5 Dk. In some examples, the dielectric constant can be approximately 1.5 Dk.

It is recognized that the delay of the electrical signals being transmitted along the electrical conductors 52 (also known as propagation delay) is proportional to the dielectric constant Dk of the inner electrical insulator 54. In particular, propagation delay (nanoseconds per foot) can equal 1.0167 times the square root of the dielectric constant Dk of the inner electrical insulator 54. Thus, the propagation delay can range from approximately 1.16 ns/ft to approximately 1.29 ns/ft. For instance, the propagation delay can range from approximately 1.16 ns/ft to approximately 1.245 ns/ft. In this regard, when the dielectric constant Dk of the dielectric foam 62 is approximately 1.3, the propagation delay can be approximately 1.16 ns/ft. When the dielectric constant Dk of the dielectric foam 62 is approximately 1.4, the propagation delay can be approximately 1.21 ns/ft. When the dielectric constant Dk of the dielectric foam 62 is approximately 1.5, the propagation delay can be approximately 1.245 ns/ft. When the dielectric constant Dk of the dielectric foam 62 is approximately 1.6, the propagation delay can be approximately 1.29 ns/ft.

As described above, the electrical cable 50 with the foamed inner electrical insulator 54 can have improved electrical performance with respect to the otherwise identical electrical cable 50' whose inner electrical insulator 54' is made of the solid electrically insulative material 60, as shown in FIG. 5. For instance, the electrical cable 50 with the foamed inner electrical insulator 54 can have reduced insertion losses with respect to the otherwise identical electrical cable 50' whose inner electrical insulator 54 is made of the solid electrically insulative material 60. The reduced insertion losses can allow the size of the electrical conductors 52 to be reduced with respect to the otherwise identical electrical cable 50. It is appreciated that when the size of the electrical conductors 52 is reduced, the size of the electrical cable 50 can be reduced. As one example, when the electrical conductors 52 are 34 gauge, 1024 electrical cables 50 conventionally fit through a 1RU panel. When the electrical conductors 52 are higher than 34 gauge, more than 1024 electrical cables 50 can fit through a 1RU panel.

In one example, the electrical cable 50 whose electrical conductors 52 have a first gauge size can be configured to transmit data signals along the electrical conductors 52 at a first frequency having a first level of insertion loss. The first level of insertion loss can be substantially equal to or less than a second level of insertion loss of the otherwise identical second electrical cable 50' conducting data signals along the electrical conductors 52' of a second gauge size at the same first frequency. Further, each of the cables 50 and 50' can have an impedance of approximately 100 ohms.

In one example, the first gauge size can be substantially equal to the second gauge size, and the first level of insertion loss can be less than the second level of insertion loss. In another example, the first gauge size can be greater than the second gauge size, and the first level of insertion loss can be substantially equal to the second level of insertion loss. In another example still, the first gauge size can be greater than the second gauge size, and the first level of insertion loss can less than the second level of insertion loss.

For instance, it has been found that when the first gauge size is approximately 34 awg, the electrical cable 50 can be configured to transmit electrical signals along the electrical conductors 52 at the first frequency of approximately 20 GHz with the first level of insertion loss no greater (that is, the negative number indicating a loss is no greater) than approximately −8 dB. When the electrical conductors 52' of the otherwise identical electrical cable 50' has the second gauge size equal to the first gauge size of approximately 34 awg, the otherwise identical electrical cable 50' transmits electrical signals along the electrical conductors 52' at the first frequency of approximately 20 GHz with the second level of insertion loss of approximately −9 dB.

For instance, it has been found that when the first gauge size is approximately 34 awg, the electrical cable can be configured to transmit electrical signals along the electrical conductors 52 at the first frequency of approximately 20 GHz with an insertion loss no greater (that is, the negative number indicating a loss is no greater) than approximately −7.7 dB. When the electrical conductors 52' of the otherwise identical electrical cable 50' has the second gauge size equal to the first gauge size of approximately 34 awg, the otherwise identical electrical cable 50' transmits electrical signals along the electrical conductors 52' at the first frequency of approximately 20 GHz with the second level of insertion loss of approximately −9 dB. Thus, the first level of insertion loss can be approximately 15% less than the second level of insertion loss.

In another example, when the electrical conductors 52 have a first gauge size of approximately 35 awg, and thus greater than the second gauge size, the electrical cable 50 can be configured to transmit electrical signals along the electrical conductors 52 at the first frequency of approximately 20 GHz with the first level of insertion loss no greater than approximately −8.6 dB. Accordingly, when the first gauge size is greater than the second gauge size at the same frequency and impedance, the insertion loss of the electrical cable 50 can be less than the insertion loss of the otherwise identical electrical cable 50'. For instance, the first level of insertion loss can be approximately 5% less than the second level of insertion loss. In this example, the first gauge size is greater than the second gauge size by approximately one awg.

In still another example, when the electrical conductors 52 have a first gauge size of approximately 36 awg, and thus greater than the second gauge size by approximately two gauge sizes awg, the electrical cable 50 can be configured to transmit electrical signals along the electrical conductors 52 at the first frequency of approximately 20 GHz with the first level of insertion loss no greater than the second level of insertion loss. Accordingly, when the first gauge size can be greater than the second gauge size at the same frequency and impedance, the insertion loss of the electrical cable 50 can be substantially equal than the second level of insertion loss of the otherwise identical electrical cable 50'. In this example, the first gauge size is greater than the second gauge size by more than approximately one awg, which can be referred to as a plurality of gauge sizes awg. Thus, the first gauge size can be a plurality of gauge sizes less than the second gauge size while maintaining substantially the same level of insertion loss at 20 GHz and at 100 ohms impedance.

Thus, the electrical conductors 52' of the otherwise identical second electrical cable 50' can have a second gauge size that is at least approximately one gauge size awg less than the first gauge size. For instance, the second gauge size can be a plurality of gauge sizes awg less than the first gauge size. Further, the inner electrical insulator of the otherwise identical second electrical cable 50' can include the electrically insulative material 60 that is unfoamed and solid. For instance, the inner electrical insulator 54' of the otherwise identical second electrical cable 50' can be made of only the solid unfoamed electrically conductive material 60. Thus, the electrical cable 50 can be sized smaller than the otherwise identical second electrical cable 50' while providing electrical performance that is no worse than the otherwise identical second electrical cable when both cables 50 conduct electrical signals the substantially same frequency within a range of frequencies at the substantially the same impedance.

When the first gauge size is greater than the second gauge size, it will be appreciated that one or both of the height and width of the electrical cable 50 can be less than that of the otherwise identical electrical cable 50'. Thus, when the first gauge size is greater than the second gauge size, it will be appreciated that one or both of the height and width of the electrical shield 56 can be less than that of the electrical shield 56' of the otherwise identical electrical cable 50'. Further, it is further appreciated as described above that when the first gauge size is less than the second gauge size, one of the height and the width of the electrical shield 56 of the electrical cable can be substantially equal to the width of the electrical shield 56' of the otherwise identical cable 50'. Thus, when the first gauge size is less than the second gauge size, one of the height and the width of the electrical cable 50 can be substantially equal to the width of the otherwise identical cable 50'. For instance, when the first gauge size is one gauge size awg less than the second gauge size, the width of the electrical shield 56 and thus the electrical cable 50 can be substantially equal to the width of the electrical shield 56' and thus the otherwise identical cable 50'.

In one example, when the first gauge size is 32 and the second gauge size is 33, the electrical cable 50 can define approximately the same width of the otherwise identical electrical cable 50'. Similarly when the first gauge size is approximately 33 awg and the second gauge size is approximately 34 awg, the electrical cable 50 and the otherwise identical electrical cable 50' can define approximately the same width. In this regard, it is recognized that when the first gauge size is approximately 33 awg, and the electrical cable 50 has approximately 100 ohm impedance, when the electrical cable 50 transmits signals at 20 GHz along the electrical conductors, the insertion loss can be approximately −6.9 dB. Thus, when the first gauge size is approximately 33 awg, and the electrical cable 50 has approximately 100 ohm impedance, when the electrical cable 50 transmits signals at 20 GHz along the electrical conductors, the insertion loss can be less than the insertion loss of the otherwise identical electrical cable 50' when transmitting signals at 20 GHz along the electrical conductors 52 at approximately 34 awg, and the otherwise identical electrical cable 50' has approximately 100 ohm impedance.

Similarly, when the first gauge size is 34 and the second gauge size is 35, the electrical cable 50 and the otherwise identical electrical cable 50' can define approximately the same width. Further, when the first gauge size is 35 and the second gauge size is 36, the electrical cable 50 and the otherwise identical electrical cable 50' can define approximately the same width.

Further still, when the first gauge size is approximately 32 awg and the second gauge size is approximately 33 awg, the electrical shield of the electrical cable 50 can define approximately the same width of the electrical shield 56' of the otherwise identical electrical cable 50'. Similarly when the first gauge size is approximately 33 awg and the second gauge size is approximately 34 awg, the electrical shield of the electrical cable 50 can define approximately the same width of the electrical shield 56' of the otherwise identical electrical cable 50'. Similarly, when the first gauge size is 34 and the second gauge size is 35, the electrical shield of the electrical cable 50 can define approximately the same width of the electrical shield 56' of the otherwise identical electrical cable 50'. Further, when the first gauge size is 35 and the second gauge size is 36, the electrical shield of the electrical cable 50 can define approximately the same width of the electrical shield 56' of the otherwise identical electrical cable 50'.

As other examples of improved electrical performance of the electrical cable 50, the electrical cable 50 can be configured to transmit electrical signals along the electrical conductors 52 at a frequency of approximately 8 GHz along an approximately five foot length of the electrical conductors 52. When the electrical conductors 52 have a gauge of 26 awg, the transmitted electrical signals can have an insertion loss that is between approximately 0 dB and approximately −3 dB. Further, the electrical conductors 52 can be solid and unstranded.

In another example, when the electrical conductors 52 have a gauge of approximately 36 awg and the and a length of approximately five feet, the electrical cable 50 can be configured to transmit electrical signals along the electrical conductors at a frequency up to approximately 50 GHz with an insertion loss between approximately 0 dB to approximately −25 dB. The electrical conductors 52 can be solid and unstranded.

In a further example, when the electrical conductors 52 have a gauge of approximately 35 awg and a length of approximately 0.45 meter, the electrical cable is configured to transmit electrical signals along the electrical conductors 52 at approximately 112 gigabits per second with an insertion loss no worse than −5 decibels at approximately 28 GHz or less.

In yet another example, when the electrical conductors 52 have a gauge of approximately 33 awg and a length of approximately 0.6 meter, the electrical cable 50 is configured to transmit electrical signals along the electrical conductors 52 at approximately 112 gigabits per second with an insertion loss no worse than −5 decibels at approximately 28 GHz or less.

Further, electrical signals travelling along the electrical conductors 52 at frequencies up to approximately 50 GHz can operate without any insertion losses that vary more than 1 dB within a frequency delta of 0.5 GHz. That is, in this example, at any frequency up to 50 GHz, the frequencies of the electrical signals that vary less than 0.5 GHz from each other will not have respective insertion losses that differ by more than 1 dB.

The electrical cable 50 can further operate with reduced skew. Skew can occur when the electrical signals traveling from along a length of the electrical conductors 52 of the cable 50 can reach the end of the length at different times. The skew of electrical signals traveling along the electrical cable 50 has been tested per one meter of length of the electrical conductors 52. For instance, the method of testing included cutting the electrical cable 50 to a specified length, and precision cutting one end of the cable to define a blunt and square end. The cable 50 was then placed into a fixture apparatus that retained the cable 50 in a substantially straight orientation. Next, the cut end of the cable was put into tooling and connected to a printed circuit board to which a solderless test fixture was mounted. The test instrumentation was then calibrated, and signals were applied to the electrical conductors 52 at a specified frequency, and skew was measured.

It was found in one example that the electrical conductors 52 of the electrical cable 50 can conduct electrical signals at 14 Gigabits per second while compliant with NRZ line code with no more than approximately 14 picoseconds per meter of skew. For instance, the electrical conductors 52 can conduct electrical signals at 28 Gigabits per second while compliant with NRZ line code with no more than approximately 7 picoseconds per meter of skew. In particular, the electrical conductors 52 can conduct electrical signals at 56 Gigabits per second while compliant with NRZ line code with no more than approximately 3.5 picoseconds per meter of skew. In one particular example, the electrical conductors 52 can conduct electrical signals at 128 Gigabits per second while compliant with NRZ line code with no more than approximately 1.75 picoseconds per meter of skew.

Referring now to FIGS. 6A-6D, a system 70 and method can be provided for fabricating the electrical cable 50 as described herein. The system 70 can include a payoff station 72 that is configured to support a length of electrical conductors 52. The system can further include a tensioner 74 that receives the electrical conductors 52 from the payoff station 72, and applies tension to the electrical conductors 52 as they translate in a forward direction to a cable accumulator station 75. The electrical conductors 52 can be maintained in tension from the tensioner 74 to the accumulator station 75. The electrical conductors 52 can translate at any suitable speed as desired. In one example, the electrical conductors 52 can translate at a line speed that ranges from approximately 30 feet per minute to approximately 40 feet per minute. The tension applied to the electrical conductors 52 can maintain the electrical conductors in a predetermined spatial relationship relative to each other. For instance, the electrical conductors 52 can be maintained substantially parallel to each other as they extend in the forward direction.

The system 70 can further include a hopper 76 that receives pellets of the electrically insulative material, and an extruder 78 that is configured to receive the pellets from the hopper 76. The electrically insulative material can include a suitable nucleating agent. The extruder 78 is configured to produce molten electrically insulative material from the pellets. The system can further include a gas injector that is coupled to the extruder 78 and configured to introduce the foaming agent into the molten electrically insulative material 60 to produce gas-infused molten electrically insulative material 60. In particular, the foaming agent can be dissolved into the molten electrically conductive material. In one example, the foaming agent can be introduced into the molten electrically insulative material at a pressure that is from approximately 1 to approximately 3 times that of the molten electrically insulative material. For instance, the pressure is from approximately 1.5 to approximately 2 times that of the molten electrically insulative material. In particular, the pressure can be approximately 1.8 times that of the molten electrically insulative material.

The system 70 can further include a cross-head 80 that is configured to receive the gas-infused molten electrically insulative material 60. Thus, the step of surrounding and coating the electrical cables with the molten electrically insulative material 60 can be performed after the step of introducing the foaming agent into the molten electrically insulative material. In some examples, it is envisioned that the foaming agent can be introduced into the molten electrically conductive material 60 in the cross head 80. The electrical conductors 52 can travel from the tensioner through the cross-head, which causes the electrical conductors 52 to be coated with the molten electrically conductive material. The molten electrically conductive material further adheres to the electrical conductors. As the electrical conductors 52 exit the cross-head 80, the pores can be generated in the electrically insulative material 60, so as to produce the foam.

The cross-head 80 can include a die 82 that has an inner surface 84 that, in turn, defines an internal void 86. The cross-head 80 can further include a tip 88 that is supported at least partially or entirely in the internal void 86. The electrical conductors 52 can be directed through a conduit 87 that extends forward into the head 80, and subsequently through the tip 88 that is aligned with the conduit 87. The cross-head 80 can define a channel 90 that extends from the inner surface 84 of the die 82 and the tip 88. In one example, the channel 90 can surround an entirety of the tip 88 in a plane that is oriented perpendicular to the forward direction. The tip 88 can define an inlet 92 that receives the electrical cables 52. The inlet 92 can be spaced from the die 82 in a rearward direction that is opposite the forward direction. The tip 88 can define an outlet 94 that is opposite the inlet 92 in the forward direction, and is disposed in the die 82. The electrical cables 52 can thus be translated through the tip 88 from the inlet 92 to the outlet 94. The gas-infused molten electrically insulative material can be directed from an injector 95 into a conduit 97 that is in fluid communication with an inlet 92 of the die 82. Thus, the gas-infused molten electrically insulative material can travel from the conduit 97 and into the channel 90 through the inlet 92 at a location upstream of the outlet 94 of the tip 88. The gas-infused molten electrically insulative material can be at a temperature that ranges from approximately 200 F to approximately 775 F. For instance, the electrically conductive material 60 can be maintained at a barrel temperature that ranges from approximately 300 F to approximately 775 F in the barrel of the extruder 78. In one example, the barrel temperature can range from approximately 625 to approximately 700 F. In the head of the extruder 78 downstream of the barrel, the electrically conductive material can be maintained at a head temperature that ranges from approximately 350 F to approximately 775 F. For instance, the head temperature can range from approximately 690 F to approximately 730 F. The electrically conductive material can be maintained at a throat temperature in the throat of the extruder 78 that can range from approximately 100 F to approximately 200 F. For instance, the throat temperature can be approximately 200 F, below the boiling point of water.

The gas-infused molten electrically insulative material can travel through the channel 90 from the inlet 96 to an outlet 98 of the die 82. The outlet 98 of the die 82 can also define an outlet of the cross-head 80. The channel 90 can have any suitable size and shape as desired. In one example, the channel 90 can define a cross-sectional area in a plane that is oriented perpendicular to the forward direction. The cross-sectional area of the channel 90 can decrease in a direction from the inlet 96 toward the outlet 98 of the die 82. In one example, the cross-sectional area of the channel 90 can decrease from the inlet 96 to the outlet 98 of the die 82. Thus, the gas-infused molten electrically insulative material can be at a pressure that increases as the gas-infused molten electrically insulative material travels through the channel 90 in the forward direction. For instance, the pressure of the gas-infused molten electrically insulative material in the channel 90 can be such that the electrically insulative material in the barrel of the extruder 78 is maintained at a barrel pressure that ranges from approximately 400 pounds per square inch (PSI) to approximately 2000 PSI. For example, the barrel pressure can range from approximately 600 PSI to approximately 1500 PSI. In some examples, the temperature of the electrically insulative material in the channel 90 can be maintained at a cooler temperature than the head temperature. For instance, the cooler temperature can range from approximately 2% to approximately 10% less than the head temperature. In one example, the cooler temperature can range from approximately 2% to approximately 5% less than the head temperature.

The outlet 98 of the die 82 can be aligned with the outlet 94 of the tip 88 in the forward direction. For instance, the outlet 98 of the die 82 can be colinear with the outlet 94 of the tip 88. The outlet 94 of the tip 88 can be spaced from the outlet 98 of the die 82 in the rearward direction. Thus, the gas-infused molten electrically insulative material can travel through the channel to a location between the outlet 94 of the tip 88 and the outlet 98 of the die 82. Accordingly, the gas-infused molten electrically insulative material can coat the electrical conductors 52 in the die 82 at a location downstream of the outlet 94 of the tip 88. In particular, the electrical conductors 52 can be coated by the gas-infused molten electrically insulative material as the at least one electrical conductors 52 exit the outlet 94 of the tip 88 and travels into the die 82. Thus, it should be appreciated that the electrically conductive material can be co-extruded with the electrical conductors 52. The term "downstream" can be used herein to reference the forward direction. Conversely, the term "upstream" and derivatives thereof can be used herein to reference the rearward direction.

It should be appreciated that the die 82 and the tip 88 define a gap 100 therebetween in the forward direction. The gap 100 can be at least partially or entirely defined by the channel 90. Further, the gap 100 can be an adjustable gap. In particular, the tip 88 can be selectively movable in the forward and rearward directions so as to adjust the size of the gap. Otherwise stated, the tip 88 can be selectively moved toward and away from the outlet 98 of the die 82. Moving the tip 88 in the forward direction toward the outlet 98 of the die 82 can reduce the size of the gap 100. Conversely, moving the tip 88 in the rearward direction away from the outlet 98 of the die 82 can increase the size of the gap 100. It has been found that the size of the gap 100 can affect the average size of the pores. Thus, the method can include the step of controlling the gap 100 so as to correspondingly control an average size of the pores. In particular, reducing the size of the gap can increase the pressure of the gas-infused molten electrically insulative material in the channel 90 which, in turn can increase the average size of the pores. In one example, it can be desirable to maintain the gap 100 in a range from a minimum size to a maximum size. The minimum size can be approximately 0.025 inch, and the maximum size can be approximately 0.05 inch in certain examples. Thus, the gap 100 can be approximately 0.05 inch when the tip 88 is in a fully rearward position. The gap 100 can be approximately 0.025 inch when the tip 88 is in a fully forward position. When the tip 88 is in the fully forward position and it is desirable to further increase the pressure of the gas-infused electrically insulative material, the line speed of the electrical conductors 52, and thus the flow rate of the molten electrically insulative material can be increased. Conversely, when the tip 88 is in the fully rearward position and it is desirable to further decrease the pressure of the gas-infused electrically insulative material, the line speed of the electrical conductors 52 can be decreased. It has been found that as the pressure of the molten electrically insulative material increases, the average void volume of the pores 64 can decrease.

When the electrical conductors 52 are coated with the gas-infused molten electrically insulative material, and travel out of the outlet 98 of the die 82, the ambient temperature can cool the gas-infused molten electrically insulative material, and the pressure of the gas-infused molten electrically insulative material can be rapidly reduced. It is recognized that the size and shape of the outlet 98 of the die 82 can at least partially determine the size and shape of the inner electrical insulator 54. Further, it can be desirable to prevent the molten electrically insulative material from adhering to either or both of the die 82 and the tip 88. In one example, the die 82 and the tip 88 can be made from an austenitic nickel-chromium-based superalloy. For instance, the austenitic nickel-chromium-based superalloy can be provided as Inconel. It should be appreciated, of course, that the die 82 and the tip 88 can be made of any suitable alternative material. As the gas-infused molten electrically insulative material and the supported electrical conductors 52 exit through the outlet 98 of the die 82, the gas in the electrically insulative material can rapidly expand, thereby forming the pores, and transforming the electrically insulative material into a foam. Further, the reduction in temperature can cause the electrically insulative material to solidify.

It is recognized that as the electrically insulative material transforms into the foam, the electrically conductive material can expand due to the formation of the pores. Thus, as the electrically conductive material expands, the distance that separates the electrical conductors 52 that are supported by the electrically conductive material also increases to a final distance that is substantially equal to the separation distance 53 (see FIG. 4). The foam can be solidified while the electrical conductors 52 are separated from each other by the final distance. Accordingly, it can be desirable to maintain the electrical conductors 52 separated from each other at an initial separation distance prior to coating the electrical conductors 52 with the gas-infused molten electrically conductive material. In one example, the initial separation distance can range from approximately 5% to approximately 20% less than the final distance, and thus less than the separation distance 53. In particular the initial separation distance can range from approximately 10% to approximately 12% of the final distance, and thus less than the separation distance 53. The electrical conductors 52 can be separated from each other by the initial separation distance as they enter the cross-head 80, and in particular as they enter the tip 88. For instance, the electrical conductors 52 can be separated from each other by the initial separation distance as they exit the enter the cross-head 80, and in particular as they exit the tensioner 74.

The system 70 can further include a liquid bath 102 that is disposed downstream of the cross-head 80, and thus downstream of the outlet 98 of the die 82. The liquid bath can be maintained at room temperature, or any suitable alternative temperature as desired. The foam and supported electrical conductors 52 can translate through the liquid bath 102 so as to further cool and solidify the foam. The electrical shield 56 can be applied to the inner electrical insulator, and the outer electrical insulator 58 can be applied to the electrical shield in the usual manner.

Figure 7A:
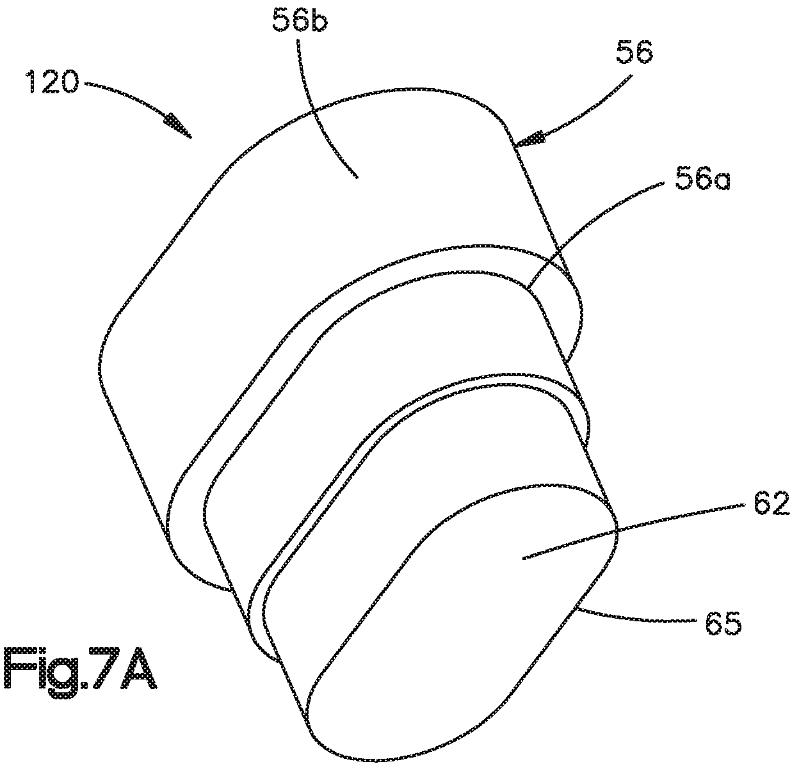
FIG. 7A is a perspective view of a waveguide including the electrical insulator illustrated in FIG. 2.
Figure 7B:
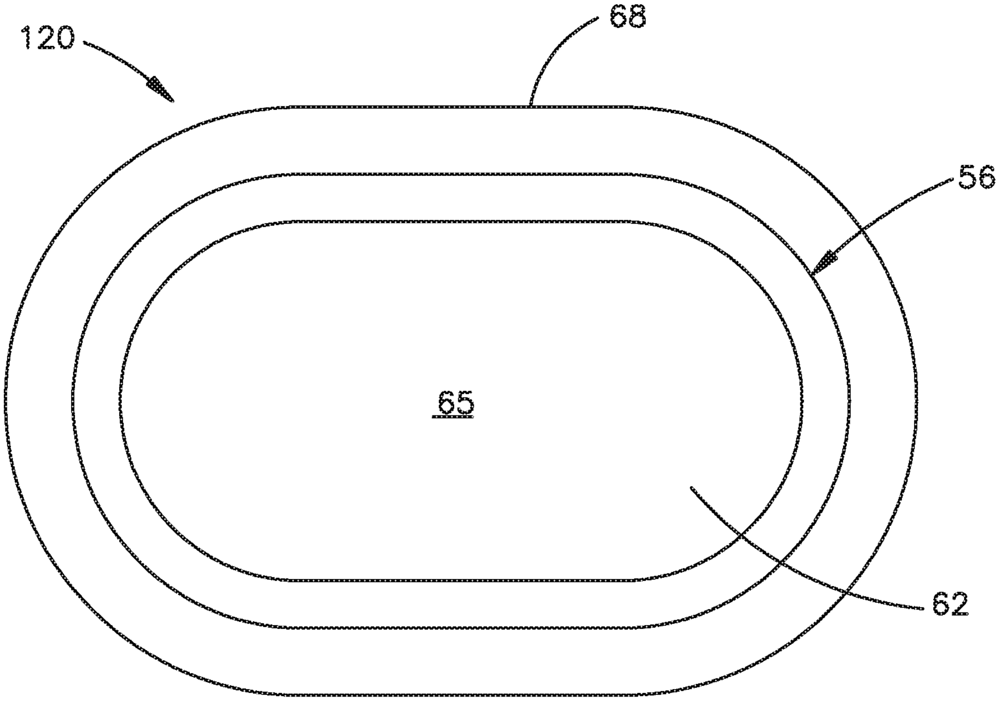
FIG. 7B is an end elevation view of the waveguide illustrated in FIG. 7A, but including an electrically insulative jacket in another example

Referring now to FIGS. 7A-7B, while the dielectric foam 62 can define the inner electrical insulator 54 of the electrical twinaxial cable 50 in the manner described above, it is recognized that the dielectric foam 62 described above can at least partially define a waveguide 120 that is configured to propagate radio frequency (RF) electrical signals from a first electrical component to a second electrical component. For instance, the dielectric foam 62 can define an inner electrically insulator or dielectric 65 of the waveguide 120. The waveguide 120 can be devoid of electrically conductive material in the dielectric 65. That is, in one example, the waveguide 120 can be devoid of electrically conductive material that is disposed within an outer perimeter of the dielectric 65 in a plane that is oriented in cross-section with respect to the central axis of elongation of the waveguide 120, along the length of the waveguide 120. Otherwise stated, the waveguide 120 can be devoid of electrically conductive material inside a perimeter as defined by the electrical shield 56.

The inner dielectric 65 can be configured as the dielectric foam 62 or as a solid dielectric. Alternatively or additionally, the inner dielectric 65 include or be configured as a flexible mono-filament that extends along a part or an entirety of the length of the waveguide 120. Alternatively, the inner dielectric 65 can include or be configured as a plurality of flexible dielectric filaments or fibers that extend along a part or an entirety of the length of the waveguide 120. Alternatively or additionally still, the dielectric waveguide 120 can include any suitable support member, different than the dielectric material 65, disposed inside the perimeter as defined by the shield 56. The support member can be a filament, fiber, or alternatively configured mechanical support members that adds one or both of strength and rigidity to the dielectric 65. For instance, the support member can be embedded in the dielectric material 65. The support members can be electrically nonconductive. In other examples, the support member can be made of the same material as the dielectric 65.

The waveguide 120 can further include a shield 56 constructed in accordance with any manner described above with the shield 56 of the electrical cable 50. Thus, the shield 56 can be configured as an electrically conductive shield that provides total internal reflection. The shield 56 can surround and abut outer perimeter of the dielectric foam 62 along a majority of the length of the foam 62. For instance, the shield 56 can include the first layer 56*a* that surrounds and abuts the inner electrical insulator. The shield 56 can include the second layer 56*b* that surrounds the first layer 56*a*. Alternatively, the shield 56 can include only the first layer 56*a*. The first layer 56*a* can be configured as an electrically conductive coating applied to the outer perimeter of the dielectric 65. The coating can be configured as a silver, gold, copper, or an alloy thereof. Alternatively, the first layer 56*a* can be a foil or tape of the type described herein, or any suitable alternative material. The second layer 56*b* can similarly be a foil or tape of the type described herein, or any suitable alternative material. As illustrated in FIG. 7A, the outer perimeter of the electrical shield 56 can define the outer perimeter of the waveguide 120. Alternatively, as illustrated in FIG. 7B, the waveguide 120 can include an outer electrically insulative jacket 68, also referred to as a dielectric jacket, that that surrounds the electrical shield 56 as described above with respect to the outer electrical insulator 58 of the electrical cable 50. In this regard, because the electrical shield 56 can surround the dielectric 65 and the dielectric jacket 68 surrounds the electrical shield 56, it can be said that the dielectric jacket surrounds the dielectric waveguide 65.

Figure 6A:
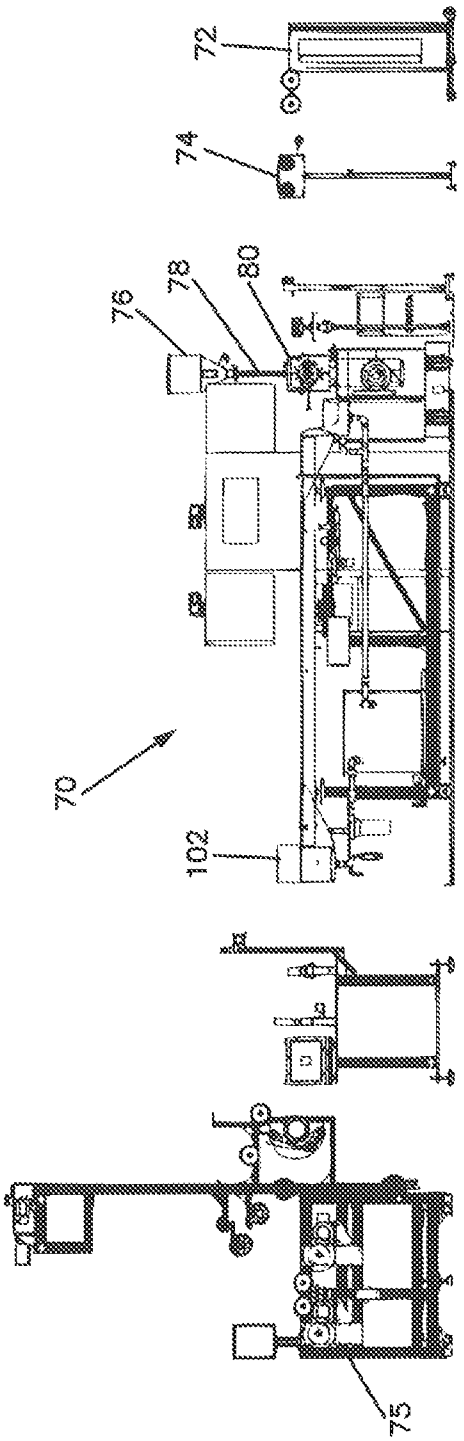
FIG. 6A is a schematic side elevation view of a cable fabrication station.
Figure 6B:
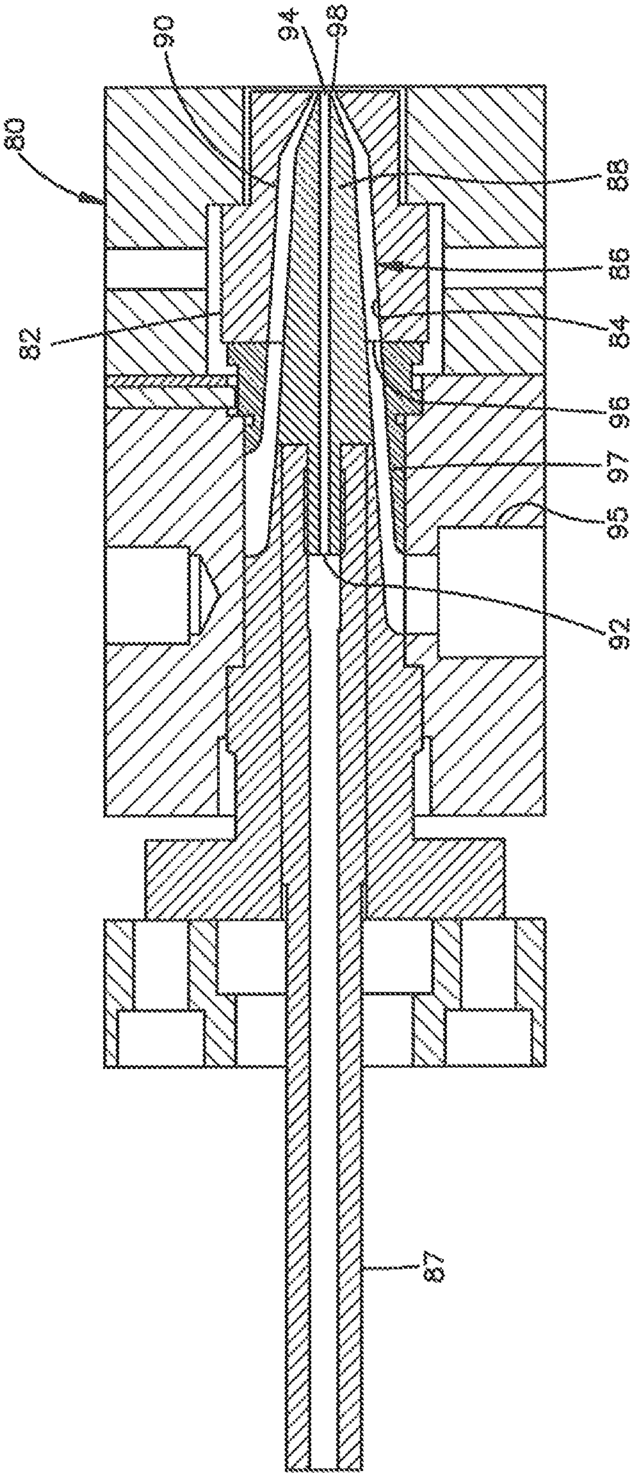
FIG. 6B is a cross-sectional view of a portion of the cable fabrication station including a cross-head.
Figure 6C:
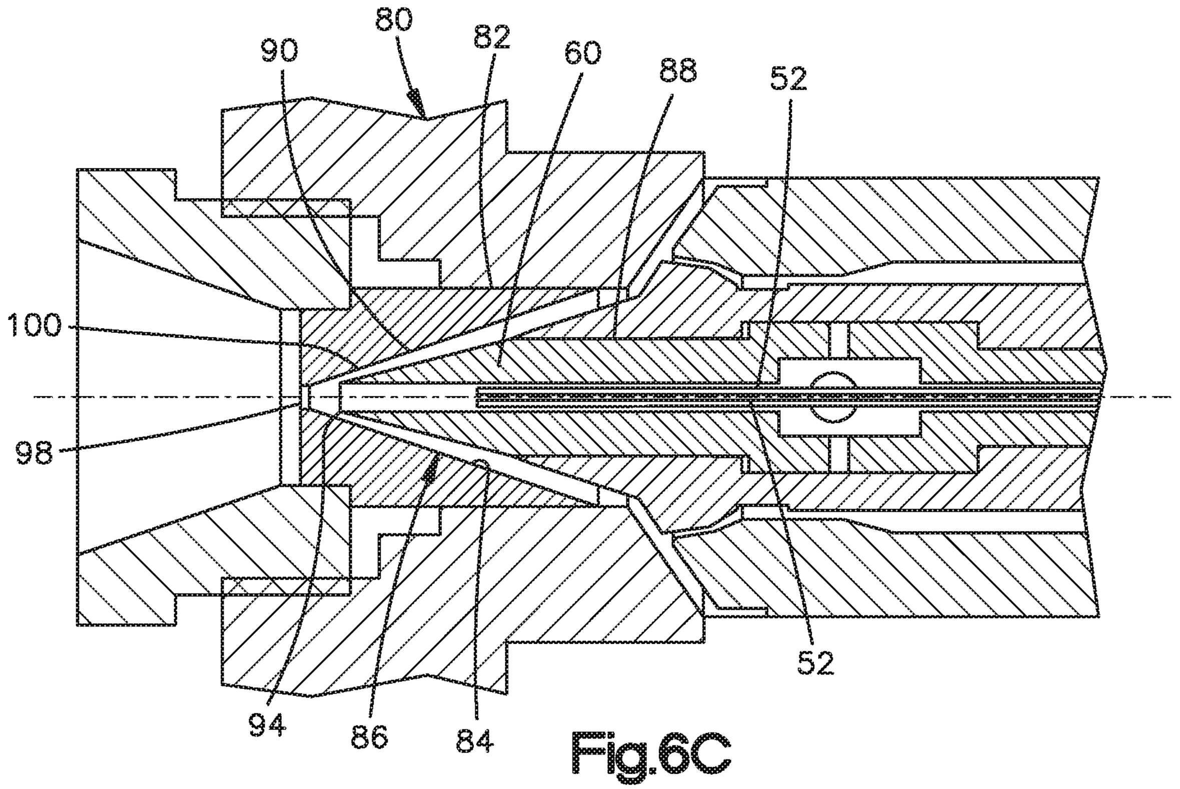
FIG. 6C is an enlarged cross-sectional view of a portion of the cross-head illustrated in FIG. 6B, with electrical conductors and molten electrically insulative material disposed therein, showing the molten electrically conductive material encapsulating the electrical conductors.
Figure 6D:
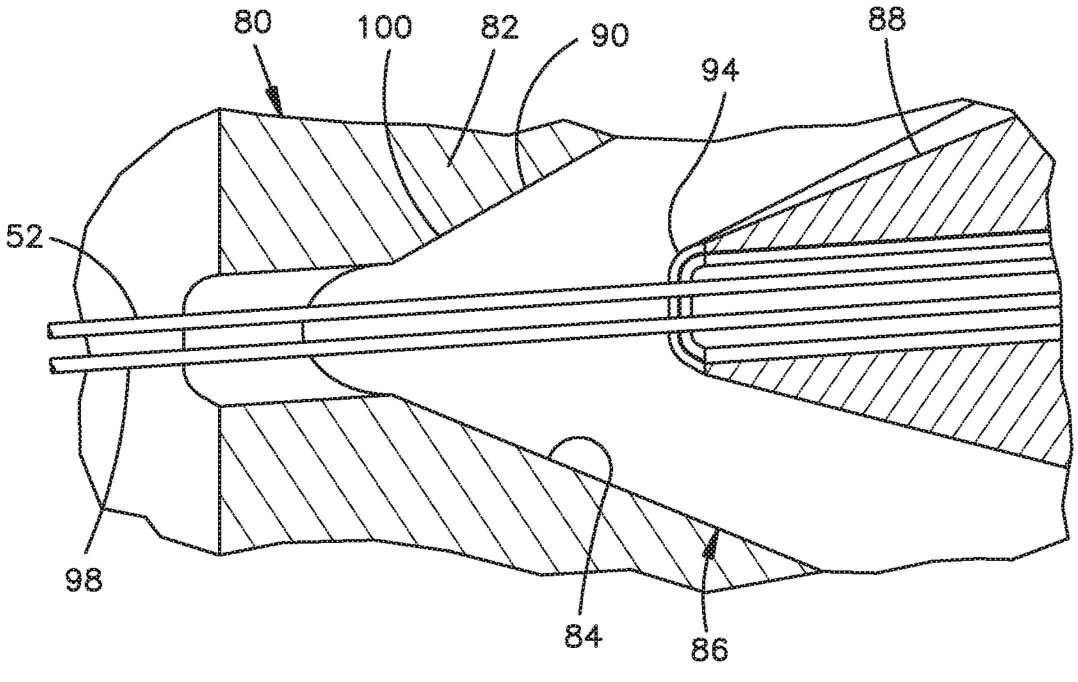
FIG. 6D is an enlarged portion of the cross-head illustrated in FIG. 6C, showing electrical conductors extending therethrough.

When the inner dielectric 65 is configured as the dielectric foam 62, the inner dielectric can be extruded through any suitable die in the manner described above, but without being coated onto the electrical conductors 52 as it travels through the die 82 (see FIG. 6B). In some examples the inner dielectric 65 can be extruded without being coated onto any other structures as it travels through the die 82 (see FIG. 6B). Thus, unlike the inner electrical insulator of the electrical cable 50 described above, the inner dielectric of the waveguide is devoid of conductor-receiving openings. Further, the cross-head 80 can be devoid of the tip 88. Further still, the outlet 98 of the die 82 can define any suitable cross-section as desired, such as a cylinder. Thus, as the molten electrically insulative material travels through the outlet 98, the molten electrically insulative material will define a cylindrical shape when it undergoes rapid expansion to produce the dielectric foam. In other examples described herein, the inner dielectric 65 can be extruded onto one or more dielectric fibers or filaments that extends along the length of the dielectric 65.

In one example, the dielectric foam 62 can be the only material inside the electrical shield 56 other than gas. Alternatively, the inner dielectric 65 can further include one or more dielectric fibers or filaments that extend through the dielectric foam 62. For instance, the one or more dielectric fibers can extend parallel to the central axis of the inner dielectric 65. The molten electrically insulative material can be co-extruded with one or more dielectric fibers in the manner described above with respect to the electrical conductors 52. Thus, the molten electrically insulative material can coat and adhere to the one or more dielectric fibers that travel through the tip 88. The dielectric fibers can assist in the extrusion process, as the fibers provide a substrate for the molten electrically insulative material to adhere to during the extrusion process. The one or more fibers can be radially centrally disposed in the electrically conductive material as desired. Further, the one or more fibers can be electrically insulative. For instance, the one or more fibers can be configured as a filament, tape, combination thereof, or any suitable alternative structure that can be fed through the cross-head, such that the molten electrically insulative material coats and adheres to the one or more fibers. In one example, the one or more fibers can have a low dielectric constant Dk that is equal to or less than the dielectric constant of the electrically insulative material 60. In one example, the one or more fibers can be expanded polytetrafluoroethytene (EPTFE).

During operation, electrical radio frequency (RF) signals can thus propagate along the length of the waveguide 120, inside the electrical shield 56. It should be appreciated that the waveguide 120 can be devoid of electrical conductors disposed inside the electrical shield 56. Otherwise stated, in some examples, the only electrically conductive material that extends along at least a majority of the length of the inner dielectric 65 of the waveguide 120 can be the electrical shield 56.

Simulations predict that in a frequency range of approximately 50-75 GHz, solid and foam dielectrics can both have a power rating of approximately 1 Watt, a transition phase stability of approximately ten degrees, and a voltage standing wave ratio of approximately 1.43:1. Both can have an end-to-end length of approximately 0.25, 0.5 and 1.0 meters, a bending radius of <75 millimeters, a twisting angle of approximately 180 degrees, and flex cycle failure of at least 100 cycles.

In contrast, and still at approximately 50-75 GHz, insertion loss for a foam dielectric with an attached separable dielectric waveguide interconnect can be approximately <4.5 dB/meter, or approximately one half of the approximate <9 dB/meter insertion loss for the solid dielectric/interconnect combination. First dielectric waveguide dimensions for the solid dielectric can be approximately 1.3×2.9 mm, while second dielectric waveguide dimensions for the foam dielectric can be approximately 1.5×3.3 mm. First termination dimensions for the solid dielectric can be approximately 1.9×3.8 mm, while second termination dimensions for the foam dielectric can be 1.9×4.0 mm.

The terms "approximately," "substantially," "about," derivatives thereof, and words of similar import with respect to a distance, direction, size, shape, ratio, or other parameter includes the stated value along with all values+/−10% of the stated value, such as +/−5% of the stated value, for instance, +/−4% of the stated value, including +/−3% of the stated value, +/−2% of the stated value, and +/−1% of the stated value.

Figure 8:
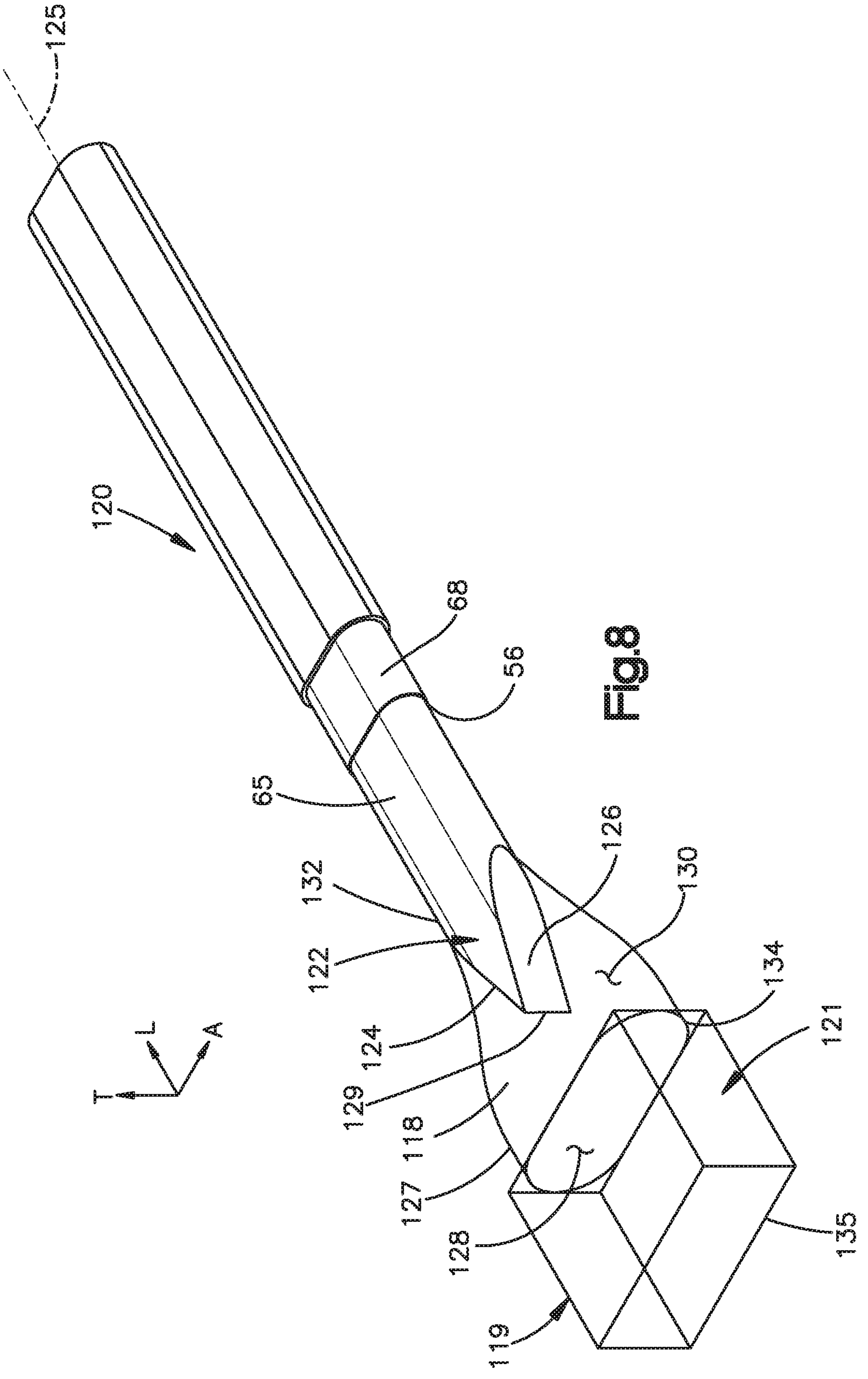
FIG. 8 is a perspective side schematic view of a dielectric waveguide, an air waveguide termination and a WR15 waveguide opening.

Referring now to FIG. 8, the dielectric waveguide 120, which can be a solid waveguide having a solid dielectric 65 or a foam dielectric 65 as described above, can define a non-circular cross-sectional shape. That is, the waveguide 120, including the dielectric 65, the shield 56, and the outer jacket 68, can be elongate along a central longitudinal axis 125. It is recognized that the waveguide 120 can be flexible, and thus the central longitudinal axis 125 can extend along a non-linear path. As a result, a portion up to an entirety of the longitudinal axis 125 can extend along a straight longitudinal direction L, or along directions that are angularly offset to the longitudinal direction L. For the purposes of this description, the portion of the waveguide 120 of interest is oriented such that the longitudinal axis 125 is shown oriented along a straight longitudinal direction L. It is recognized that, as noted above, that the longitudinal axis 125 need not be so oriented during use.

The waveguide 120 can have a non-circular cross-sectional shape in a lateral direction A that is perpendicular to the longitudinal direction L, and a transverse direction T that is perpendicular to each of the longitudinal direction L and the lateral direction A. The non-circular cross-sectional shape can be an elongate cross-sectional shape in one example. For instance, the lateral direction A can define a width of the waveguide 120, and the transverse direction T can define a height of the waveguide 120. In one example, the waveguide 120 is wider along the lateral direction A than it is tall along the transverse direction T. Thus, in a cross-sectional plane that is oriented perpendicular to the longitudinal axis 125, the waveguide 120 has a width along the lateral direction A and a height along the transverse direction T that is less than the width along the lateral direction A. Alternatively, the height can be greater than the width. In some examples, the waveguide 120 can define an oval or elliptical cross-shape in the cross-sectional plane. Thus, in some examples, the non-circular cross-sectional shape can be non-rectangular. In other examples, the height and width can be substantially equal to each other. For instance, the cross-sectional shape of the waveguide 120 can define a circle in some examples.

The waveguide 120 can terminate at a metal or metallic gaseous waveguide 118 that can transition into a complementary interconnect member 119, such as a flange 135 (schematically illustrated at FIG. 8). The central axis 125 of the dielectric waveguide 120 can also define the central axis of the gaseous waveguide 118. The dielectric waveguide 120 can be referred to as a first waveguide, and the gaseous waveguide 118 can be referred to as a second waveguide. The flange 135 can be configured as a WR15 flange 136, or other suitable flange as desired. In this regard, the complementary interconnect member 119 can be a flange 135 or any suitable alternative complementary interconnect member as desired. The flange 135 or other suitable interconnect member 119 can define an internal opening 121 that can contain air or other suitable gas. In one example, the internal opening 121 can be open to the ambient environment. In other examples, at least a portion of the opening 121 can be enclosed and filled with any suitable gas. The gaseous waveguide 118 can be positioned immediately adjacent the opening 121.

The gaseous waveguide 118 can define a cross-sectional area in a respective plane that is oriented perpendicular to the longitudinal axis 125 of the dielectric waveguide 120. The cross-sectional area of the gaseous waveguide 118 can increase in a direction from the dielectric waveguide 120 to the complementary interconnect member 119. As described above with respect to the dielectric waveguide 120, the gaseous waveguide 118 can have a width along the lateral direction A that is greater than its height along the transverse direction T. The gaseous waveguide 118 can define a gaseous waveguide wall 127 that defines an inner gaseous waveguide surface 128 and an outer gaseous waveguide surface 130 that is opposite the inner gaseous waveguide surface 128. The waveguide wall 127 can be metallic in one example. Alternatively, the waveguide wall 127 can be made of or otherwise include any suitable alternative electrically conductive material, such as an electrically conductive lossy material, in one example. The inner gaseous waveguide surface 128 can define an internal waveguide channel 131 (see FIG. 12A) that can contain air or any suitable alternative gas or other dielectric material as desired. Thus, some examples the gaseous waveguide 118 can be referred to as an air waveguide. In other examples, the gaseous waveguide 118 can be configured as a second dielectric waveguide. The gaseous waveguide wall 127, including either or both of the inner surface 128 and the outer surface 130, can define the non-circular cross-sectional shape described above.

The gaseous waveguide 118, and in particular the inner gaseous waveguide surface 128 alone or in combination with the outer gaseous waveguide surface 130, defines a transition from the dielectric waveguide 120 to the complementary interconnect member 119. The cross-sectional area can be defined by the inner gaseous waveguide surface 128. Further, the cross-sectional area can increase as it transitions from the approximate cross-sectional area of the dielectric waveguide 120, and in particular from the dielectric 65, to the approximate cross-sectional shape of the internal opening 121 of the complementary interconnect member 119. More specifically, the gaseous waveguide 118 defines a first gaseous waveguide end 132 whereby the inner gaseous waveguide surface 128 has a first internal cross-sectional shape and size that is approximately equal to an external cross-sectional shape and size of the dielectric 65. The gaseous waveguide 118 further defines a second gaseous waveguide end 134 whereby the internal waveguide surface 128 has a second cross-sectional size and shape that is approximately equal to a corresponding third internal cross-sectional size and shape of the internal opening 121 of the complementary interconnect member 119. The first internal cross-sectional size and shape of the gaseous waveguide 118 can be smaller than the second cross-sectional size and shape.

In one example, the width of the gaseous waveguide 118 can increase from the dielectric waveguide 120 to the internal opening 121 of the complementary interconnect member 119, thereby at least partially or entirely defining the increase in cross-sectional area of the gaseous waveguide 118. The cross-sectional area of the gaseous waveguide 118, and thus the waveguide wall 127, can define a nonlinear transition profile from the dielectric waveguide 120 to the complementary interconnect member 119. The transition profile can define a first tapered increase from the dielectric waveguide 120 to a larger increase in a direction toward the interconnect member 119, to a second tapered increase from the larger increase to the interconnect member 119. The height of the gaseous waveguide 118 can remain substantially constant from the dielectric waveguide 120 to the complementary interconnect member 119. Alternatively, the height can increase from the dielectric waveguide 120 to the complementary interconnect member 119. As described above, the relative widths and heights described above can apply to the inner gaseous waveguide surface 128 alone or also can apply to the outer gaseous waveguide surface 130. The transition profile can be smooth, such that the interior gaseous waveguide surface 128 has no sharp edges or stepped transitions along the transition portion. Further, the outer gaseous waveguide surface 130 can also be smooth, such that the interior gaseous waveguide surface 128 has no sharp edges or stepped transitions along the transition profile.

The dielectric 65 can define a free front end, which can be tapered end 122 as defined by at least one lateral side of the dielectric 65. In particular, the dielectric 65 defines first and lateral second sides 124 and 126 that are opposite each other along the lateral direction A. Either or both of the first and second lateral sides 124 and 126 can converge toward the other one of the first and second lateral sides 124 and 126 along the lateral direction A as they extend in a first or forward direction from the dielectric waveguide 120 to the complementary interconnect member 119 along the longitudinal direction L. For instance, each of the first and second lateral sides 124 and 126 can be tapered toward the other one of the first and second lateral sides 124 and 126 along the lateral direction A as they extend in the forward direction. In one example, the taper is a linear taper. The first and second sides 124 and 126 can converge toward each other along the forward direction until they meet at a tapered tip 129. Further, the first and second sides 124 and 126 can be planar surfaces, such that they taper straight and linearly toward each other as they extend along the forward direction. The first and second sides 124 and 126 can combine to define an arrow-shaped or dual tapered end 122. Further, the gaseous waveguide 118 can be configured to receive the dielectric waveguide. In particular, the free tapered end 122 of the dielectric 65 can extend into the gaseous waveguide 118.

Simulation predicts that using a tapered dielectric 65 as described herein and a metal or metallic gaseous waveguide 118 that terminates in an elongate cross-sectional shape as disclosed herein produces return loss better than −25 dB (i.e. approximately −27 to −30 dB) from approximately 50-75 GHz and from approximately 40-140 GHz.

Figures 9A, 9B, 9C, 9D, 9E:
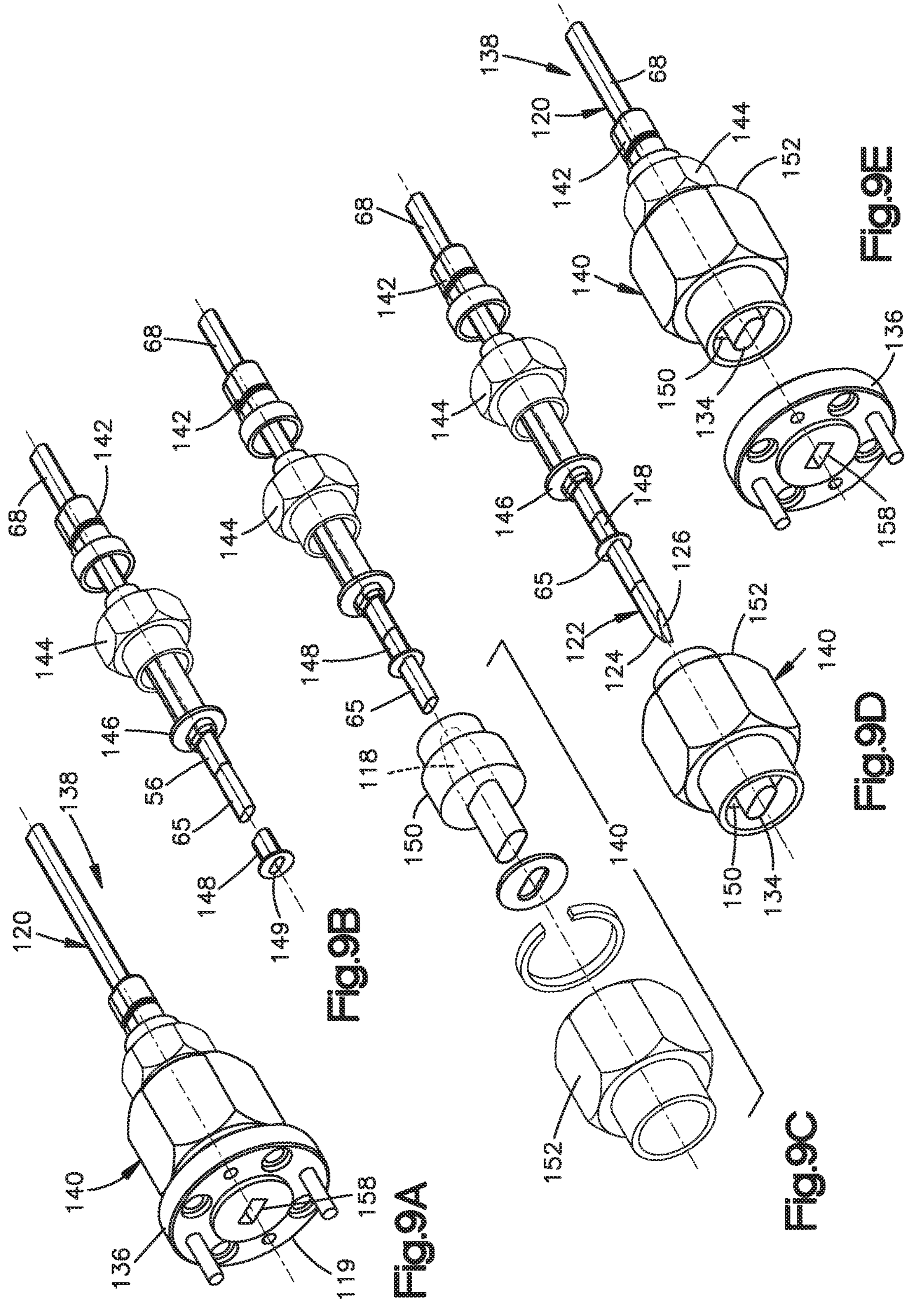
FIG. 9A is a perspective view of an electrical communication system including a dielectric waveguide cable assembly and a complementary interconnect member, wherein the dielectric waveguide cable assembly is shown including a dielectric waveguide and a waveguide interconnect member, showing the dielectric waveguide cable assembly mated to a complementary interconnect member in one example.
FIG. 9B is an exploded perspective view of a portion of the dielectric waveguide cable assembly of FIG. 9A.
FIG. 9C is an exploded perspective view showing the dielectric waveguide, and the waveguide interconnect member in exploded view, the waveguide interconnect member including an inner waveguide interconnect and an outer waveguide interconnect.
FIG. 9D is an exploded perspective view of the dielectric waveguide cable assembly of FIG. 9C, showing the showing the inner waveguide interconnect assembled to the outer waveguide interconnect.
FIG. 9E is an exploded perspective view of the electrical communication system of FIG. 9A, showing the dielectric waveguide cable assembly configured to be mated to the complementary interconnect member.

Referring now to FIGS. 9A-9G, and in particular to FIG. 9A, the dielectric waveguide 120 can be coupled to the complementary interconnect member 119, which is shown as a standard WR15 flange 136. In particular, a dielectric waveguide cable assembly 138 in one example can include the dielectric waveguide 120 and a dielectric waveguide interconnect member 140 that is configured to releasably attach to the complementary interconnect member 119, which is shown in one example as a WR15 flange 136. An electrical communication system can include the dielectric waveguide assembly 138 and the complementary interconnect member 119, and can also include a complementary electrical device to which the complementary interconnect member 119 is interfaced.

As illustrated at FIG. 9B, the dielectric waveguide 120 can be fitted with a seal member 142, an externally threaded compression nut 144, and a gasket 146. The seal member 142 can be configured as a heat shrink tube that surrounds the dielectric jacket 68 in one example. The compression nut 144 can further be fitted over the dielectric jacket 68 at a location forward of the seal member 142. The gasket 142 can similarly be fitted over the dielectric jacket 68 at a location forward of the compression nut 144. Thus, the compression nut 144 can be disposed between the seal member 142 and the gasket 146 along the longitudinal axis of the dielectric waveguide. The dielectric jacket 68 can be stripped away along a second or rearward direction opposite the forward direction, thereby exposing the waveguide shield 56 and the dielectric 65. The waveguide shield 56 can define a front end spaced in the rearward direction from the front end of the dielectric 65.

The dielectric waveguide 120 can further be fitted with a retention ferrule 148. In particular, the retention ferrule 148 defines a ferrule opening 149 that is configured to receive the dielectric 65 and the waveguide shield 56. Referring to FIG. 9C, the retention ferrule 149 can be fitted onto the waveguide shield 56, such that the waveguide shield 56 extends through the ferrule opening 149. In one example, the rear end of the retention ferrule 149 can abut the front end of the dielectric jacket 68. The retention ferrule 149 can be soldered or otherwise attached to the waveguide shield 56.

Figure 19:
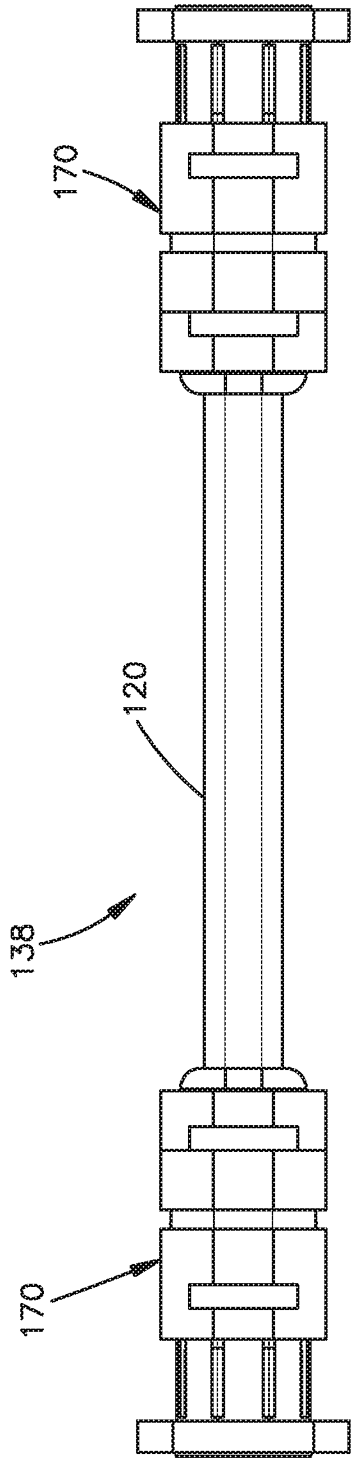
FIG. 19 is a side elevation view of a waveguide cable assembly including a waveguide and waveguide interconnect members at both opposed ends of the waveguide.

With continuing reference to FIG. 9C, the waveguide interconnect member 140 can include an inner waveguide interconnect 150 and an outer waveguide interconnect 152. In particular, the inner waveguide interconnect member can be fixed inside the outer waveguide interconnect 152 in one example to form the waveguide interconnect member 140. It should be appreciated that a first waveguide interconnect member can be disposed at a first end of the dielectric waveguide 120, and a second waveguide interconnect member can be disposed at a second end of the dielectric waveguide 120 opposite the first end (see FIG. 19 showing waveguide interconnect members 170 disposed at the first and second ends of the dielectric waveguide 120). Thus, the dielectric waveguide 120 can terminate at either or both of its first and second ends at respective waveguide interconnect members. The inner waveguide interconnect 150 can define the gaseous waveguide 118 having the cross-sectional sizes and shapes described above with respect to FIG. 8.

As illustrated in FIG. 9D, the waveguide 120 can also define the first side 124 and the second side 126 at its front tapered end 122. The inner waveguide interconnect 150 can be attached to the outer waveguide interconnect 152 in any manner as desired. In one example, the inner waveguide interconnect 150 can be internally threaded so as to threadedly mate with external threads of the outer waveguide interconnect 152. The inner and outer waveguide interconnects 150 and 152 an attach to each other in accordance with any suitable alternative embodiment. Thus, the inner waveguide interconnect 150 can be non-threaded define external threads instead of internal threads. The outer waveguide interconnect 152 can extend out from the inner waveguide interconnect 150. Further, as illustrated to FIG. 9E, the inner waveguide interconnect 150 can attach to the compression nut 144, such that the inner waveguide interconnect 150 is rotatably and translationally fixed to the compression nut 144. The rear end of the inner compression nut 144 can extend between the front end of the seal member 142 and the dielectric jacket 68.

With continuing reference to FIG. 9E and also to FIG. 9A, the waveguide interconnect member 140 can be configured to attach to the complementary interconnect member 119. In one example, the outer waveguide interconnect 152 can be rotatable with respect to the inner waveguide interconnect 150. Further, the outer waveguide interconnect 152 can be threaded so as to threadedly attach to the complementary interconnect member 119, illustrated as a WR15 flange 136. For instance, the outer waveguide interconnect 152 can be internally threaded so as to thread onto an external threads of the WR15 flange 136, thereby attaching the waveguide interconnect member 140, and thus the dielectric waveguide cable assembly 138, to the WR15 flange 136. In particular, the outer waveguide interconnect 152 is rotated with respect to the WR15 flange 136 in a first direction of rotation so as to mate the dielectric waveguide cable assembly 138 to the WR15 flange. The outer waveguide interconnect 152 can be rotated with respect to the WR15 flange 136 in a second direction of rotation so as to unmate the dielectric waveguide cable assembly 138 from the WR15 flange It is recognized that the waveguide interconnect member 140 can alternatively attach to the complementary interconnect member 119 in accordance with any suitable alternative embodiment. In this regard, it should be appreciated that the waveguide interconnect member 140 can be non-threaded or not define internal threads. For instance, the waveguide interconnect member 140 can define external threads. Similarly, the complementary interconnect member 119 can be non-threaded or not define external threads. The waveguide interconnect member 140 and the compression nut 144, in conjunction with the retention ferrule 148 described above, can thread together or otherwise attach to each another or otherwise be translatably fixed with respect to each other.

The complementary interconnect member 119 can interface with a complementary electrical device so as to place the waveguide 120 in electrical communication with the complementary electrical device. The complementary electrical device can be configured as a complementary waveguide, a substrate such as a printed circuit board, or any suitable alternative device as desired.

The inner waveguide interconnect 150 can define the gaseous waveguide 118 in some examples. Thus, the inner waveguide interconnect 150 can have the elongate cross-sectional shape as described above with respect to the gaseous waveguide 118, and can thus also define the second gaseous waveguide end 134. For instance, the second gaseous waveguide end 134, and thus the inner waveguide interconnect 150, can define a respective outer width and an outer height, whereby the outer width along the lateral direction a is greater than the outer height along the transverse direction T. The outer width is defined by the outer surface 130 along the lateral direction A, and the outer height is defined by the outer surface along the transverse direction T. The outer width can range from approximately 8 mm to approximately 26 mm, and approximately 1 mm increments therebetween. For instance, the width can range from approximately 8 mm to approximately 20 mm, including from approximately 10 mm to approximately 15 mm, for example approximately 12 mm. The width in some examples can be approximately 25 mm, approximately 24 mm, approximately 23 mm, approximately 22 mm, approximately 21 mm, approximately 20 mm, approximately 19 mm, approximately 18 mm, approximately 17 mm, approximately 16 mm, approximately 15 mm, approximately 14 mm, approximately 13 mm, approximately 12 mm, approximately 11 mm, approximately 10 mm, approximately 9 mm, or approximately 8 mm.

Referring now to FIGS. 10A-10E, and as described above, the complementary interconnect member 119 can be configured as a flange 135, such as a WR15 flange 136 or any suitable alternative flange as desired. One such alternative flange 154 is configured to mate with the dielectric waveguide cable assembly 138. That is, the dielectric waveguide interconnect member 140 described above with respect to FIGS. 9A-9E can be configured to mate with the flange 136. The flange 154 can define first and second flange ends 157*a* and 157*b* that are opposite each other along the longitudinal direction L. For instance, the first end 157*a* can be positioned as a rear end, and the second end 157*b* can be positioned as a front end. Thus, the second end 157*b* is spaced from the first end 157*a* in the forward direction. The flange 154 can include at least one alignment member, such as a pair of alignment members, configured to align with the complementary electrical device. In one example, the alignment members can be configured as alignment pins 171 that extend out from the second end 157*b* in the forward direction. The alignment pins 171 are configured to be received in complementary alignment openings of the complementary electrical device.

The flange 154 can include a flange channel 159 that extends therethrough along the longitudinal direction L from the first end 157*a* to the second end 157*b*. The flange channel 159 can include a first channel portion 159*a* and a second channel portion 159*b*. The first channel portion 159*a* extends from the first end 157*a* in the forward direction. The second channel portion 159*b* extends from the first channel portion 159*a* to the second end 157*b*. The flange 154 can include a flange body 156 and a hub 163 that extends in the rearward direction from the flange body 156. The hub 163 can define the first end 157*a*, and the flange body 156 can define the second end 157*b*. The hub 163 can be externally threaded as described above with respect to the WR15 flange 154.

Figures 10A, 10B, 10C, 10D, 10E:
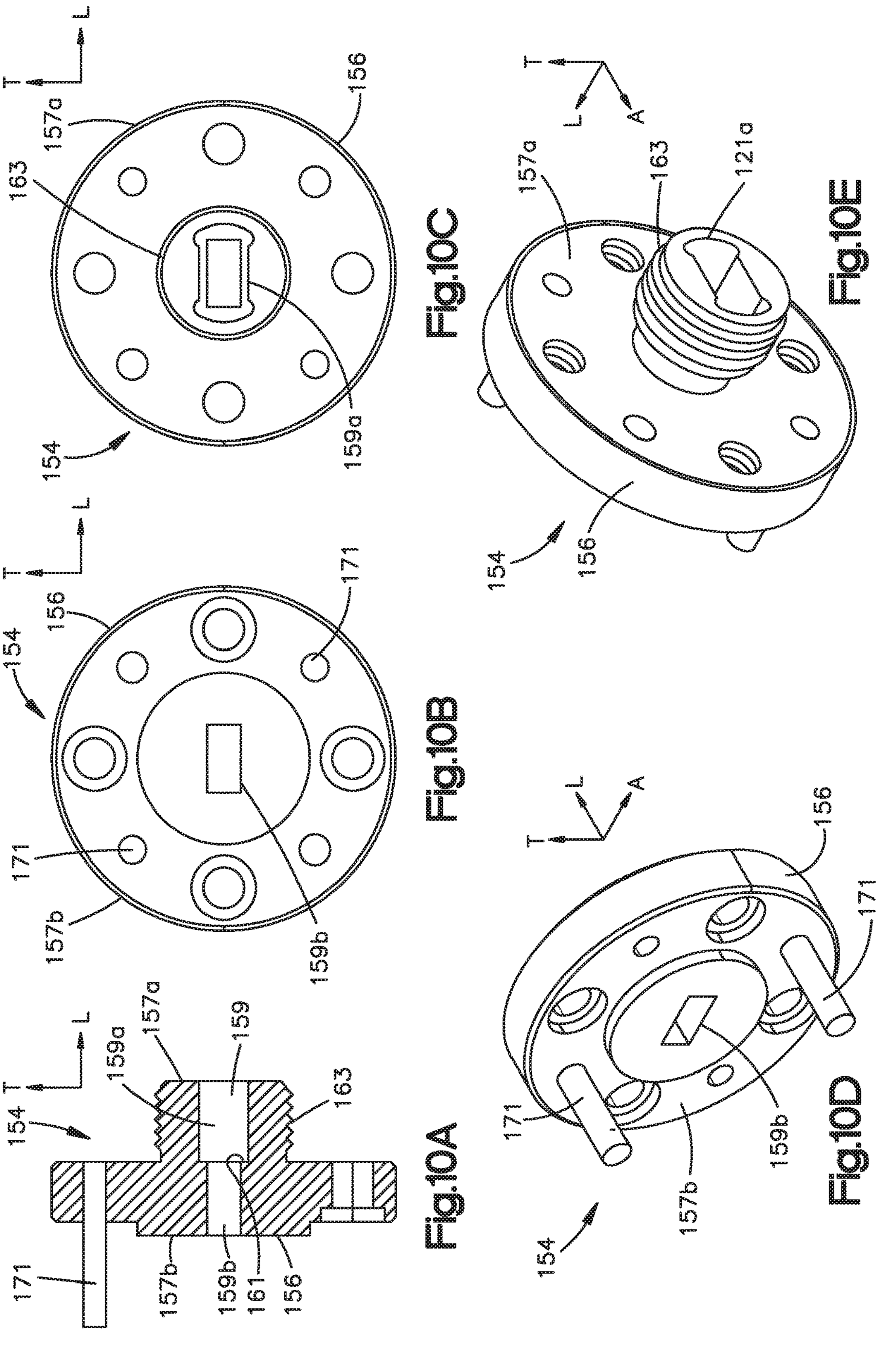
FIG. 10A is a sectional side elevation view of a flange constructed in accordance with one example, wherein the flange is configured to receive a dielectric waveguide cable assembly.
FIG. 10B is a front end elevation view of the flange of FIG. 10A.
FIG. 10C is a rear end elevation view of the flange of FIG. 10A.
FIG. 10D is a perspective view of the flange of FIG. 10A.
FIG. 10E is another perspective view of the flange of FIG. 10A.
Figure 11A:
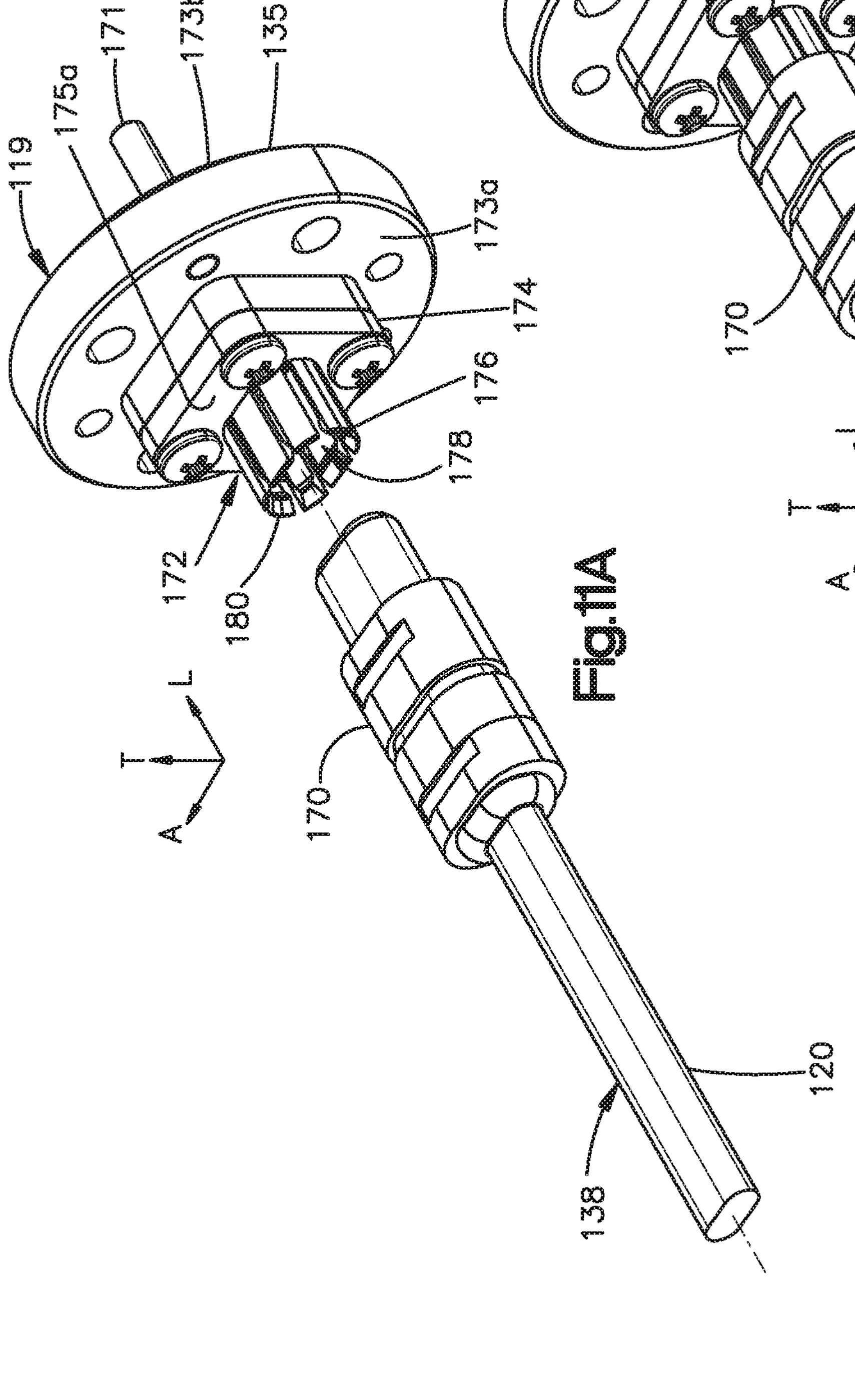
FIG. 11A is an exploded perspective view of a waveguide cable assembly aligned to be mated with a complementary interconnect member including a flange and an attachment member mounted to the flange.
Figure 11B:
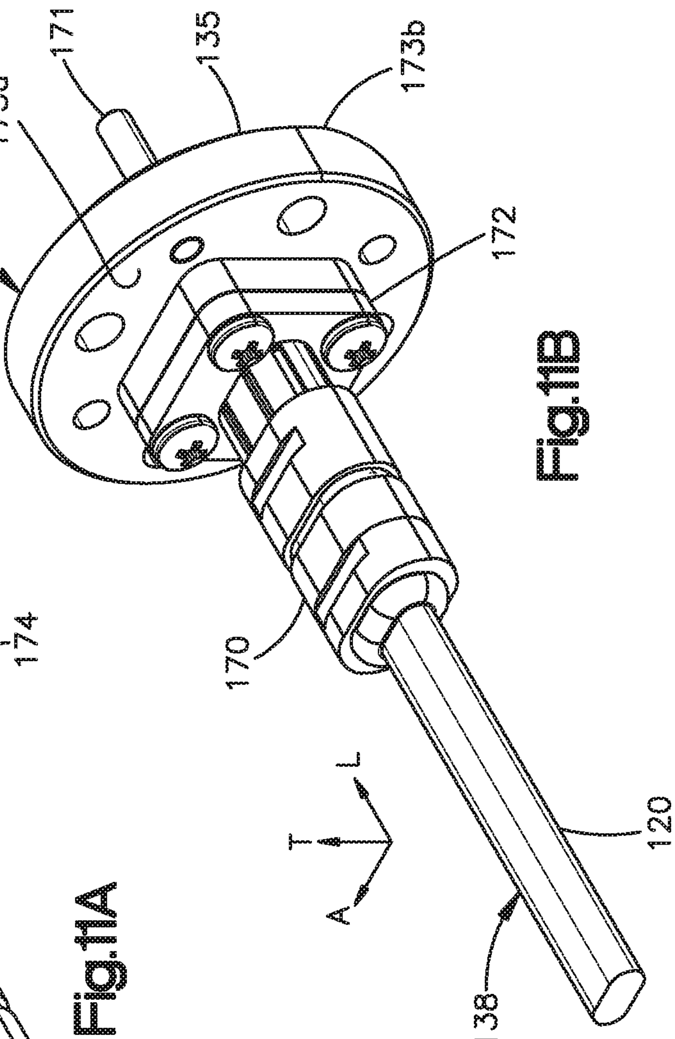
FIG. 11B is a perspective view showing the waveguide cable assembly mated to the complementary interconnect member of FIG. 11A.
Figure 11C:
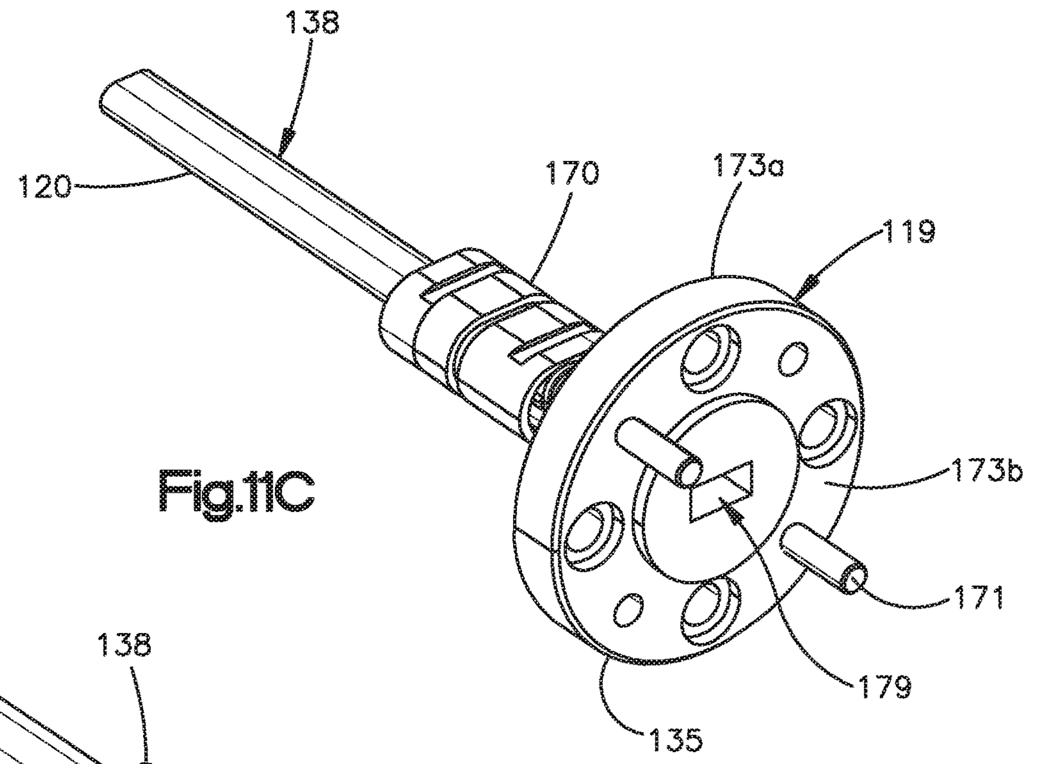
FIG. 11C is another perspective view showing the waveguide cable assembly mated to the complementary interconnect member of FIG. 11B.
Figure 11D:
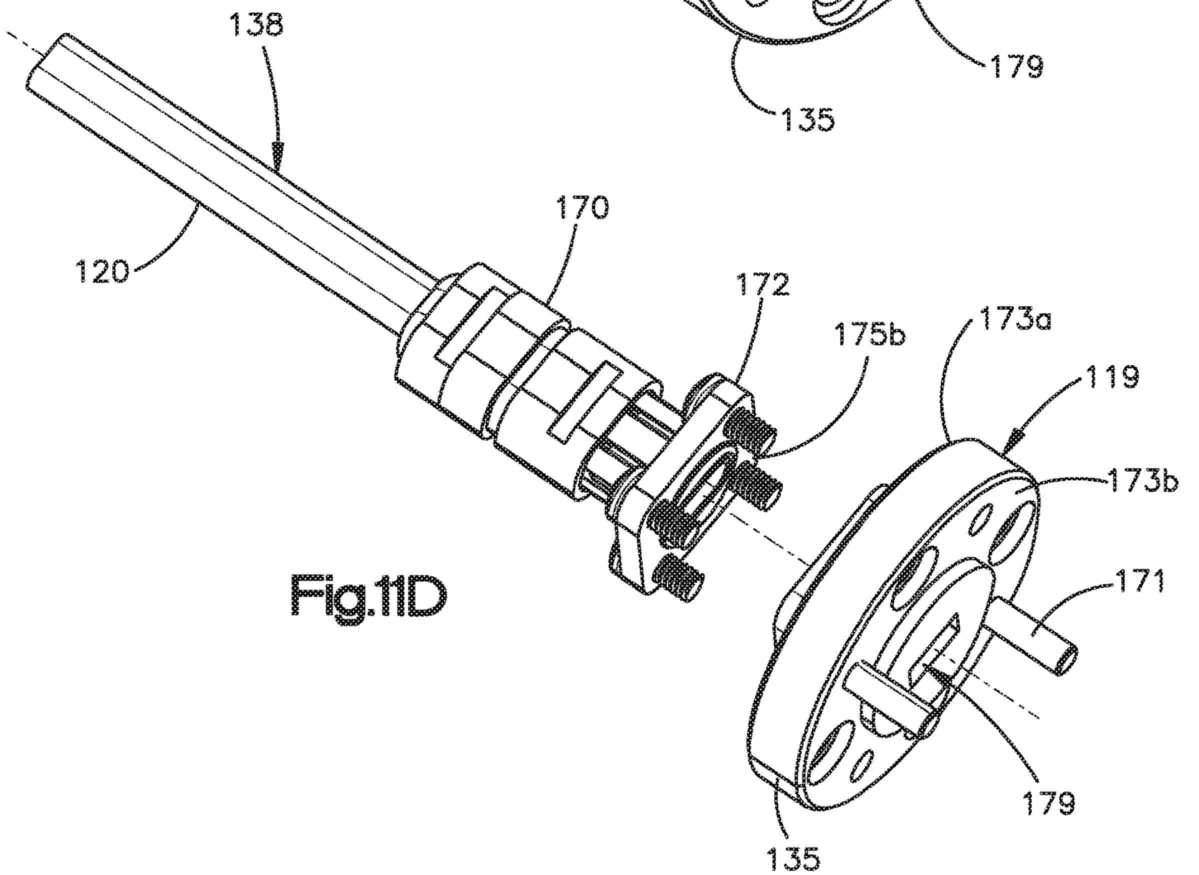
FIG. 11D is another exploded perspective view showing the waveguide cable assembly unmated from the complementary interconnect member of FIG. 11C.

The first channel portion 159*a* can be both wider along the lateral direction A and taller along the transverse direction T than the outer width and height of the second gaseous waveguide end 134 of the gaseous waveguide 118 (see FIGS. 9-10E). In one example, the first channel portion 159*a* can have a non-rectangular cross-sectional shape in a plane that is oriented perpendicular to the longitudinal direction L. In one example, the cross-sectional shape can be a dog bone cross-sectional shape whereby opposed lateral outer ends of the first channel portion 159*a* that are opposite each other along the lateral direction are taller along the transverse direction T than an intermediate portion of the first channel portion 159*a* that extends between the opposed lateral outer ends. The intermediate portion and the opposed lateral outer ends are all taller than the second gaseous waveguide end 134. Further, the width of the first channel portion 159*a* along the lateral direction A is greater than the width of the second gaseous waveguide end 134. Accordingly, the first channel portion 159*a* is sized to receive the second gaseous waveguide end 134 in the forward direction. The cross-sectional shape of the first channel portion 159*a* more closely matches the oval or elliptical shape of the second gaseous waveguide end 134 as compared to a rectangular cross-sectional shape.

The channel 159 transitions from the first channel portion 159*a* to the second channel portion 159*b*, which has at least one reduced cross-sectional dimension that is less than both the first channel portion 159*a* and an outer dimension of the second gaseous waveguide end 134. The reduced cross-sectional dimension of the second channel portion 159*b* can include at least one of a width and a height. Accordingly, the second channel portion 159*b* is not sized to receive the second gaseous waveguide end 134. Rather, the second gaseous waveguide end 134 abuts an interior surface 161 of the flange body 156. The interior surface 161 can face the rearward direction, or the first flange end 157*a*. The interior surface 161 can define a rear opening of the second channel portion 159*b*. The first channel portion 159*a* can extend from the first flange end 157*a* to the interior surface 161. In one example, the second channel portion 159*b* can have a substantially rectangular cross-sectional shape in a plane that is oriented perpendicular to the longitudinal direction L. The second channel portion 159*b* can have substantially the same size and shape as a conventional rectangular WR15 flange opening 158 having a rectangular cross-sectional shape (see FIGS. 9A and 9E).

Referring now to FIGS. 11A-11D, the dielectric waveguide cable assembly 138 can include a waveguide interconnect member 170 that is attached to or otherwise supported by the dielectric waveguide 120. The waveguide interconnect member 170 can be configured to mate with a complementary interconnect member 119. As will be described, the waveguide interconnect member 170 can be a push-pull interconnect, meaning that it can be releasably secured to the complementary interconnect member 119 by pushing the waveguide interconnect member 170 into the complementary member 19, and the securement can be removed by pulling a latch (e.g., slider 182 shown at FIG. 12A), in which case the pull force applied to the slider 182 also removes the interconnect member 170 from the complementary interconnect member 119. The complementary interconnect member 119 can include a flange 135 in the manner described above, along with an attachment member 172 that, in turn, is configured to be mounted to the flange 135. Alternatively, the attachment member 172 can be monolithic with the flange 135 so as to define a single unitary structure. Alternatively still, the attachment member can be configured to mount to a different electrical device other than a flange, as described in more detail below. The flange 135 can further be mated with a complementary waveguide so as to place the waveguide cable assembly 138 in electrical communication with the complementary waveguide.

The attachment member 172 can include an attachment body 174 and a mating portion 176 that extends out from the attachment body 174. In particular, the attachment body 174 defines a first end 175*a* and a second end 175*b* opposite the first end 175*a* along the longitudinal direction L. The first end 175*a* can be a rear end of the attachment body 174, and the second end 175*b* can be a front end of the attachment body 174 that is spaced from the first end 175*a* in the forward direction. The mating portion 176 can extend from the first end 175*a* in the rearward direction.

As described in more detail below, the waveguide interconnect member 170 is configured to releasably mate to the mating portion 176 without substantial rotation either of the waveguide interconnect member 170 and the mating portion 176 with respect to the other of the waveguide interconnect member 170 and the mating portion 176. As is described above, the term "without substantial rotation" and like terms and derivatives thereof refer to no more than five degrees of rotation, such as no rotation. The attachment member 172 defines an attachment member channel 178 that extends through the attachment body 174 and the mating portion 176 along the longitudinal direction L. The attachment member channel 178 is sized and configured to receive the gaseous waveguide 118 (see FIG. 12B). The attachment member channel 178 can be elongate in cross-section as described above with respect to the gaseous waveguide 118. In one example, the attachment member channel can be wider along the lateral direction A than it is tall along the transverse direction T in the manner described above. For instance, the attachment member channel 178 can define an oval or elliptical cross-shape in a cross-sectional plane that is perpendicular to the longitudinal direction L. The mating portion 176 defines at least one mating finger 180 that extends in the rearward direction from the attachment body 174. The mating finger 180 can be segmented into a plurality of mating fingers 180 as desired. The mating fingers 180 can be resiliently radially flexible. In one example, the attachment member 172 can be metallic or can be made from any suitable alternative material as desired.

The first end 175*a* of the attachment body 174 can be mounted to the flange 135. For instance, one or more threaded screws can extend through the attachment body 174 and purchase in threaded screw holes of the flange 135. As described above, the flange 135 can define first and second flange ends 173*a* and 173*b* that are opposite each other along the longitudinal direction L. For instance, the first end 173*a* can be positioned as a rear end, and the second end 173*b* can be positioned as a front end. Thus, the second end 173*b* is spaced from the first end 173*a* in the forward direction. The flange 135 can include alignment pins 171 that extend out from the second end 173*b* in the forward direction. The alignment pins 171 are configured to be received in complementary alignment openings of a complementary electrical device.

The flange 135 can include a flange channel 179 that extends therethrough along the longitudinal direction L from the first end 173*a* to the second end 173*b*. The flange channel 179 can include a constant cross-sectional size and shape along its entire length in one example, as is the case in the WR flange described above. Alternatively, the flange channel 179 can define first and second flange portions having different sizes and shapes as described above with respect to the flange 154 shown in FIGS. 10A-10E. The flange channel 179 can be aligned with the internal waveguide channel 131 of the gaseous waveguide 118 along the longitudinal direction L (see FIG. 12B). The second end 175*b* of the attachment body 174 can define an opening 220 that is configured to receive a complementary waveguide, thereby placing the complementary waveguide in electrical communication with the dielectric waveguide 120. In particular, referring again to FIG. 12B, the waveguides can be placed in electrical communication with each other through the flange channel 179 of the flange 135. In this regard, the flange 135 can be said to define an air waveguide through the flange channel 179 or through the second channel portion 159*b* of the flange 154 described above with respect to FIGS. 10A-10E. The flange channel 179 is open to the internal waveguide channel 131 of the gaseous waveguide 118. Further, the internal waveguide channel 131 can be continuous with the flange channel 179 along the longitudinal direction L. In this regard, the flange 135 can alternatively be configured as the flange 154.

Figure 12A:
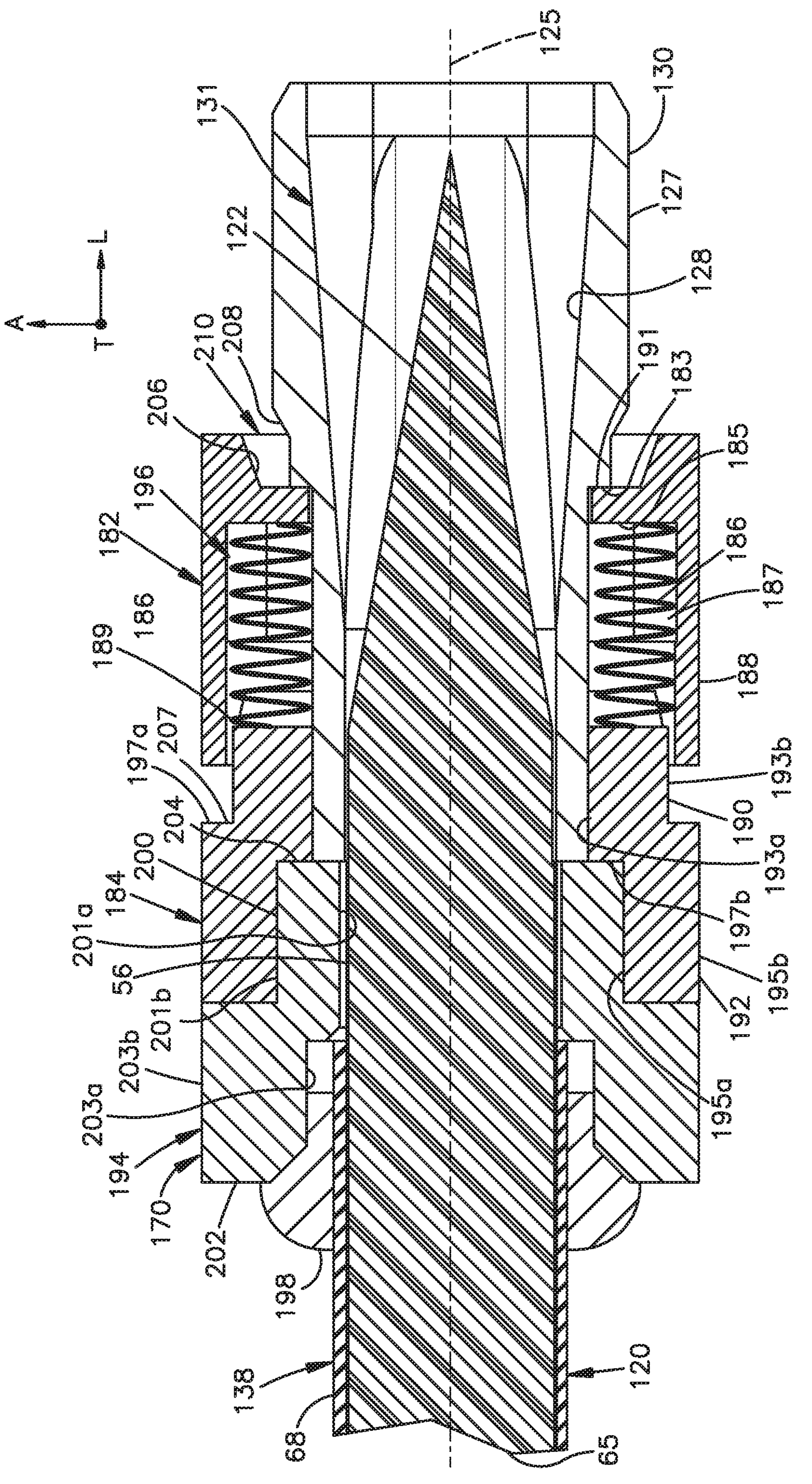
FIG. 12A is a sectional side elevation view of the waveguide cable assembly of FIG. 11A, showing a waveguide interconnect member in a natural position.

The waveguide interconnect member 170 will now be described with reference to FIG. 12A. In particular, the waveguide interconnect member 170 can include a slider 182, a seat 184, and at least one biasing member 186 that extends from the slider 182 to a seat surface 189 of the seat 184. The slider 182 and the seat 184 can each define a respective annular structure, and thus all walls and surfaces of the slider 182 and the seat 184 can similarly be annular walls and surfaces unless otherwise indicated. It should be appreciated in other examples, that the walls and surfaces of the slider 182 and the seat 184 can alternatively separate from each other and spaced from each other in cross-section, for instance as shown in FIG. 12A. The seat surface 189 can face the forward direction. The slider 182 is translatable with respect to the seat 184 along the longitudinal direction L For instance, the slider 182 is translatable in the forward direction and in the rearward direction with respect to the seat 184. It is appreciated that the slider 182 is translatable along the longitudinal direction L substantially without undergoing substantial rotation, and without substantially rotating any components of the waveguide interconnect member 170 with respect to the attachment member 172 and flange 135, if the flange 135 is secured to the attachment member 172.

The biasing member 186 can be configured as a spring such as a coil spring 187. Alternatively, the biasing member 186 can be configured as an elastomeric mass or any suitable alternative resilient structure as desired. When the biasing member 186 is configured as a spring, the seat 184 can be referred to as a spring seat. The biasing member 186 is configured apply a biasing force to the slider that urges the slider 182 to translate in the forward direction, also referred to as an engagement direction. The slider is translatable in the rearward direction, also referred to as a disengagement direction, against the biasing force of the biasing member 186. The outer gaseous waveguide surface 130 can define a shoulder that defines a front stop surface 183 configured to abut the slider 182 when the slider 182 is in a forward-most position. In particular, the front stop surface 183 can be configured to abut an abutment surface 191 of the slider 182. The abutment surface 191 can face the forward direction, and is aligned with the front stop surface 183 along the longitudinal direction L such that the abutment surface 191 contacts the front stop surface 183 when the slider 182 is in its forwardmost position. For instance, when the waveguide interconnect member 170 is in its neutral position, the biasing member 186 urges the slider 182 in the forward direction against the front stop surface 183 to the forward-most position. Thus, mechanical interference between the abutment surface 191 of the slider and the front stop surface 183 prevents the slider 182 from moving forward when the slider 182 abuts the front stop surface 183. While the front stop surface 183 can be defined by the outer gaseous waveguide surface 130 in one example, it is recognized that any suitable alternative surface of the interconnect member 170 can define the front stop surface 183.

The slider 182 can define a projection, such as a collar 188, that extends in the rearward direction from an abutment wall 185 of the slider that defines the abutment surface 191. While reference is made below to the collar 188, it is appreciated that the projection can assume any suitable alternative configuration as desired. Thus, description of the collar 188 can apply with equal force and effect to the projection, unless otherwise indicated. The abutment surface 191 is defined by a front surface of the abutment wall 185. The collar 188 can extend rearwardly from the abutment wall 185 a sufficient distance so as to overlap the seat 184 at all positions of the slider 182 from the forwardmost position to a rearward-most position of the slider 182 as described in more detail below. In particular, the collar 188 can define a rear end that is aligned along the radial direction with a wall 190 of the seat 184 that defines the seat surface 189. The collar 188 and the outer gaseous waveguide surface 130 can cooperate so as to define a radial gap 196 therebetween. The biasing member 186 can be disposed in the radial gap 196. In one example, the at least one biasing member 186 can include a pair of biasing members 186 that are opposite each other. It should be appreciated that any suitable number of biasing members can be disposed in the radial gap 196. Alternatively, the biasing member 186 can be an annular biasing member that surrounds the outer gaseous waveguide surface 130.

In one example, the wall 190 of the seat 184 can define a radially inner seat wall 190, and the seat 184 can define a radially outer seat wall 192. A radially inner direction can be defined as a radial direction toward the central longitudinal axis 125 of the dielectric waveguide 120. A radially outward direction can be defined as a radial direction away from the central longitudinal axis 125 of the dielectric waveguide. The terms "radially inner," "radially inward," like terms and derivatives thereof refer to the radially inward direction. Conversely, the terms "radially outer," "radially outward," like terms and derivatives thereof refer to the radially outward direction. The term "radial direction" and like terms and derivatives thereof refer to a direction that can include both the radially inner direction and the radially outward direction.

The radially outer seat wall 192 can extend in the rearward direction from the radially inner seat wall 190. Thus, the radially inner seat wall 190 can be referred to as a front seat wall, and the radially outer seat wall 192 can be referred to as a rear set wall. The radially inner seat wall 190 defines a first radially inner seat surface 193*a* and a first radially outer seat surface 193*b* that is opposite the first radially inner seat surface. The radially outer seat wall 192 defines a second radially inner seat surface 195*a* and a second radially outer seat surface 195*b* that is opposite the second inner seat surface 195*a*. The second inner and outer seat surfaces 195*a* and 195*b* can be offset radially outward with respect to the first inner and outer seat surfaces 193*a* and 193*b*, respectively. The seat 184 can further define a front seat shoulder surface 197*a* that extends radially inward from the second outer seat surface 195*b* to the radially inner seat wall 190. The seat 184 can further define a rear seat shoulder surface 197*b* that extends radially outward from the first inner seat surface 193*a* to the radially outer seat wall 192.

The front seat shoulder surface 197*a* can define a rear stop surface 207 for the collar that is configured to abut the collar 188 when the collar 188 is in a rearward-most position. Thus, the slider 182 can translate in the rearward direction until a rearward-facing surface of the collar 188 or any suitable alternative surface of the slider 182 abuts the rear stop surface 207. Mechanical interference between the rear stop surface 207 and the slider 218 prevents further movement of slider 218 in the rearward direction.

The seat 184 can be fixedly secured with respect to the dielectric waveguide 120. In one example, the waveguide interconnect member 170 can include a ferrule 194 that is attached to the dielectric waveguide 120, and the seat 184 can be attached to the ferrule 194. In one example, an adhesive 198 can attach the ferrule 194 to the dielectric jacket 68 of the dielectric waveguide 120. In another example, a shrink wrap can extend over both the ferrule 194 and the dielectric jacket 68 so as to attach the ferrule 194 to the dielectric jacket 68. The ferrule 194 can define a respective annular structure, and thus all walls and surfaces of the ferrule 194 can similarly be annular walls and surfaces unless otherwise indicated. It should be appreciated in other examples, that the walls and surfaces of the slider 182 and the seat 184 can alternatively separate from each other and spaced from each other in cross-section, for instance as shown in FIG. 12A.

The ferrule 194 can include a radially inner ferrule wall 200, and a radially outer ferrule wall 202. The radially outer ferrule wall 202 can extend in the rearward direction from the radially inner ferrule wall 200. Thus, the radially inner ferrule wall 200 can also be referred to as a front ferrule wall, and the radially outer ferrule wall 302 can also be referred to as a rear ferrule wall. The radially inner ferrule wall 200 defines a first radially inner ferrule surface 201*a* and a first radially outer ferrule surface 201*b* that is opposite the first radially inner ferrule surface 201*a*. The radially outer ferrule wall 202 defines a second radially inner ferrule surface 203*a* and a second radially outer ferrule surface 203*b* that is opposite the second inner ferrule surface 203*a*. The second inner ferrule surface 203*b* is offset radially outward with respect to the first inner ferrule surface 203*a*. The second inner and outer ferrule surfaces 203*a* and 203*b* can be offset radially outward with respect to the first inner and outer ferrule surfaces 201*a* and 201*b*, respectively. The ferrule 194 can further define a front abutment surface 204 that is partially defined by each of the radially inner ferrule wall 200 and the radially outer ferrule wall 202. That is, a first portion of the front abutment surface 204 can extend from the first radially inner ferrule surface 201*a* to the first radially outer ferrule surface 201*b*, and a second portion of the front abutment surface 204 can extend radially inward from the second outer radial ferrule surface 203*b* to the radially inner ferrule wall 200.

The radially inner ferrule wall 200 can be sized to be inserted into the seat 184 in the forward direction. In particular, the radially inner, or front, ferrule wall 200 can be inserted in a radial gap between the radially outer seat wall 192 and the dielectric waveguide 120. In particular, the radial gap can extend from the second radially inner seat surface 195*a* to the dielectric waveguide 120. The outer jacket 68 can be stripped to a position rearward of the radially inner ferrule wall 200, such that the radial gap extends from the second radially inner seat surface 153*a* to the shield 56. In one example, the radially inner ferrule wall 200 can be press-fit into the radial gap, thereby attaching the ferrule 194 to the seat 184. The ferrule 194 can be inserted into the radial gap until the front abutment surface 204 abuts the seat 184. In particular, the front abutment surface 204 at the radially inner ferrule wall 200 can abut the rear seat shoulder surface 197*b*. The front abutment surface 204 at the radially outer ferrule wall 202 can abut the rear surface of the radially outer seat wall 192.

While the ferrule 194 can be press fit to the seat 184 in one example, it should be appreciated that the ferrule 194 can alternatively be attached to the seat 184 in accordance with any suitable alternative embodiment, including using mechanical fasteners or a solder joint. Alternatively or additionally, the ferrule 194 can be soldered to the shield 56 as desired. Alternatively or additionally still, the ferrule 194 and the seat 184 can define a single monolithic unitary structure. As described above, the ferrule 194 can be attached to the dielectric waveguide 120. For instance, the adhesive 198 can bond the second radially inner ferrule surface 203*a* to the dielectric jacket 68. Alternatively, a shrink wrap can extend over the dielectric jacket 68 and either or both of the ferrule 194 and the seat 184. Because the ferrule 194 is attached to the dielectric jacket 68, the waveguide interconnect member 170 can provide strain relief to the dielectric waveguide 120. In this regard, the ferrule can be referred to as a strain relief member. During operation, a tensile force applied to the dielectric waveguide with respect to the waveguide interconnect member 170 will be absorbed at the interface of the ferrule 194 and the dielectric jacket 68, thereby protecting the inner dielectric 65 and the outer shield 56 from the tensile force.

As described above, the biasing member urges the slider 182 to a natural forwardmost position, whereby the slider 182 abuts the front stop surface 183. The slider 182 is movable in the rearward direction from the forwardmost position to a rearward-most position whereby the slider 182 abuts the rear stop surface 207 of the seat 184. The collar 188 of the slider 182 can ride along the first radially outer seat surface 193*b* as it moves between the forwardmost position and the rearward-most position. In this regard, the collar 188 can be radially aligned with the first radially outer seat surface 193 both when the slider 182 is in the forwardmost position and when the slider 182 is in the rearward-most position.

As will be described in more detail below, the waveguide interconnect member 170 defines first and second retention surfaces 206 and 208 that are configured to releasably capture the mating portion 196 of the attachment member 172 in the retention gap 210 so as to secure the waveguide interconnect member 170 to the attachment member 172. Thus, the waveguide interconnect member 170 is also secured to the flange 135 when the attachment member 172 is secured to the flange 135 (see also FIG. 11A). In particular, the slider 182 is movable between an engaged position whereby the retention surfaces 206 and 208 lock to the mating portion 196 of the attachment member 172 and a disengaged position whereby the mating portion 196 can be removed from the retention surfaces 206 and 208.

The first retention surface 206 can be a beveled first retention surface. The first retention surface 206 can flare radially outward as it extends in the forward direction. In one example, the first retention surface 206 can be defined by the slider 182. For instance, the first retention surface 206 can be disposed at a rear end of the slider 182. The first retention surface 206 can be spaced forward from the rear stop surface 207. The first retention surface 206 can be defined by a front surface of the abutment wall 185 of the slider 182. The first retention surface 206 can be spaced in the radially outward direction with respect to the outer gaseous waveguide surface 130. The first retention surface 206 can extend straight and linearly in cross-section, or can be curved as desired.

The second retention surface 208 can be a beveled second retention surface. The second retention surface 208 can flare radially outward as it extends in the forward direction. In one example, the second retention surface 208 can have a slope greater than that of the first retention surface 206. Alternatively, the slope of the first retention surface 206 can be equal to or greater than the slope of the second retention surface 208. In one example, the second retention surface 208 can be defined by the gaseous waveguide wall 127 of the metallic gaseous waveguide member 118. Thus, the dielectric waveguide interconnect member 170 can include the gaseous waveguide 118. The second retention surface 208 can be defined by the outer gaseous waveguide surface 130 of the gaseous waveguide wall 127. For instance, the second retention surface 208 can be offset from the front stop surface 183 in the forward direction. The second retention surface 208 can also be offset in the radially outward direction from the front stop surface 183. The second retention surface 208 can extend straight and linearly in cross-section, or can be curved as desired.

The waveguide interconnect member 170 can define a variable sized retention gap 210 that extends between the and second retention surfaces 206 and 208. For instance, the retention gap 210 can extend from the first retention surface 206 to the second retention surface 208. The retention gap 210 has a size that varies as a result of translation of the slider 182 along the longitudinal direction L with respect to the gaseous waveguide 118, and thus the waveguide wall 127. In particular, as the slider 182 translates along the longitudinal direction L with respect to the gaseous waveguide 118, the first retention surface 206 correspondingly translates along the longitudinal direction L. Thus, as the slider 182 translates in the forward direction respect to the gaseous waveguide 118, the first retention surface 206 similarly translates in the forward direction toward the second retention surface 208, thereby reducing the size of the retention gap 210 along the longitudinal direction L. Thus, it should be appreciated that the first retention surface 206 partially defines the variable sized retention gap 210. As the slider 182 translates in the rearward direction respect to the gaseous waveguide 118, the first retention surface 206 similarly translates in the rearward direction away from the second retention surface 208, thereby increasing the size of the retention gap 210 along the longitudinal direction L. As described above, the biasing member 186 provides a force to the slider 182 that biases the slider in the forward direction. When the slider 182 is in the forwardmost position, whereby the abutment surface 191 abuts the front stop surface 183, the size of the gap 210 defines a minimum size. When the slider is in the rearward-most position, whereby the collar 188 abuts the rear stop surface 207, the size of the gap 210 defines a maximum size.

In this regard, it should be appreciated that the first and second retention surfaces 206 and 208 cooperate so as to define the variable sized retention gap 210. While the size of the gap 210 can vary as a result of movement of the slider 182 along the longitudinal direction L, it should also be appreciated that the size of the gap 210 can vary when the slider 182 remains stationary, and the gaseous waveguide 118 translates along the longitudinal direction L relative to the slider 182. That is, when the gaseous waveguide 118 translates in the forward direction respect to the slider 182, the size of the retention gap 210 increases. When the gaseous waveguide 118 translates in the rearward direction respect to the slider 182, the size of the retention gap 210 decreases. Thus, it can be said that translation of the slider 182 along the longitudinal direction L with respect to the gaseous waveguide 118 (and in particular with respect to the gaseous waveguide wall 127) can include movement of the slider 182 while the gaseous waveguide 118 (and in particular with respect to the gaseous waveguide wall 127) is stationary, movement of the slider 182 (and in particular with respect to the gaseous waveguide wall 127) while the slider 182 is stationary, and movement of each of the slider 182 and the gaseous waveguide 118 (and in particular with respect to the gaseous waveguide wall 127) while neither is maintained stationary.

Figure 12B:
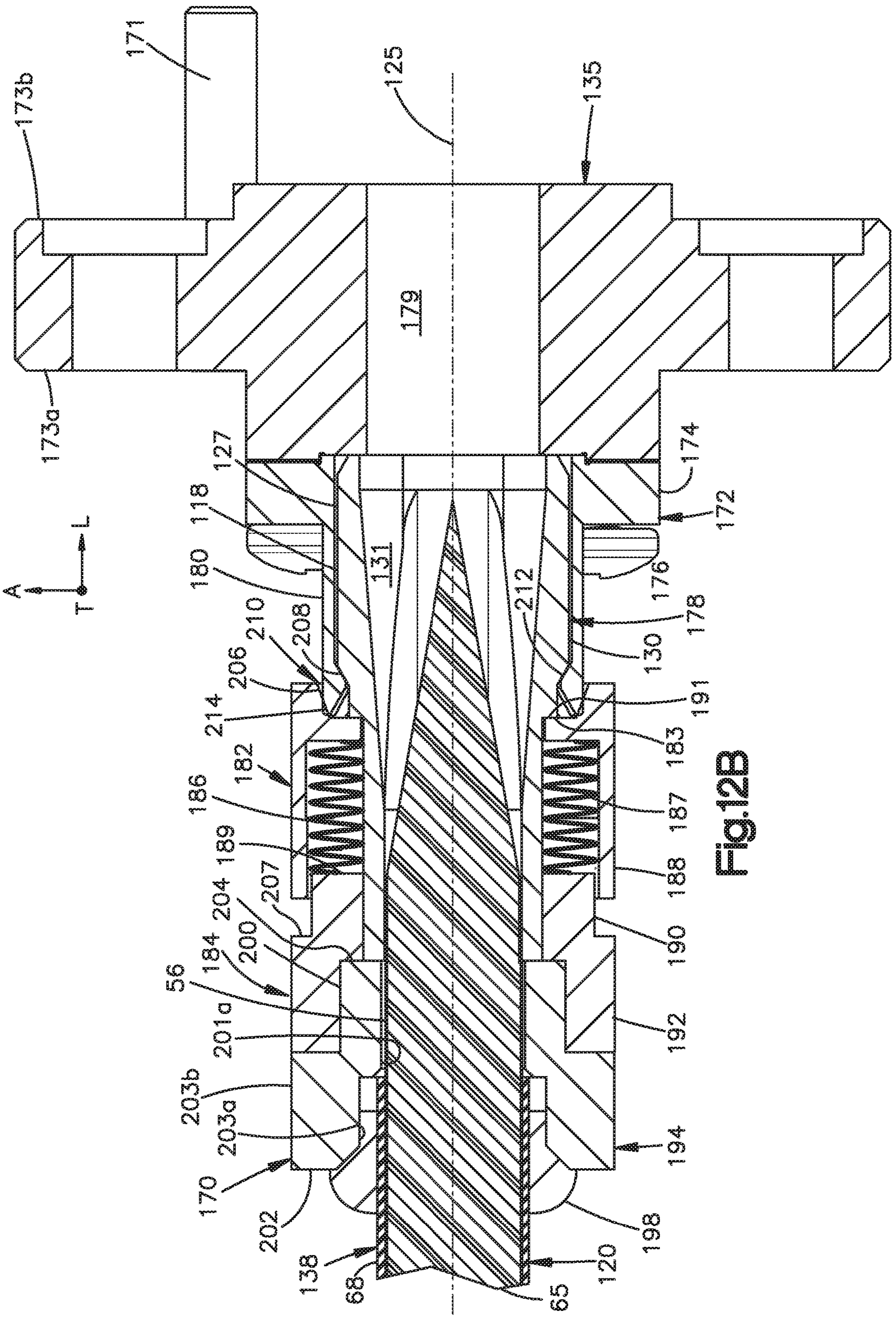
FIG. 12B is a sectional side elevation view of the waveguide cable assembly of FIG. 12A, shown mated to the complementary interconnect member.

Referring now to FIGS. 12A-12B, the mating portion 176 of the attachment member 172 configured to be inserted into the retention gap 210 and releasably retained therein under the force of the biasing member 186 that urges the first retention surface 206 toward the second retention surface, thereby securing the waveguide interconnect member 170 to the attachment member 172. In particular, the attachment member 172 can include the mating portion 176 that extends out from the attachment body 174 in the rearward direction. The mating portion 176 can include a plurality of mating fingers 180, or can be alternatively constructed as desired. The mating fingers can be spaced from each other about the outer perimeter of the gaseous waveguide 118 which, as described above, can be non-circular, and oval or elliptical in some examples.

The mating portion 176 can flare radially inward at its distal end. In one example, the mating fingers 180 can flare radially inward at their respective distal ends. For instance, the mating portion 176 can include a retention bump 212 that projects radially from one or more up to all of the mating fingers 180. For example, the retention bumps 212 can project radially inward from respective radially inner surfaces of the respective mating fingers 180. The radially outer surfaces of the fingers 180 can be substantially planar when the mating fingers 180 are in their neutral position. The retention bumps 212 can be sized and configured to be inserted into the retention gap 210 so as to assist in locking the waveguide interconnect member 170 to the attachment member 172. The retention bumps 212 can also assist in unlocking the waveguide interconnect member 170 from the attachment member 172. In other examples, the retention bumps 212 can project radially outward from the respective mating fingers 180 depending on the configuration of the first and second retention surfaces 206 and 208. In one example, the mating fingers 180 can extend in the rearward direction to respective distal free ends 214 that are configured to be received in the retention gap 210. The retention bumps 212 can extend radially from the distal free ends 214.

During operation, the gaseous waveguide wall 127 at the second gaseous waveguide end 134 is inserted into the attachment member channel 178 of the attachment member 172 in the forward direction. For instance, the second gaseous waveguide 118 can be pushed into the attachment member channel 178 in the forward direction. The gaseous waveguide wall 127 is further inserted into the attachment member channel 178 in the forward direction until the waveguide interconnect member 170 is mated with the complementary interconnect member, whereby the internal channel 131 of the gaseous waveguide 118 is aligned with and continuous with the internal channel of the complementary interconnect 119, along the longitudinal direction L. The complementary interconnect 119 can be configured as the flange 135, and thus the internal channel can be defined by the internal flange channel 179. Alternatively, the complementary interconnect 119 can be configured as the flange 154 as described above with respect to FIGS. 10A-10E, and the internal channel can thus be defined by the flange channel 159. In particular, the internal channel 131 of the gaseous waveguide can be open to the first portion 159*a* of the flange channel 159. Alternatively, the internal channel 131 of the gaseous waveguide can be open to the second portion 159*b* of the flange channel 159.

As the gaseous waveguide 118 is inserted into the flange channel, the mating fingers 180 are fitted over the outer gaseous waveguide surface 130 of the gaseous waveguide wall 127. In particular, the retention bumps 212 ride along the outer gaseous waveguide surface 130 in the rearward direction toward the retention gap 210 as the gaseous waveguide 118 is advanced forward into the attachment member channel 178. The fingers 180 can define angled rear cam surfaces 216*a* and angled front cam surfaces 216*b* (see FIG. 12D). The rear cam surfaces 216*a* flare radially outward as they extend in the rearward direction. The front cam surfaces 216*b* flare radially inward as they extend in the rearward direction. In example, the cam surfaces 216*a* and 216*b* can be defined by the retention bumps 212, but it should be appreciated that the cam surfaces 216*a* and 216*b* can be alternatively configured as desired.

The rear cam surfaces 216*a* are positioned and configured to cam radially outward over the front end of the gaseous waveguide wall 127 as the gaseous waveguide wall is introduced into the attachment member channel 178. Thus, as the gaseous waveguide 118 is further inserted into the attachment member channel 178 in the forward direction, the fingers 180 ride along the outer gaseous waveguide surface 130. For instance, the retention bumps 212 can ride along the outer gaseous waveguide surface 130. It is appreciated that the fingers 180 flex radially outward from their neutral position to a radially flexed position as they ride along the outer surface 130 of the gaseous waveguide wall 127. The mating fingers 180 can be configured as resilient spring fingers. Accordingly, the mating fingers 180 can be configured to apply a biasing force to the respective retention bumps 212 that bias the free ends 214 toward the neutral position. As a result, when the retention fingers 180 include the retention bumps 212, the retention bumps 212 are urged radially inward.

As the waveguide interconnect member 170 is further inserted into the attachment member channel 178, the attachment fingers 214 ride along the outer gaseous waveguide surface 130 in the rearward direction until the free ends 214 of the attachment fingers 214 contact the slider 182. Further insertion of the waveguide interconnect member 170 into the attachment member channel 178 causes the free ends 214 of the mating fingers 180 to urge the slider 182 to move in the rearward direction, thereby increasing the size of the retention gap 210. The slider 182 is continued to move in the rearward direction against the biasing force of the biasing member 186 until slider 182 moves to the disengaged position, whereby the size of the retention gap 210 is sufficiently large such that the resilient force of the mating fingers 180 urges the free ends 214 into the retention gap 210. In particular, the resilient force of the mating fingers 180 causes the free ends 214 to travel radially inward into the retention gap 210. When the free ends 214 carry the retention bumps 212, the retention bumps 212 travel radially inward into the retention gap 210.

Because the outer gaseous waveguide surface 130 is elongate in cross-section along a plane that is oriented perpendicular to the longitudinal direction L as described above, the gaseous waveguide 118 does not undergo any substantial rotation with respect to the attachment member 172 or complementary interconnect member 119 along the longitudinal axis 125 as the gaseous waveguide 118 is inserted into the attachment member channel 178.

Once the free ends 214 of the mating fingers 180 are disposed in the retention gap 210, the biasing force of the biasing member 186 urges the slider 182 to travel forward to the engaged position whereby the retention bumps 212 are captured between the first and second retention surfaces 206 and 208, respectively. As a result, the securement of the waveguide interconnect member 170 and the complementary waveguide 119 will prevent a rearward force applied to the dielectric waveguide 120 or the gaseous waveguide 118 with respect to the complementary interconnect 119 from causing the waveguide cable assembly 138 to unmate from the complementary interconnect 119.

In this regard, it should be appreciated that the waveguide interconnect member 170 can be passively secured to the attachment member 172 by translating the waveguide cable assembly 138 in the forward direction with respect to the attachment member 172 until the attachment member 172 is secured to the waveguide interconnect member 170. In particular, the waveguide interconnect member 170 can be translated in the attachment member channel 178 until the attachment member 172 is secured to the waveguide interconnect member 170 in the manner described above. It is appreciated that the waveguide interconnect member 170 can undergo pure translation and no substantial rotation about the longitudinal axis 125 as the waveguide interconnect member 170 secures to the attachment member 172. It is recognized that the waveguide cable assembly 138 mates with the complementary interconnect member 119 when the waveguide interconnect member 170 is passively secured to the attachment member 172.

In other examples, the waveguide interconnect member 170 can be actively secured to the attachment member 172 by pulling the slider 182 rearward to enlarge the retention gap 210 to a size that is sufficient to receive the mating portion 176 of the attachment member. Once the mating portion 176, and in particular the fingers 180, is received in the retention gap 210, the slider 182 can be released, and the biasing force of the biasing member 186 can cause the slider 182 to move forward until the fingers are captured in the retention gap 210 in the manner described above. It is appreciated that the waveguide interconnect member 170 can undergo pure translation and no substantial rotation about the longitudinal axis 125 as the waveguide interconnect member 170 is actively secured to the attachment member 172.

When the mating portion 176 is captured in the retention gap 210, at least a portion of the first retention surface 206 can be 1) in abutment with the free ends 214 of the mating fingers 180, 2) disposed radially outward of the free end of the mating fingers 180, and 3) radially aligned with the free end of the mating fingers 180. Further, when the retention bumps 212 are captured in the retention gap 210, the front cam surfaces 216*b* abut the second retention surface 208. Thus, movement of the slider 182 relative to the attachment member 172 in the rearward direction can cause the second retention surface 208 to urge the free ends 214 of the mating fingers 180 radially outward.

However, with continuing reference to FIG. 12B, when a separation force is applied to the attachment member 172 and the waveguide interconnect member 170 while the slider 182 is in the engaged position, the first retention surface 206 prevents the distal end of the finger 180 from moving radially outward a sufficient distance such that the distal end of the finger 180 can be removed from the retention gap 210. Thus, when the mating portion 176, and in particular the mating fingers 180, of the attachment member 172 is captured in the retention gap 210 with the slider 182 in the engaged position, the first and second retention surfaces 206 and 208 prevents the mating portion 176 from being removed from the retention gap 210 when a longitudinal separation force is applied to the attachment member 172 and the waveguide interconnect member 170. The biasing force of the biasing member 186 can retain the slider 182 in the engaged position. Accordingly, the interconnect member 170, and the waveguide cable assembly 138, is secured to the attachment member 172, and thus also to the flange 135. In one example, the engaged position of the slider 182 can be spaced in the rearward direction from the forwardmost position of the slider 182. Alternatively, the engaged position of the slider 182 can be defined by the forwardmost position of the slider 182.

When the waveguide interconnect member 170 is secured to the attachment member 172, the attachment body 174 can radially surround the gaseous waveguide 118, and the first end 173*a* of the flange 135 can abut the front end of the gaseous waveguide 118. Further, the internal channel 131 of the gaseous waveguide 118 can be aligned with the flange channel 179 along the longitudinal direction, and continuous with the flange channel 179. Thus, the flange 135 is placed in electrical communication with the waveguide cable assembly 138, such that electrical signals can travel between the waveguide cable assembly 138 and the flange 135.

Figure 12C:
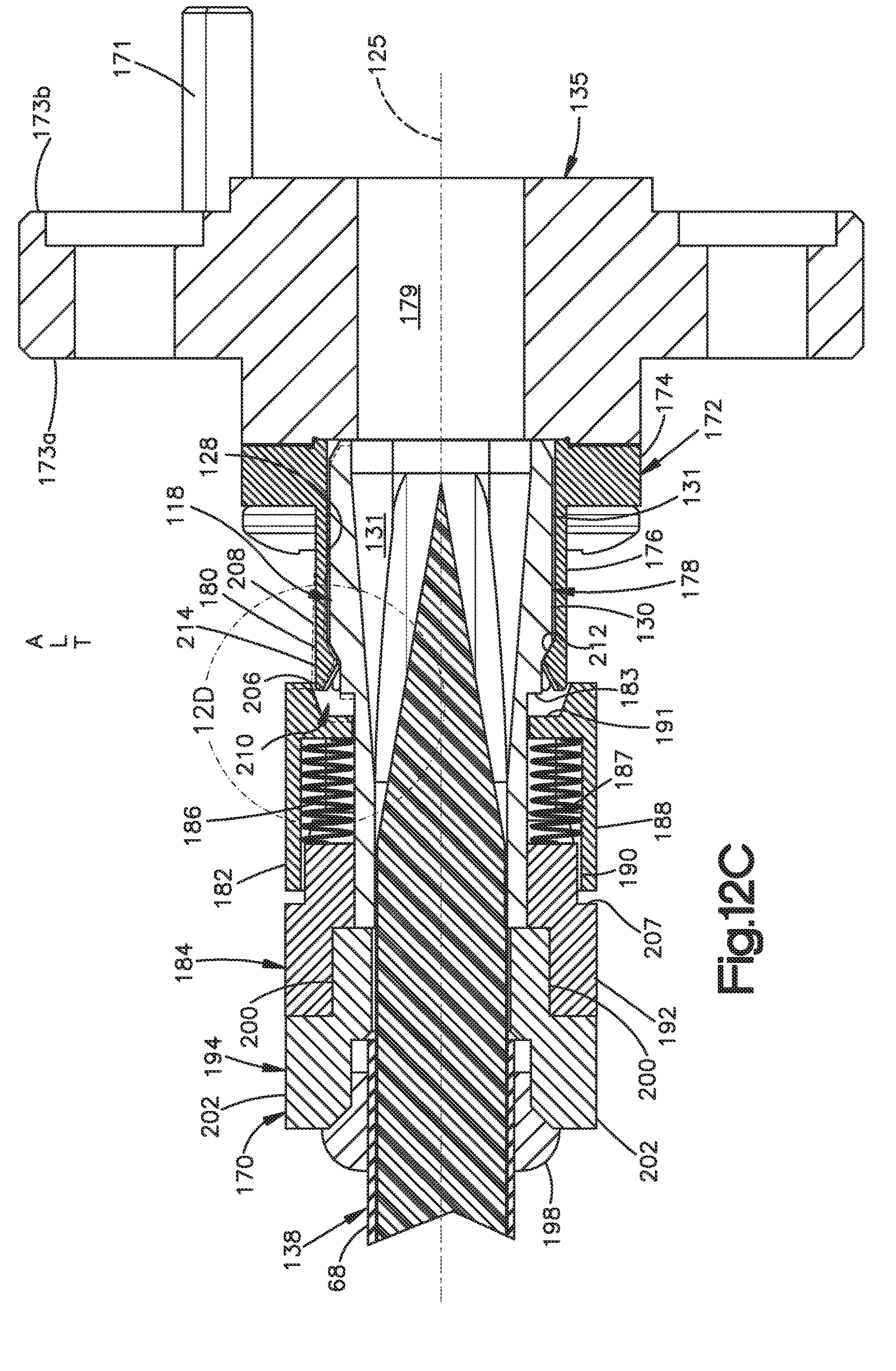
FIG. 12C is sectional side elevation view of the waveguide cable assembly of FIG. 12A, shown being removed from the complementary interconnect member.
Figure 12D:
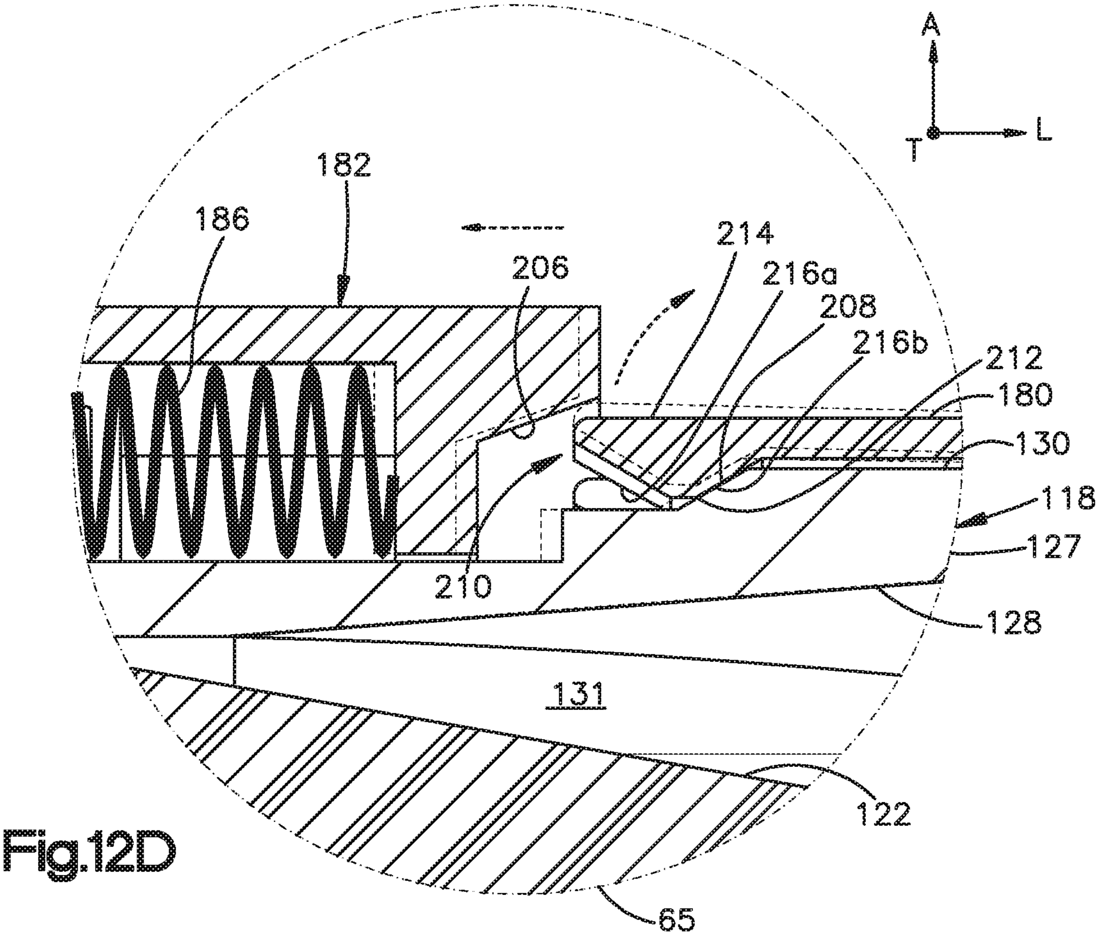
FIG. 12D is an enlarged sectional side elevation view of a portion of the waveguide cable assembly of FIG. 12C, taken along line 12D-12D.

Referring now to FIGS. 12C-12D, the slider 182 is movable in the rearward direction from the engaged position to the disengaged position to unsecure the waveguide interconnect member 170 from the complementary waveguide interconnect 119. In this regard, the slider 182 can be referred to as a latch that is movable from the disengaged position to the engaged position when securing to the complementary interconnect member 119, and movable from the engaged position to the disengaged position when removing the securement of the waveguide interconnect member 170 from the complementary interconnect 119. In particular, a user can manually grip the slider 182 and apply a rearward force to the slider that is sufficient to overcome the biasing force of the biasing member 186. In one example, an outer surface of the slider 182 can be textured to assist the user with gripping the slider 182 and applying the rearward pulling force. In other examples, the waveguide interconnect member 170 can include a pull tab that extends from the slider 182. The user can grip the pull tab and exert a rearward pulling force on the pull tab that then urges the slider 182 to move in the rearward direction. The rearward force applied to the slider 182 can be communicated to the gaseous waveguide 118. In particular, the rearward force applied to the slider 182 causes the biasing member 186 to compress, which thereby applies a rearward force onto the seat 182, ferrule, and gaseous waveguide 118 which can all be translatably fixed to each other as well as to the dielectric waveguide 120.

The rearward force applied to the gaseous waveguide 118 relative to the attachment member 172 causes the second retention surface 208 to urge the free ends 214 of the mating fingers 180 radially outward and out of the retention gap 210. In particular, the front cam surfaces 216*b* are urged to ride along the second retention surface 208 in the forward direction, which urges the free ends 214 of the mating fingers 180 radially outward. However, as described above, the first retention surface 206 prevents radial outward movement of the free ends 214 of the mating fingers 180. When the slider 182 moves in the rearward direction to the disengaged position, the first retention surface 206 is moved to a position such that the variable sized retention gap 210 defines a size sufficient for the front cam surfaces 216*b* to ride along the second retention surface 208 in the forward direction, thereby urging the free ends 214 of the mating fingers 180 out of the retention gap 210. Thus, the dielectric waveguide interconnect 170 is no longer secured to the attachment member 172, and thus is also no longer secured to the flange 135. The fingers 180 or retention bumps 212 then ride along the outer gaseous waveguide surface 130 as the gaseous waveguide wall 217 is removed from the attachment member channel 178 of the attachment member 172 until the waveguide cable assembly 138 is completely separated from the attachment member 172.

Thus, the rearward force applied to the slider 182 that removes the securement of the waveguide interconnect member 170 to the complementary interconnect member 119 can also cause the gaseous waveguide wall 127 to travel in the rearward direction out from the attachment member channel 178. Because a rearward force is applied to the slider 182 with respect to the second retention surface 208, defined by the gaseous waveguide 118, in order to unsecure the waveguide interconnect member 170 from the complementary waveguide interconnect 119, it can be said that the waveguide interconnect member 170 can be actively unsecured from the complementary waveguide interconnect 119. However, it is envisioned that in some examples, the slider 182 can be pulled rearward to the disengaged position without gripping or otherwise touching any other location of the waveguide cable assembly 138 other than the pull tab, if present. Thus, the waveguide cable assembly 138 can be unsecured from and removed from the attachment member 172, and thus from the complementary waveguide interconnect 119, by only applying a force to the slider 182.

Because the slider 182 can be an annulus that is elongate in cross-section, as is the gaseous waveguide 118 and the seat 184, the slider 182 is prevented from substantially rotating about the longitudinal axis 125 of the dielectric waveguide 120, which can be defined by the longitudinal axis 125 of the waveguide cable assembly 138. Accordingly, translation of the slider 182 along the longitudinal direction L between the engaged position and the disengaged position is a pure translation without any substantial rotation that assists in securing the waveguide interconnect member 170 to the complementary interconnect member 119. Further, no portion of the waveguide interconnect member 170 substantially rotates substantially about the longitudinal axis 125 with respect to the complementary waveguide interconnect 119 so as to secure the waveguide interconnect member 170 to the complementary waveguide interconnect 119, or to unsecure the waveguide interconnect member 170 from the complementary waveguide interconnect 119. It is recognized that, depending on manufacturing tolerances, that the waveguide interconnect member 170 and components thereof could undergo some rotation about the longitudinal axis 125 with respect to the complementary interconnect member due to wiggling and the like, but that no substantial rotation occurs with respect to the complementary interconnect member 119. That is, the waveguide interconnect member 170 and components thereof (and thus the dielectric waveguide 120 and the gaseous waveguide 118 and components thereof) undergo no more than 5 degrees of rotation, including no rotation, relative to the complementary interconnect member 119 about the longitudinal axis 125 when selectively securing to and unsecuring from the complementary interconnect member 119.

It should be appreciated that the forward direction of travel of the slider 182 can be referred to as a first direction or engagement direction, and that rearward direction of travel of the slider 18*e* can be referred to as a second direction or disengagement direction that is opposite the first direction or engagement direction. In this regard, other examples are contemplated whereby the engagement direction is the rearward direction, and the disengagement direction is the forward direction. However, the engagement direction in the rearward direction can be particularly advantageous because grasping and moving the slider 182 in the rearward direction also imparts a rearward force on the waveguide interconnect member 170, which causes the interconnect member 170 to be removed from the attachment member 172 when the slider has moved to the disengaged position.

It should be appreciated that while the mating portion 176 has been described as having the mating fingers 180 and retention bumps 212, the mating portion 176 can be configured in accordance with any suitable alternative embodiment. Thus, the description above with respect to spring fingers and retention bumps can apply equally to the mating portion 176 unless otherwise indicated. Thus, the free ends 214 of the mating fingers 180 can also be referred to as free ends or distal ends of the mating portion 176.

Figure 13A:
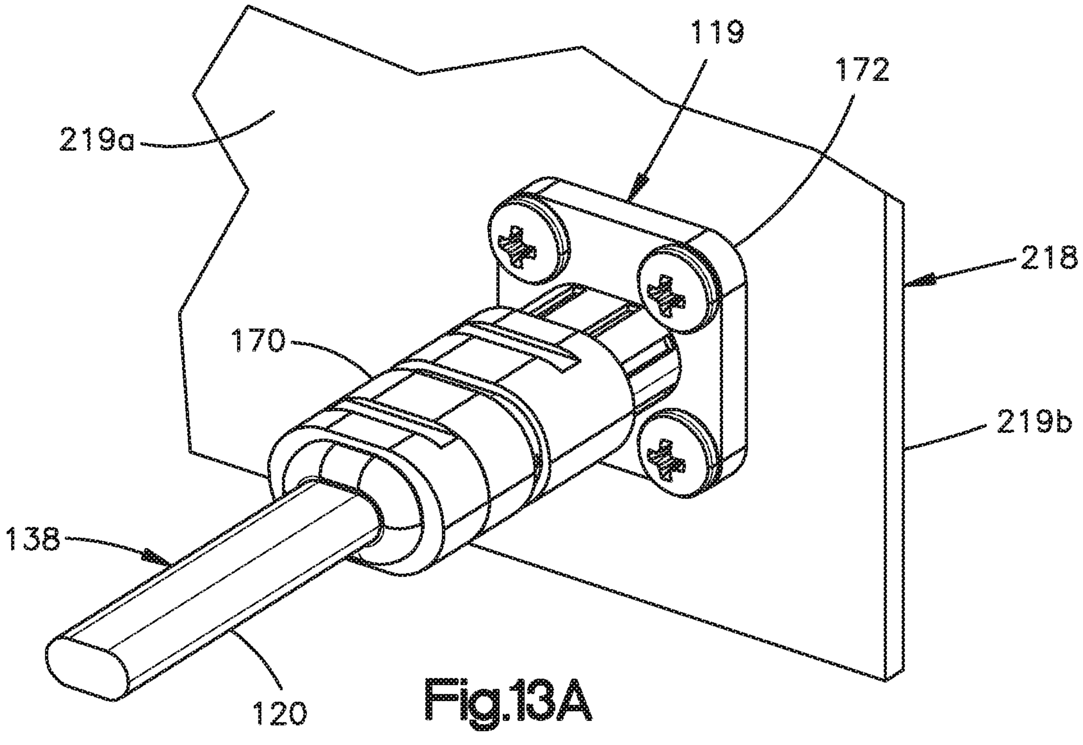
FIG. 13A is a perspective view showing the waveguide cable assembly mated to the attachment member of FIG. 11A, which is in turn mounted to a printed circuit board.
Figure 13B:
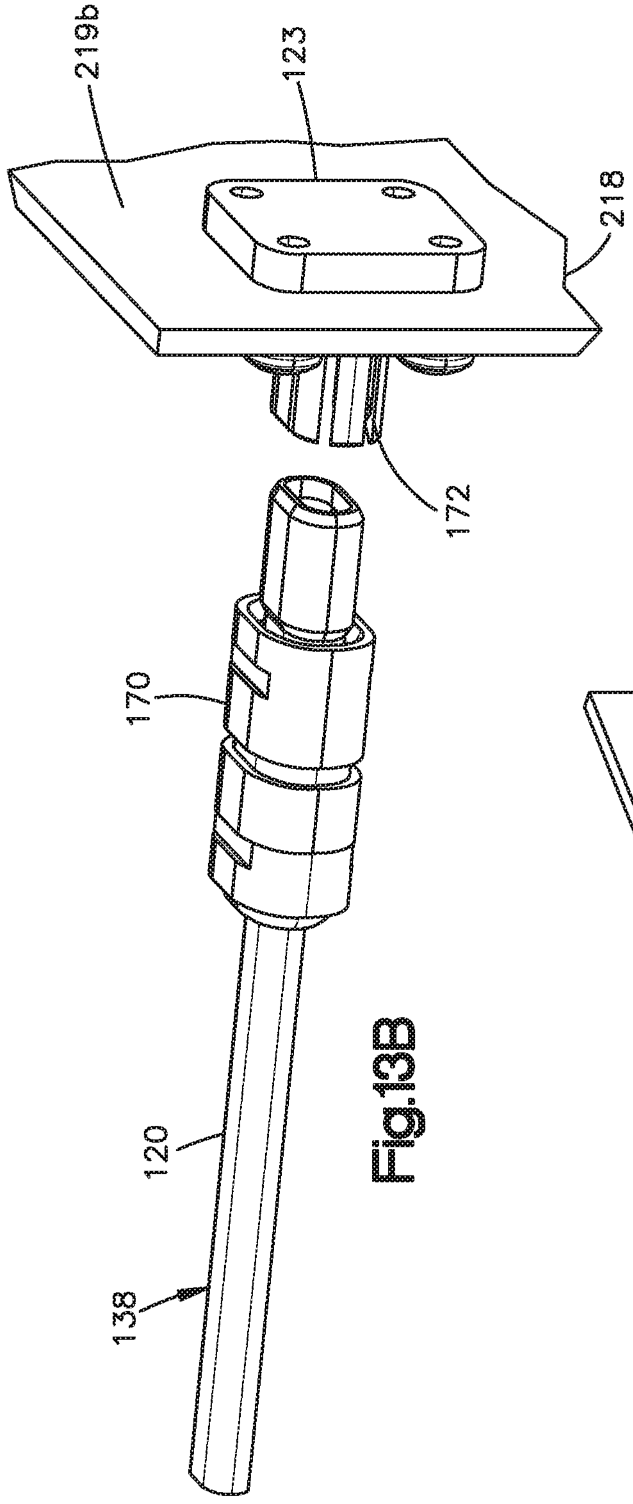
FIG. 13B is an exploded perspective view of the waveguide cable assembly and attachment member of FIG. 13A.

Referring now to FIGS. 13A-13B, while the attachment member 172 can be attached to a flange in one example described above, the attachment member 172 can be attached to any suitable alternative interconnect member 119, the attachment member 172 can alternatively terminate at a substrate 218, thereby placing the dielectric waveguide 120 in electrical communication with the substrate. In particular, a termination member 123 can be mounted to the second side 219*b* of the substrate 219 to close the front end of the attachment member channel 178, for instance, if the attachment member 172 extends into or through an opening in the substrate 218. In one example, the substrate 218 can be configured as a printed circuit board (PCB).

Figure 14A:
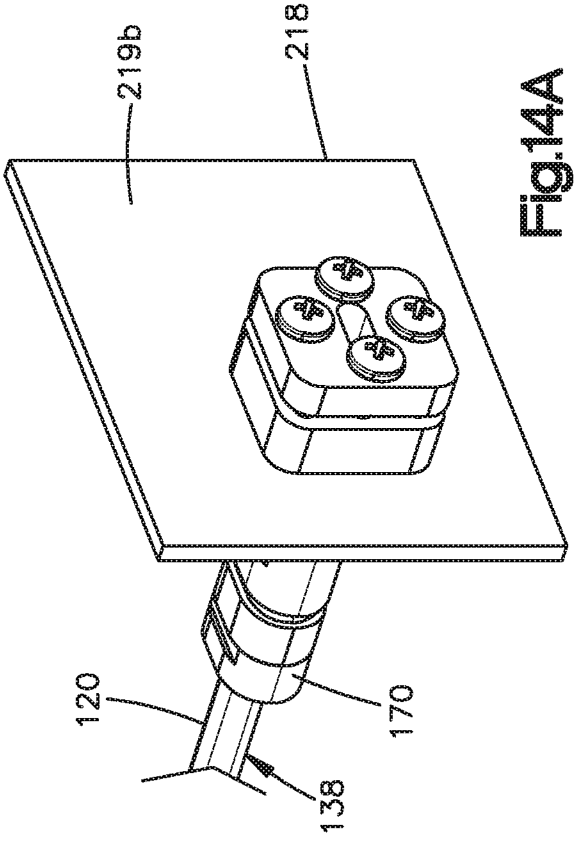
FIG. 14A is a perspective view similar to FIG. 13A, but showing the attachment member mounted to another waveguide interconnect member.
Figure 14B:
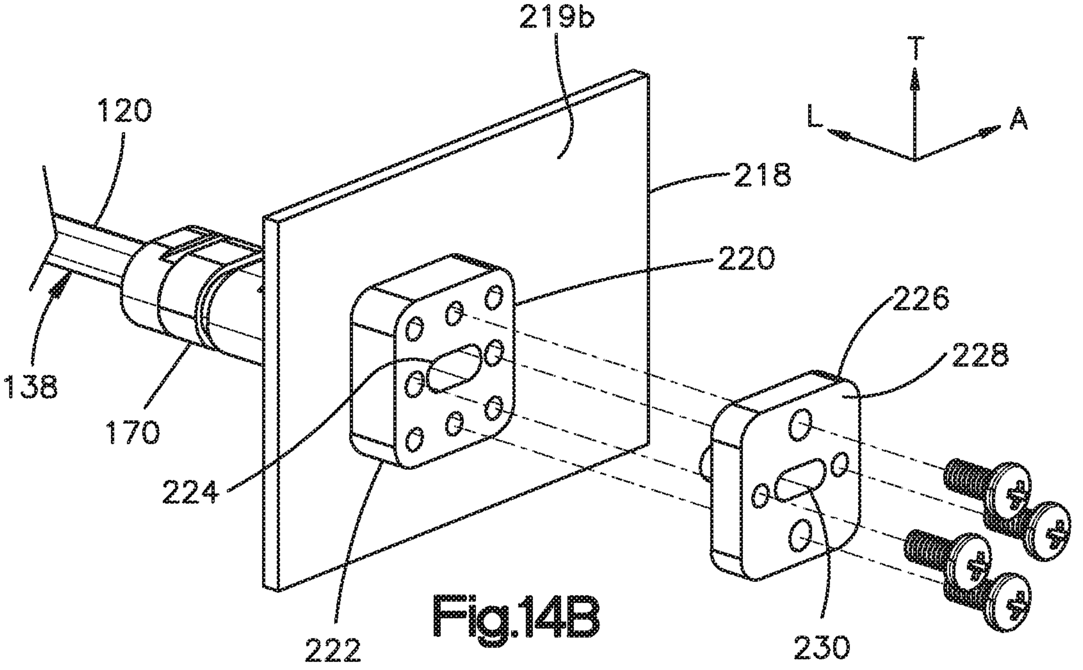
FIG. 14B is an exploded perspective view of the embodiment of FIG. 14A.

In still other examples illustrated in FIGS. 14A-14B, the attachment member 172 can be mounted to a first side 219*a* of the substrate 218, and can be further mounted to a second board attachment member 220 that is mounted to a second side 219*b* of the substrate opposite the first side 219*a*. The first side 219*a* can define a rear side of the substrate 218, and the second side 219*b* can define a front side of the substrate 218. Thus, the first and second sides 219*a* and 219*b* can be opposite each other along the longitudinal direction. The second board attachment member 220 includes a second attachment body 222 and a channel 224 that extends through the second attachment body 222. The second attachment body 222 can be made of metal or any suitable electrically conductive material, such as a lossy material. Thus, the channel 224 can define an air waveguide. The second board attachment member 220 can be mounted to a second interconnect member 226 having a second interconnect body 228 and a second interconnect channel 230 that extends through the second interconnect body 228. The second interconnect body 228 can be metallic or made of any suitable alternative electrically conductive material such as an electrically conductive lossy material. Thus, the second interconnect channel can define a second interconnect air waveguide. The second interconnect channel 230 can be aligned with the channel 224 of the second attachment body 222 along the longitudinal direction which, in turn, are aligned with an opening that extends through the substrate 218 along the longitudinal direction, and the internal waveguide channel 131 of the gaseous waveguide 118 (see FIG. 12B). Further, the first side 219*a* of the substrate 218 can abut the front end of the gaseous waveguide 118 as described above with respect to the flange 135 (see FIG. 12B). It should be appreciated that all channels can define the elongate cross-sectional shape described above or any suitable alternative shape as desired.

As shown in FIGS. 11A-14B, the complementary interconnect member 119, including the attachment member 220 can be configured as a vertical interconnect member that propagates electrical signals from the dielectric waveguide 120 along the longitudinal direction. Alternatively, referring now to FIGS. 15A-15B, the complementary interconnect member 119 can be configured as a right-angle attachment member 232 that receives the electrical signals from the waveguide cable assembly 138 along the longitudinal direction L, and routes the electrical signals along a direction perpendicular to the longitudinal direction L. For instance, the complementary right-angle attachment member 232 can route the electrical signals along the transverse direction T.

The right-angle attachment member 232 can define a right-angle attachment body 234 and a mating portion 236 that extends out from the right-angle attachment body 234. The mating portion 236 can include the at least one mating finger 180 such as a plurality of mating fingers 180 as described above. Thus, the mating fingers 180 can include the retention bumps 212 as described above. The waveguide interconnect member 170 can be secured and released from the mating portion 236 of the right-angle attachment member 232 as described above with respect to the vertical attachment member 172 of FIGS. 11A-12D. The gaseous waveguide 118 can extend into the attachment member channel 178 until the gaseous waveguide wall 127 abuts a shoulder 173 of the right-angle attachment body 234, such that the internal waveguide channel 131 is aligned with the attachment member channel 178 along the longitudinal direction. Further, the internal waveguide channel 131 can be continuous with the attachment member channel 178. Thus, the right-angle attachment member 232 can be placed in electrical communication with the waveguide cable assembly 138, such that electrical signals can travel between the waveguide cable assembly 138 and the right-angle attachment member 232.

Figure 15A:
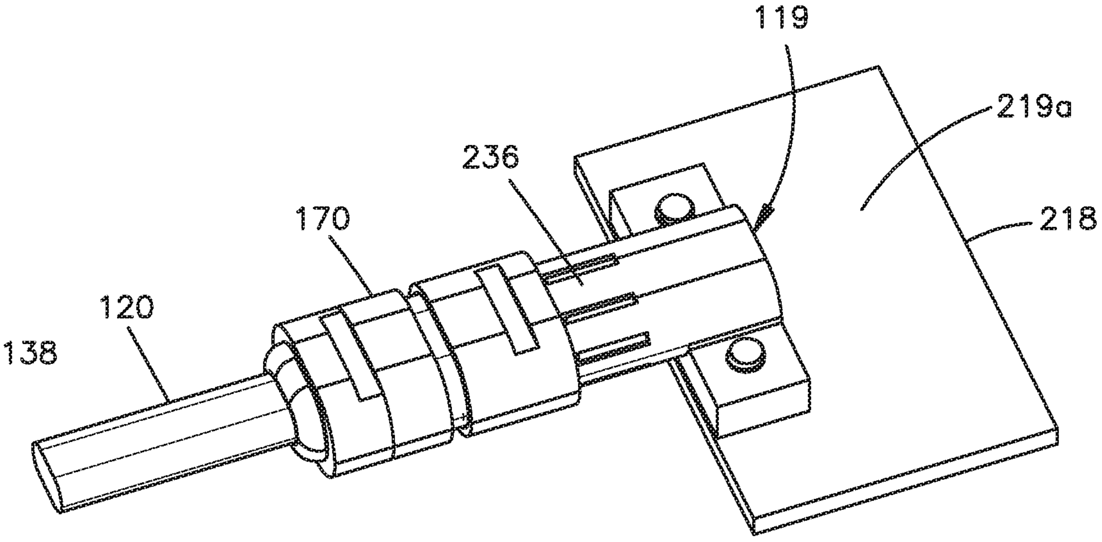
FIG. 15A is a perspective view of the waveguide cable assembly of FIG. 11, shown mounted to a complementary right-angle interconnect member that is mounted to a printed circuit board.
Figure 15B:
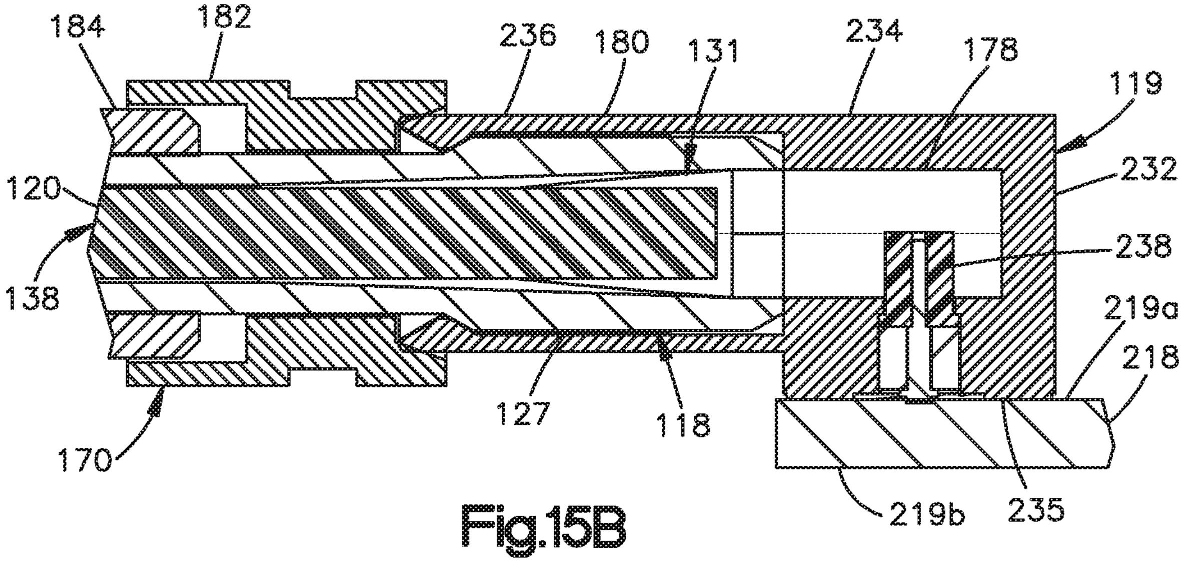
FIG. 15B is a sectional side elevation view of the waveguide cable assembly of and complementary right-angle interconnect member mounted to the printed circuit board of FIG. 15A.

The right-angle attachment body 234 can define a mounting portion 235 that is configured to mount to a first side 219*a* of the substrate 218 in the manner described above. However, as illustrated in FIGS. 15A-15B, the first and second sides 219*a* and 219*b* of the substrate 218 can be opposite each other along a direction perpendicular to the longitudinal direction L. For instance, the first and second sides 219*a* and 219*b* of the substrate 218 can be opposite each other along the transverse direction T. Further, the right-angle attachment body 234 can terminate at the substrate 218 in some examples. The right-angle attachment body 234 can include an electrically conductive antenna 238 that extends through the mounting portion 235 an into the attachment member channel 178 that extends through the right-angle attachment body 234. Thus, the electrically conductive antennal 238 can receive the electrical signals that travel from the waveguide cable assembly 138 and into the attachment member channel 178. The electrically conductive antenna 238 can mount onto a complementary electrical device such as an electrical connector that is mounted to the substrate 118, or can be mounted direction to the substrate 218, and in particular can mount to the first side 219*a* of the substrate 219*a*. The antenna 238 can be surrounded by a dielectric, and attached to the dielectric, if desired. The substrate 218 can then route the electrical signals as desired. In one examples, a pair of waveguide cable assemblies 138 can be secured to right-angle attachment members that are mounted to a common substrate in the manner described above. The common substrate can route the electrical signals between the two right-angle attachment members so as to place the two waveguide cable assemblies in electrical communication with each other.

While the waveguide interconnect member 170 has been described in connection with one example, it should be appreciated that the waveguide cable assembly 138 can include waveguide interconnect members in accordance with any suitable alternative embodiment. For instance, another example of a waveguide interconnect member 250 that is configured to mate with a complementary interconnect member 252 will now be described with reference to FIGS. 16A-16E. As will be appreciated from the description below the waveguide interconnect member can be configured to move between an engaged position and a disengaged position while undergoing pure translation along the longitudinal direction, and thus without substantial rotation about the longitudinal axis 125 with respect to the complementary interconnect member 119. The complementary interconnect member 252 can be configured as an attachment member 172 generally of the type described above. While the complementary interconnect member 252 can be configured as a right-angle interconnect member as shown, the complementary interconnect member 252 can alternatively be configured as a vertical interconnect member in the manner described above. In other examples, the complementary interconnect member 252 can be configured as a flange in the manner described above.

Figure 16A:
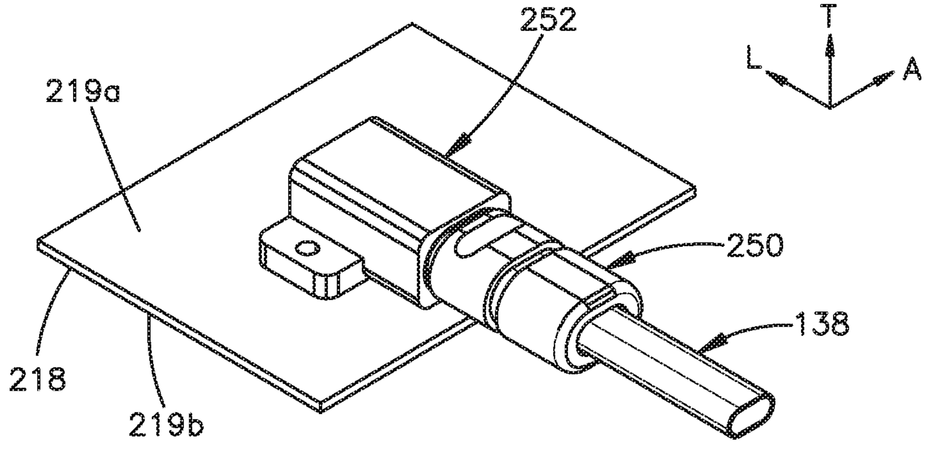
FIG. 16A is a perspective view of a data communication system including a waveguide cable assembly mated to a complementary interconnect member in accordance with another example, whereby the complementary interconnect member is shown mounted to a substrate.
Figure 16B:
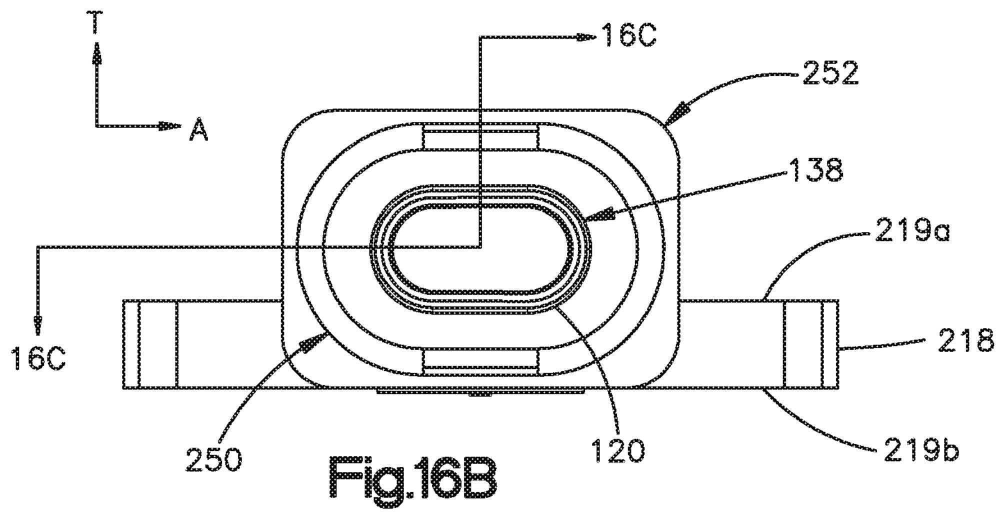
FIG. 16B is an end elevation view of the data communication system of FIG. 16A.
Figure 16C:
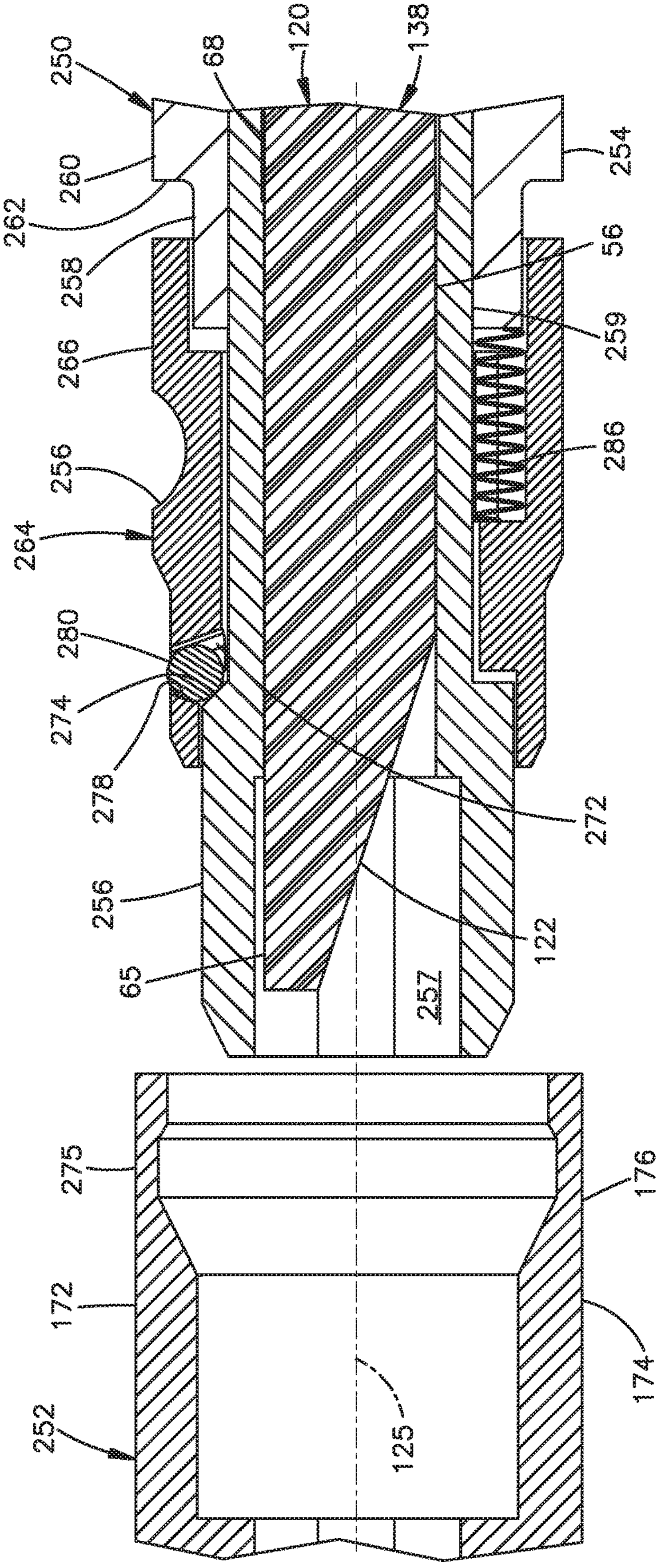
FIG. 16C is a sectional side elevation view of the waveguide cable assembly and the complementary interconnect member of FIG. 16B, taken along line 16C-16C, showing the waveguide cable assembly aligned to be mated with the complementary interconnect member.

Referring now to FIG. 16C, the waveguide interconnect member 250 can include a ferrule 254 that surrounds the dielectric waveguide 120, and is configured to attach to the outer dielectric jacket 68. As described above with respect to the ferrule 194 (FIG. 12A), the ferrule 254 can be adhesively attached to the dielectric jacket 68. Alternatively or additionally, a shrink wrap can extend over the ferrule 254 and the dielectric jacket 68 so as to attach the ferrule 254 to the dielectric jacket 68. Any suitable attachment member can alternatively attach the ferrule 254 to the dielectric jacket 68. Thus, the ferrule 254 can define a strain relief member that provides strain relief to the dielectric waveguide in the manner described above. The dielectric jacket 68 can terminate at a location radially aligned with the ferrule 254. The shield 56 extends forward of the dielectric jacket 68. The waveguide cable assembly 138 further includes a gaseous waveguide wall 256 that extends over and contacts the front end of the shield 56. The gaseous waveguide wall 256 extends forward from the shield 56 to a location past the end 122 of the dielectric 65. The gaseous waveguide wall 256 can define an internal waveguide channel 257 that extends forward from the dielectric 65. The gaseous waveguide wall 256 can define the transition profile described above with respect to the gaseous waveguide wall 127. Alternatively, the inner surface of the gaseous waveguide wall 256 that defines the internal waveguide channel 257 can extend along the longitudinal direction L. As described above, the internal waveguide channel 257 can have the elongate shape in cross-section.

The ferrule 254 can further define a radially outer seat surface 258 of a seat 260 that is monolithic with the ferrule 254. The seat 260 can further define a shoulder that defines a rear stop surface 262. The stop surface 262 can face the forward direction. The waveguide interconnect member 250 can further define a slider 264 that is movable along the longitudinal direction L between an engaged position and a disengaged position. As described above, the slider 264 includes an abutment wall 256 and a projection or collar 266 that extends rearward from the abutment wall 256. While reference is made below to the collar 266, it is appreciated that the projection can assume any suitable alternative configuration as desired. Thus, description of the collar 266 can apply with equal force and effect to the projection, unless otherwise indicated. The collar 266 can be configured to abut the rear stop surface 262 when the slider 264 is at its rearward-most position. Thus, the slider 264 can translate in the rearward direction until a rearward-facing surface of the collar 266 abuts the rear stop surface 262.

Figure 17:
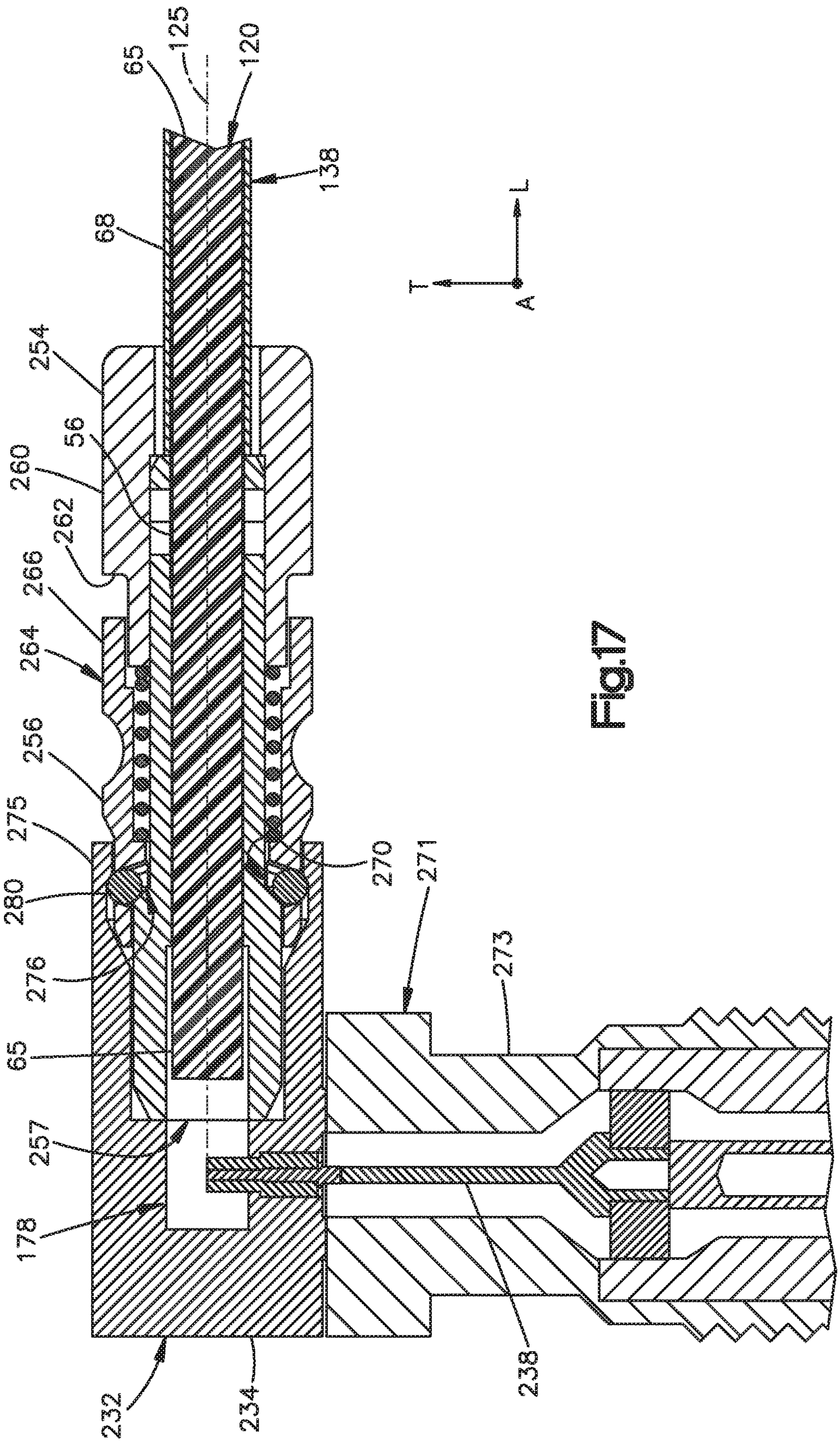
FIG. 17 is a sectional side elevation view similar to FIG. 16D, but showing the complementary interconnect member having a right-angle mounting portion in accordance with another example.

The waveguide interconnect member 250 can further include a biasing member 286 that biases the slider 264 in the forward direction. In particular, the biasing member 286 can be configured as a coil spring, an elastomer, or any suitable alternative member configured to apply a biasing force to the slider 264 that urges the slider 264 to translate in the forward direction. The biasing member 268 can extend in a radial gap between the collar 266 and the radially outer surface 259 of the gaseous waveguide wall 256. The biasing member 264 can extend in the forward direction from the seat 260 to the slider 264. In one example, the waveguide interconnect member 250 can include a pair of biasing members 286. The biasing members 286 can be radially opposite each other. Alternatively, as illustrated at FIG. 17, the biasing member 286 can be an annular biasing member that surrounds the dielectric waveguide 120.

The waveguide interconnect member 250 can define a variable sized gap 270 (see FIG. 16D) between the slider 264 and the gaseous waveguide wall 256. In particular, the slider 264 defines a first retention surface 272, and the gaseous waveguide wall 256 defines a second retention surface 274. The variable sized gap 270 can extend from the first retention surface 272 to the second retention surface 274. Thus, it should be appreciated that the first retention surface 274 can partially define the variable sized retention gap 210. The first retention surface 272 can flare in the radially outward direction as it extends in the forward direction. The first retention surface 272 can be defined by the abutment wall 256. The second retention surface 274 can flare in the radially outward direction as it extends in the forward direction. The radially outer surface 259 of the gaseous waveguide wall 256 and the first and second retention surfaces 272 and 274 cooperate so as to define a pocket 276 (see FIG. 16D).

The waveguide interconnect member 250 can further include a latch 280 that is movable from a latched position to an unlatched position. The latch 280 can be configured as a cylindrical pin or any suitably alternatively shaped latch 280. During operation, when the slider translates in the forward direction to the engaged position, the slider 264 correspondingly causes the latch 280 to iterate to the latched position. When the slider 264 translates from the engaged position to the disengaged position, the slider 264 causes the latch 280 to iterate from the latched position to the unlatched position. The latch 280 is configured to interfere with the complementary interconnect member 252 when the latch 280 is in the latched position, thereby preventing separation of the complementary interconnect member 252 from the waveguide cable assembly 138. Thus, the waveguide cable assembly 138 is secured to the complementary interconnect member 252 when the latch 280 is in the latched position. When the latch 280 moves to the unlatched position, the interference is removed, thereby allowing the waveguide cable assembly 138 to unmate and separate from the complementary interconnect member 252.

The slider 264 can further define a push surface 278 that faces the rearward direction and can flare radially outward as it extends in the rearward direction. The push surface 278 can be spaced forward from the first retention surface 272. Further, the push surface 278 can be disposed forward of the pocket 276. The latch 280 can be captured between the first retention surface 272 and the push surface 278, such that translation of the latch 280 in the forward direction causes the first retention surface 272 to apply a force to the latch 280 that urges the latch 280 to move in the forward direction, and translation of the latch in the rearward direction causes the push surface 278 to apply a force to the latch 280 that urges the latch 280 to move in the rearward direction.

Figure 16D:
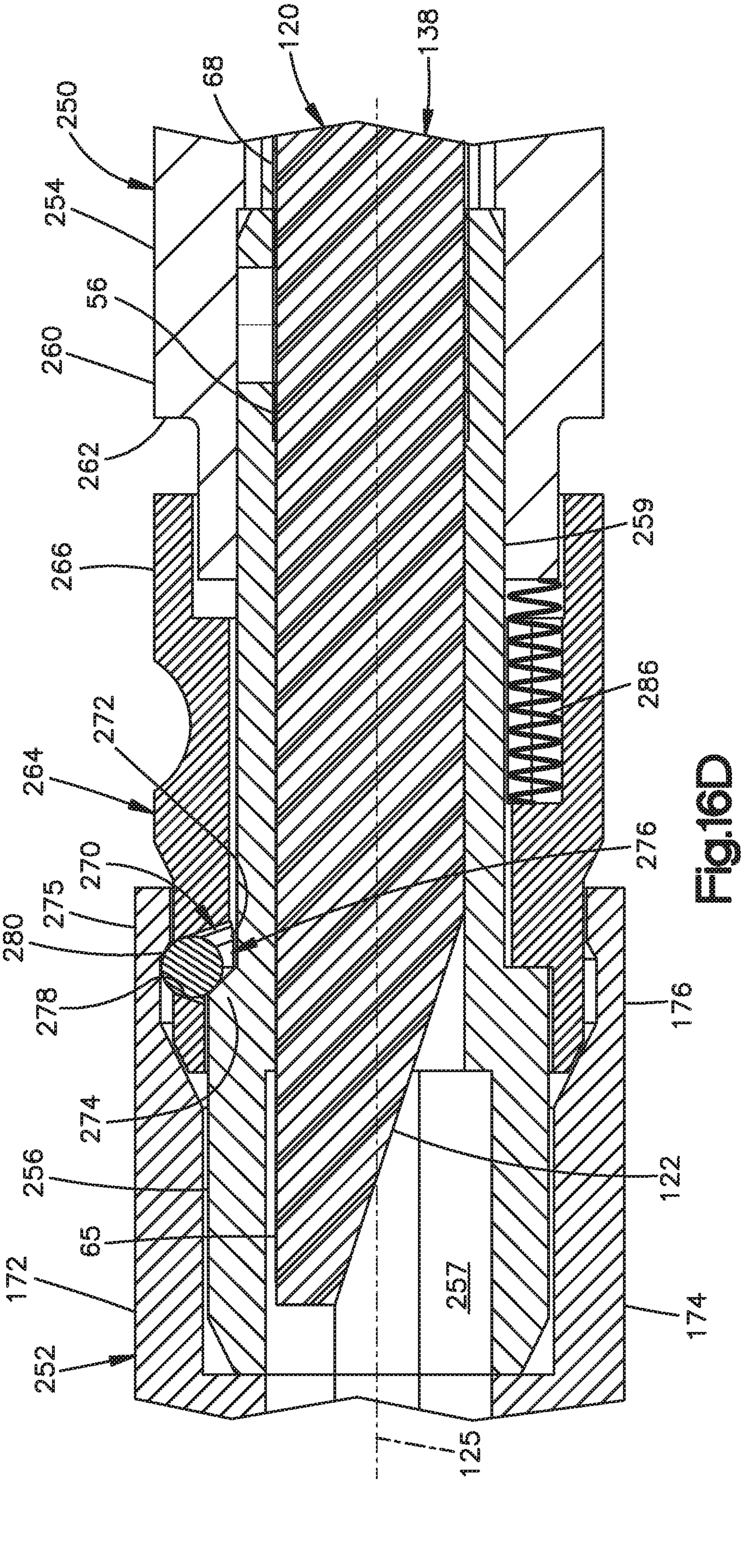
FIG. 16D is a sectional side elevation view showing the waveguide cable assembly mated to the complementary interconnect member of FIG. 16C.

Referring now to FIG. 16D in particular, the gaseous waveguide wall 256 is inserted into the attachment member channel 178 in the forward direction until a securement finger 275 is moved to a securement position in which movement of the slider 264 to the engaged position secures the waveguide interconnect member 250 to the attachment member 172. Instead of at least one spring finger, the mating portion 176 of the attachment member 172 can include at least one securement finger 275 that can define a securement surface 282. The securement surface 282 can flare radially inward as it extends in the rearward direction. As the gaseous waveguide wall 256 is inserted into the attachment member channel 178, insufficient radial clearance exists for insertion of the latch 280 between the radially outer surface of the securement finger 275 and the inner surface of the mating portion 176 of the attachment member 172.

Once the gaseous waveguide wall 256 has been fully inserted in the attachment member channel 178, the securement surface 282 is spaced a sufficient distance from the second retention surface 274. Accordingly, the biasing member 286 biases the slider 264 to translate in the forward direction with respect to the complementary interlock member 252. Thus, the first retention surface 272 drives the latch 280 in the forward direction with respect to the complementary interconnect member 252, which thereby causes the latch 280 to ride along the second retention surface 274. The second retention surface 274 is flared or sloped such that the latch 280 moves radially outward as it travels along the second retention surface 274 in the forward direction until the latch 280 is in the latched position. In particular, the latch 280 interferes with the securement surface 282 and prevents the securement surface from traveling in the forward direction with respect to the waveguide interconnect member 250. Thus, interference prevents the complementary interconnect member 250 member 252 from becoming unmated and separated from the complementary interconnect member 252. The force from the biasing member 286 onto the slider 264 urges the slider 264 forward to maintain the latch 280 in the latch position. When the waveguide cable assembly 138 is mated with the complementary interconnect member 252, the internal channel 257 is aligned with the attachment member channel 178 along the longitudinal direction L, and is also continuous with the attachment member channel 178.

Figure 16E:
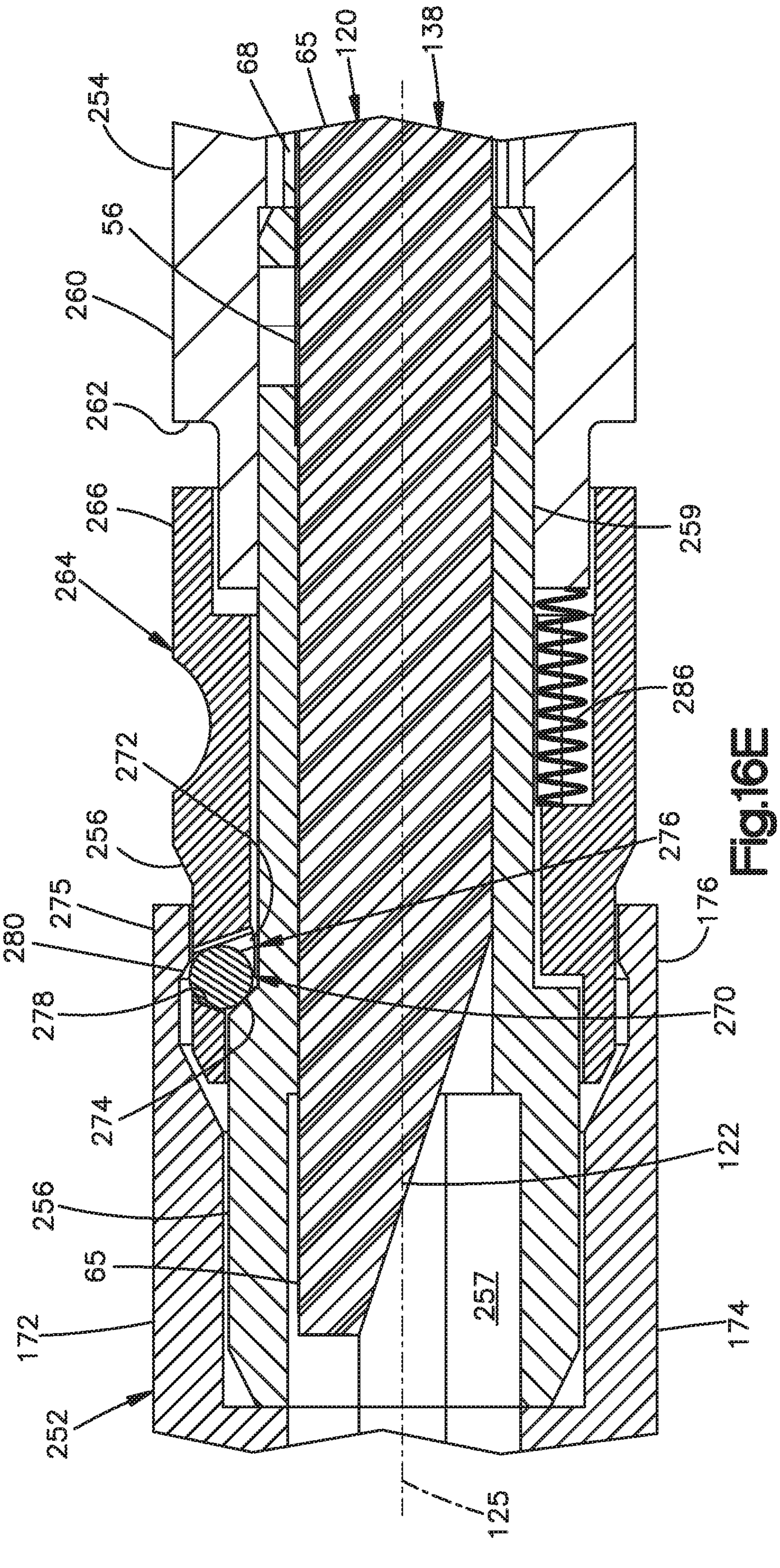
FIG. 16E is a sectional side elevation view showing the waveguide cable assembly of FIG. 16D being unmated from the complementary interconnect member.

Referring now to FIG. 16E, when it is desired to unmate the waveguide cable assembly 138 from the complementary interconnect member 252, the slider 264 is translated in the rearward direction against the forward biasing force of the biasing member 286. As the slider 264 translates in the rearward direction, the push surface 278 drives the latch 280 to move rearward along the second retention surface 274. Because the second retention surface 274 flares radially inward as it extends along the rearward direction, movement of the latch 280 in the rearward direction causes the latch 280 to ride along the second retention surface 274 and into the pocket 276, Once the latch 280 is in the pocket 276, the latch 280 is removed from interference with the securement surface 282. Accordingly, the complementary interconnect member 252 and the waveguide interconnect member 250 can separate from each other, thereby unmating the waveguide cable assembly 138 from the complementary interconnect member 252. The gaseous waveguide wall 256 is then removed from the attachment member channel 178. The slider 264 can be gripped so as to pull the slider manually in the rearward direction, or a pull tab can extend from the slider 264 in the manner described above.

It is appreciated that both the waveguide interconnect member 250 and the waveguide interconnect member 170 described above is non-threaded, either internally or externally, and does not undergo substantial rotation about the longitudinal axis 125 in order to secure or unsecure the waveguide interconnect member to or from the complementary interconnect member. Further, each of the waveguide interconnect member 250 and the waveguide interconnect member 170 has a smaller external footprint than a WR15 flange of the type described above with respect to FIG. 9 along three perpendicular directions such as the longitudinal direction L, the lateral direction A, and the transverse direction T.

Referring now to FIG. 17, the complementary interconnect member 119 can be placed in electrical communication with any suitable complementary electrical device as desired, in the manner described above. In particular, the attachment member defined by the complementary interconnect member 119 can be configured as the right-angle attachment member 232 as described above. The right-angle attachment member can include the securement finger 275 as described above, but can be configured the electrical signals of the waveguide cable assembly 138 along a direction perpendicular to the longitudinal direction L. For instance, the right-angle attachment member 232 can route the electrical signals along the transverse direction T.

The right-angle attachment member 232 can define the right-angle attachment body 234, and the mating portion 236 that includes the securement surface 282. Thus, the waveguide interconnect member 250 can be secured and released from the mating portion 236 of the right-angle attachment member 232 as described above with respect to the vertical attachment member 172 of FIGS. 16A-16E. The internal waveguide channel of the gaseous waveguide can be aligned and continuous with the attachment member channel 178. Thus, the right-angle attachment member 232 can be placed in electrical communication with the waveguide cable assembly 138, such that electrical signals can travel between the waveguide cable assembly 138 and the right-angle attachment member 232. The right-angle attachment body 234 can define a mounting portion 235 that is configured to be mounted to a complementary electrical device. The complementary device can be configured as a substrate in the manner described above or any suitable alternative complementary electrical device. In one example, the complementary electrical device can be configured as an electrical connector 271.

The electrical connector 271 can include a connector housing 273 that supports an electrically conductive antenna 238 that extends through the mounting portion 235 and into the attachment member channel 178 that extends through the right-angle attachment body 234. Thus, the electrically conductive antennal 238 can receive the electrical signals that travel from the waveguide cable assembly 138 and into the attachment member channel 178. The antenna 238 is in electrical communication with the right-angle attachment member 232, which in turn is in electrical communication with the dielectric waveguide assembly 120. Accordingly, the antennal 128 is in electrical communication with the dielectric waveguide assembly 120.

In another example, the connector housing 273 can be monolithic with the right-angle attachment body 234, such that the right-angle attachment member 232 includes the antenna 238. The electrically conductive antenna 238 can mount onto the substrate 218, and in particular can mount to the first side 219*a* of the substrate 219*a*. The substrate 218 can then route the electrical signals as desired. In one examples, a pair of waveguide cable assemblies 138 can be secured to right-angle attachment members that are mounted to a common substrate in the manner described above. The common substrate can route the electrical signals between the two right-angle attachment members so as to place the two waveguide cable assemblies in electrical communication with each other.

Figure 18A:
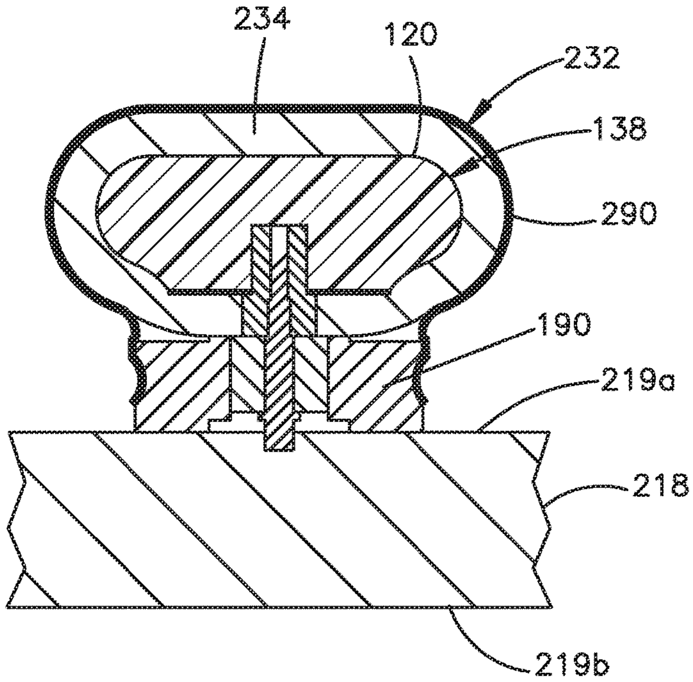
FIG. 18A is a sectional end elevation view of the data communication system of FIG. 16D, but showing the complementary interconnect member constructed in accordance with an alternative embodiment.
Figure 18B:
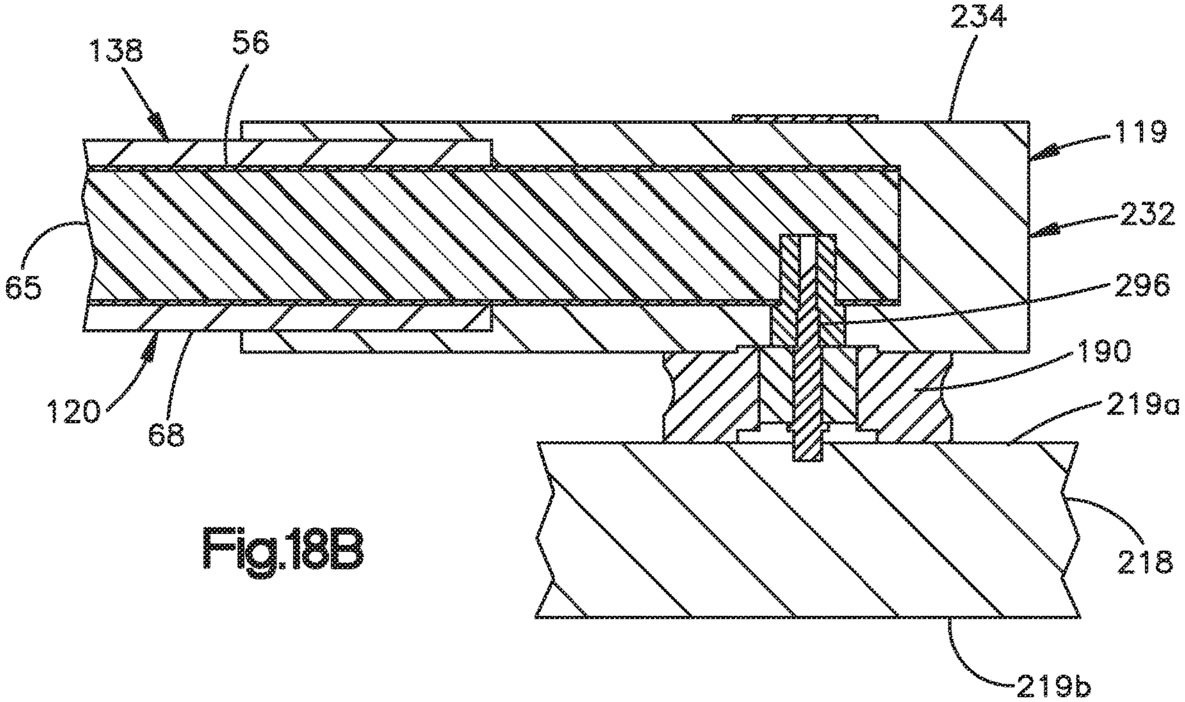
FIG. 18B is a sectional side elevation view of the data communication system of FIG. 18A.

Referring now to FIGS. 18A-18B, the waveguide cable assembly 138 can include a retention clip 290 that can be made from electrically conductive material or electrically non-conductive material. The retention clip 290 is configured to secure the waveguide cable assembly 138 to the right angle attachment member 232. The right-angle attachment member 232 includes a right-angle attachment body 234. The right-angle attachment body 234 can be made from an electrically conductive material. The right-angle attachment member 232 can include an electrically conductive antenna 296 is supported by the right-angle attachment body 234. The antenna 296 that can attach to the dielectric 65 of the dielectric waveguide 120. Can be surrounded by a dielectric. Alternatively, the right-angle attachment body 234 can be a dielectric material. The clip 290 can secure an annular housing 190 to the waveguide shield 56*b*, and can further secure the right-angle attachment body 234. The right angle attachment body 234 can attach to the dielectric jacket 68, the waveguide shield 56 and the annular housing 190. The antenna 296 can terminate at a substrate 218 in the manner described above. Alternatively, the antenna 296 can connect to a mating connector that, in turn, is mated to a complementary electrical device. It should be appreciated that the antenna can be placed in electrical communication with the dielectric waveguide 120 via the right-angle attachment member 232 in the manner described above.

Referring to FIG. 19, the dielectric waveguide 120 defines first and second ends. The first end of the dielectric waveguide 120 can be attached to a first waveguide interconnect member 170, and the second end of the of the dielectric waveguide 120 can be attached to a second waveguide interconnect member 170 in the manner described above. The second waveguide interconnect member 170 can thus be removably secured to and unsecured from, selectively, a second complementary waveguide interconnect in the manner described above. Thus, each of the first and second ends can terminate a respective first and second gaseous waveguides 118 in the manner described above. While the waveguide interconnect member at the second end can be configured as the interconnect member 170 described above, the waveguide interconnect member at the second end can alternatively be configured as the interconnect member 250 described above, or any suitable alternative interconnect member as desired.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

We claim:

1. A waveguide interconnect member configured to releasably secure a dielectric waveguide to a complementary waveguide interconnect, the waveguide interconnect member comprising:

a gaseous waveguide wall that defines an inner gaseous waveguide surface and an outer gaseous waveguide surface that is opposite the inner gaseous waveguide surface, wherein the inner gaseous waveguide surface defines an internal waveguide channel that contains a gas; and a flexible extruded inner dielectric that extends into the gaseous waveguide wall and tapers to a tapered end in the gaseous waveguide wall, wherein the gaseous waveguide wall has a transition profile from a first cross-sectional area of the dielectric waveguide to a second cross-sectional area of the complementary waveguide interconnect that is greater than the first cross-sectional area.

2. The waveguide interconnect member of claim 1, wherein the transition profile has no sharp edges and no stepped transitions.

3. The waveguide interconnect member of claim 1, wherein the internal waveguide channel contains a dielectric material.

4. The waveguide interconnect member of claim 3, wherein the dielectric material comprises a gas.

5. The waveguide interconnect member of claim 1, wherein the waveguide wall is metallic.

6. The waveguide interconnect member of claim 1, wherein the waveguide wall comprises an electrically conductive lossy material.

7. The waveguide interconnect member of claim 1, comprising an inner waveguide interconnect and an outer waveguide interconnect.

8. The waveguide interconnect member of claim 7, wherein the inner waveguide interconnect defines the gaseous waveguide wall, and the outer waveguide interconnect is rotatable with respect to the inner waveguide interconnect.

9. The waveguide interconnect member of claim 8, wherein the outer waveguide interconnect is threaded so as to threadedly attach to the complementary interconnect member.

10. The waveguide interconnect member of claim 8, wherein the outer waveguide interconnect is internally threaded.

11. An assembly comprising a flange having external threads, wherein the outer waveguide interconnect of claim 7 is internally threaded so as to thread onto the external threads of the flange.

12. The waveguide interconnect member of claim 1, wherein the transition profile overlaps with the tapered end.

13. An electrical communication system comprising:

the dielectric waveguide of claim 1 configured to propagate RF electrical signals, the dielectric waveguide including the inner dielectric; and an attachment member that is attached to the dielectric waveguide, the attachment member having an antenna that is attached to the inner dielectric.

14. The electrical communication system of claim 13, wherein the dielectric waveguide extends along a central axis, and the antenna is oriented perpendicular to the central axis.

15. The electrical communication system of claim 13, wherein the dielectric waveguide is flexible.

16. An electrical communication system comprising:

the dielectric waveguide of claim 1 configured to propagate RF electrical signals, the waveguide including the inner dielectric, a waveguide shield that surrounds the inner dielectric, and a dielectric jacket that surrounds the waveguide shield;

an attachment member that is in electrical communication with the dielectric waveguide, such that electrical signals travel between the flexible waveguide and the attachment member; and an electrical connector mounted to the attachment member, the electrical connector comprising a connector housing, and an electrically conductive antenna configured to be placed in electrical communication with the dielectric waveguide.

* * * * *